United States Patent
Matsushita et al.

(10) Patent No.: US 7,415,212 B2
(45) Date of Patent: Aug. 19, 2008

(54) DATA COMMUNICATION SYSTEM, DATA TRANSMITTER AND DATA RECEIVER

(75) Inventors: Nobuyuki Matsushita, Tokyo (JP); Junichi Rekimoto, Tokyo (JP); Shigeru Tajima, Kanagawa (JP); Yuji Ayatsuka, Tokyo (JP); Michimune Kohno, Tokyo (JP)

(73) Assignee: Sony Corporation, Tokyo (JP)

( * ) Notice: Subject to any disclaimer, the term of this patent is extended or adjusted under 35 U.S.C. 154(b) by 596 days.

(21) Appl. No.: 10/451,505

(22) PCT Filed: Sep. 9, 2002

(86) PCT No.: PCT/JP02/09141

§ 371 (c)(1),
(2), (4) Date: Dec. 8, 2003

(87) PCT Pub. No.: WO03/036829

PCT Pub. Date: May 1, 2003

(65) Prior Publication Data

US 2004/0161246 A1    Aug. 19, 2004

(30) Foreign Application Priority Data

Oct. 23, 2001  (JP) .............................. 2001-325356
Mar. 4, 2002   (JP) .............................. 2002-057836

(51) Int. Cl.
    *H04B 10/00* (2006.01)
(52) U.S. Cl. ........................ 398/140; 398/182; 398/183; 398/202; 398/212; 398/214; 398/184; 398/187; 398/186; 398/189; 398/190; 398/191; 398/135; 398/138; 398/118; 398/115; 398/127; 398/130; 398/153; 398/128; 382/103; 382/107; 250/559.29; 250/559.31; 250/206.1; 250/206.2; 250/227.14

(58) Field of Classification Search .................. 398/140, 398/141, 153, 202, 212, 214, 182, 183, 187, 398/185, 189, 190, 191, 186, 135, 128, 130, 398/138, 118, 115, 127; 382/103, 107; 250/559.29, 250/559.31, 206.1, 206.2, 227.14, 208.6
See application file for complete search history.

(56) References Cited

U.S. PATENT DOCUMENTS 5,602,932 A    2/1997    Macdonald et al.

(Continued)

FOREIGN PATENT DOCUMENTS

EP        1 065 809 A1    1/2001

(Continued)

OTHER PUBLICATIONS

"The VisualEyez System"; Phoenix Technologies Ltd.; (http://ptiphoenix.com).

(Continued)

*Primary Examiner*—Hanh Phan
(74) *Attorney, Agent, or Firm*—Finnegan, Henderson, Farabow, Garrett & Dunner, L.L.P.

(57) ABSTRACT

A transmitter formed of two or more light-emitting sections such as LEDs, which are physically arranged in a predetermined manner, is disposed in the real world object, and each light-emitting section transmits data by flashing at a flashing pattern representing the transmission data of a predetermined bit length. A receiver, on the other hand, includes a photoreceiving section formed from a two-dimensional photoreceiving surface, decodes the transmission data on the basis of the photoreceived flashing pattern, and recognizes the spatial information of an object on the basis of the flashing position on the two-dimensional photoreceiving surface. Therefore, information, such as an ID, can be obtained from the object in the real world, and also, the spatial position of the object can be recognized at the same time.

41 Claims, 29 Drawing Sheets

U.S. PATENT DOCUMENTS

| | | | |
|---|---|---|---|
| 5,634,144 A * | 5/1997 | Mauro et al. | 396/57 |
| 5,793,880 A | 8/1998 | Constant | |
| 5,953,146 A * | 9/1999 | Shelby | 398/131 |
| 6,469,489 B1 | 10/2002 | Bourquin et al. | |
| 6,603,865 B1 * | 8/2003 | Yagi et al. | 382/103 |
| 6,983,110 B2 * | 1/2006 | Buckman et al. | 398/212 |
| 2002/0101519 A1 * | 8/2002 | Myers | 348/232 |

FOREIGN PATENT DOCUMENTS

| | | |
|---|---|---|
| JP | 2001-059706 | 3/2001 |
| JP | 2001-60140 | 3/2001 |
| JP | 2001-208511 | 8/2001 |
| JP | 2001-244948 | 9/2001 |
| JP | 2001-245253 | 9/2001 |
| JP | 2001-258083 | 9/2001 |
| JP | 2002-008015 | 1/2002 |
| JP | 2003-179556 | 6/2003 |

OTHER PUBLICATIONS

D.J. Moore et al.; "Implementing Phicons: Combining Computing Vision with InfraRed Technology for Interactive Physical Icons"; UIST '99; pp. 67-68; 1999.

Hisashi Aoki; "Infrared Tags Read b y Camera and Applications"; Interactive System and Software; VIII; pp. 131-136; 2000.

Junichi Rekimoto; "InforRoom: Direction Operation Environment Augmented in the Real World"; Interaction 2000; pp. 9-16; 2000.

M. Bajura et al.; "Dynamic Registration Correction in Augmented Reality System"; VRAIS '95, pp. 189-196, 1995.

"ID CAM", The Institute of Electronics, Information and Communication Engineers, vol. 101, No. 730, Mar. 12, 2002, pp. 105-110.

Communication from the European Patent Office, dated Feb. 14, 2008, regarding Application/Patent No. 02801992.5/PCT/JP0209141 (3 pgs.).

* cited by examiner

DATA COMMUNICATION SYSTEM, DATA TRANSMITTER AND DATA RECEIVER

TECHNICAL FIELD

The present invention relates to a data communication system, a data transmission apparatus, and a data receiving apparatus for transferring data in a real space, and particularly, it relates to a data communication system, a data transmission apparatus, and a data receiving apparatus for performing direct data transfer of information related to an object in the real world, such as a device ID, a network address, a host name, or a URL, or the real-world circumstances such as the position of a user, from the object without using a communication medium such as a wired or wireless network.

More specifically, the present invention relates to a data communication system, a data transmission apparatus, and a data receiving apparatus that are capable of performing data transfer which is robust in terms of distance, from an object immediately in front up to a comparatively distant object and, particularly, it relates to a data communication system, a data transmission apparatus, and a data receiving apparatus that obtain information, such as an ID, from a real-world object which is not connected by a communication medium, and recognize the real-world circumstances, such as the spatial position and the orientation of the object.

BACKGROUND ART

In current, highly advanced information processing technology and information communication technology, information devices, including personal computers and portable information terminals, have been ubiquitous in the real world, such as in offices and households. In such environments, it is expected that "ubiquitous computing", where devices are connected with one another and desired information is obtained anytime and anywhere, and augmented reality (AR) systems, where circumstances in the real world (things in the real world, the position of a user, etc.) are actively used, will be realized.

The concept of ubiquitous computing is that, no matter where a person is, the available computer environment remains the same. That is, since ubiquitous computing means "anytime and anywhere", the ultimate ubiquitous computing does not necessarily require information terminals, such as computers, PDAs (Personal Digital Assistants), or cellular phones.

According to augmented reality systems, it is possible to provide services using real-world information such as the position of the user. In this case, simply by carrying a portable terminal, the system is able to assist every aspect of the user's daily life by using the huge amount of information available on networks by presenting information corresponding to things in the real world in the neighborhood of the user and within the field of view of the user. For example, when the user visits a record store in a shopping mall, by holding up a portable terminal with a camera, recommended newly released records are displayed on the terminal. Furthermore, when the user looks at a signboard of a restaurant, impressions of the dishes are displayed.

When a computer or a peripheral device (i.e., a target such as a user terminal) to which data is transferred over a network is to be specified or when information such as the position of the user and information related to a real-world object is to be obtained, even if the other party is immediately in front, it is necessary to know his/her name (or the ID unique to the device, the network address, the host name, and the resource identifier such as the URL/URI). That is, from the point of view of user operation, computers are coordinated only in an indirect way, and therefore, the user operation somewhat lacks intuitiveness.

As a technique for transferring user identification information and obtaining real-world circumstances, such as the position of the user, while omitting such complicated procedures, techniques using real-world computing, such as visual codes such as "cybercodes" and RF tags, have been proposed. According to these techniques, there is no need for the user to consciously access the network, and instead, the user can obtain information related to an object from the ID of the object, which is gathered automatically.

Here, a "cybercode" is a two-dimensional bar code in a mosaic form, and identification information can be provided by representing each cell by a binary white or black level within a code pattern display area in which cells are arranged in an n×m (e.g., 7×7) matrix. The cybercode recognition procedure includes a step of binarizing a captured image, a step of finding a candidate of a guide bar from within the binary image, a step of searching for a corner cell on the basis of the position and the direction of the guide bar, and a step of decoding the image bit-map pattern in response to the detection of the guide bar and the corner cell.

For example, functions of applications, etc., the device ID, the network address, the host name, the URL, and other object-related information are registered in the cybercode in advance. Then, in response to the recognition of the cybercode from the image taken by a camera, the computer is able to execute a registered application (for example, "activating mail"), to search for the network address of the other party on the basis of the recognized ID in order to automatically make a connection, and to access resources on the basis of the recognized URL.

An RF tag is a device containing unique identification information and a readable/writable storage area. The RF tag has operation characteristics such that radio waves corresponding to the identification information and the stored information are transmitted in response to the reception of radio waves of a specific frequency, and the reading device can read the identification information of a wireless tag and the information stored in the storage area. Therefore, by setting the device ID, the network address, and the host name as the identification information of the wireless tag and by writing the URL and other object-related information in advance in the storage area, the system is able to execute a registered application (for example, "activating mail"), to search for the network address of the other party on the basis of the recognized ID in order to automatically make a connection, and to access resources on the basis of the recognized URL.

However, in a case where visible identification information, such as a visual code, is used, the size of the code varies according to distance. That is, since, the size of the code becomes small as the distance to the object increases, in order to recognize a distant object, a code having a large pattern needs to be formed. In other words, the information transmission technique based on this technique lacks robustness with respect to distance. For example, in order to recognize a building which is far away, it would be necessary to attach a huge code on the building, and this is not practical.

In the case of the RF tag, it is necessary for the user to direct the RF tag to a tag reading device or to bring the RF tag into contact therewith. That is, only an object at a very short distance can be recognized, and distant objects cannot be recognized.

Examples of a simple system for transmitting data and commands include an infrared remote controller. In this case, since the receiver is generally formed of a single pixel, only the existence of transmission data from a transmitter can be determined, the photoreceived signal has no spatial resolution, and the direction in which the transmitter exists cannot be detected. Furthermore, since the single pixel receives noise and data in a mixed manner, the separation of noise and data is difficult, and a frequency filter and a wavelength filter become necessary.

Furthermore, in order to detect the position of an object, a GPS (Global Positioning System) may be used. However, in this case, since only positional information, composed of the latitude and the longitude, can be obtained, in order to determine the azimuth, another means must be included. Furthermore, since it is necessary to receive radio waves from a satellite, it is difficult to use it in cities and indoors. Furthermore, it is not possible to deal with a case in which the position of the user differs from the position of the object at which information is linked, as in the case where a building is specified from a distant location.

In addition, in Japanese Examined Patent Application Publication No. 2001-208511, a configuration is described in which a light-emitting section for measuring position and a light-emitting section for transmitting data are made to emit light at different wavelengths so as to perform communication. In Japanese Examined Patent Application Publication No. 2001-59706, a configuration is described in which the position of a light-emitting source which emits light in synchronization with a synchronization signal is measured. However, in the configurations of these related arts, synchronization between the transmitter and the receiver and the wavelength division of the transmitter are necessary, and simplification of the system configuration, reduction in size, and reduction in power consumption are limited.

DISCLOSURE OF THE INVENTION

An object of the present invention is to provide a superior data communication system, a superior data transmission apparatus, and a superior data receiving apparatus that are capable of directly transferring information from a real-world object which is not connected by a communication medium.

Another object of the present invention is to provide a superior data communication system, a superior data transmission apparatus, and a superior data receiving apparatus that are capable of performing direct data transfer of information related to an object in the real world, such as the device ID, the network address, the host name, and the URL, or real-world circumstances, such as the position of the user, from an object without using a communication medium such as a wired or wireless network.

Another object of the present invention is to provide a superior data communication system, a superior data transmission apparatus, and a superior data receiving apparatus that are capable of performing robust data transfer from an object immediately in front up to an object which is comparatively far away.

Another object of the present invention is to provide a superior data communication system, a superior data transmission apparatus, and a superior data receiving apparatus that are capable of obtaining information such as an ID from an object in the real world, as well as recognizing the real-world conditions, such as the spatial position and the orientation of the object which is not connected by a communication medium.

The present invention has been made in view of the above-described problems. A first aspect of the present invention is directed to a data communication system comprising:

in the real world, a transmission apparatus comprising a data processing section for generating transmission data and a light-emitting section for emitting an optical signal such that the transmission data is coded; and a receiving apparatus comprising a photoreceiving section for receiving, on a two-dimensional photoreceiving surface, the optical signal from the transmission apparatus, and a data processing section for decoding the transmission data on the basis of the photoreceived position of the optical signal on the two-dimensional photoreceiving surface and from the photoreceived optical signal, wherein the sampling frequency of the data in the photoreceiving section is higher than a transferring frequency of the transmission data.

The "system" referred to herein refers to a logical assembly of a plurality of devices (or function modules which realize specific functions), and it does not matter particularly whether or not each device and function module is within a single housing.

For example, a transmission apparatus is disposed in advance in the neighborhood of a real-world object from which information and messages are desired to be transmitted to a user. The transmission apparatus includes one or more light-emitting sections for emitting an optical signal such that transmission data is coded. With respect to this, the user directs the two-dimensional photoreceiving surface of the receiving apparatus to the real-world object which is interested by the user. Then, the photoreceived optical signal is decoded to obtain the transmission data, and also, based on the positional information on the photoreceiving surface, where the optical signal is detected on the two-dimensional photoreceiving surface, it is possible to recognize the real-world circumstances such as the spatial information of the real-world object on which the transmission apparatus is mounted.

In the data communication system in accordance with the first aspect of the present invention, when the sampling frequency of the data of the photoreceiving section is made to be higher than two times the transferring frequency of the transmission data, the sampling theorem enables asynchronous communication to become possible between the transmitter and the receiver. In the present invention, for example, a CMOS sensor capable of high-speed operation is used in the photoreceiving section. Alternatively, the relationship between the sampling frequency in the photoreceiving section and the transferring frequency of the transmission data can be realized by various methods, for example, the photoreceiving section is made to operate in two or more operation modes, including an image mode for capturing an image of a scene and a decoding mode for receiving an optical signal, which is performed when not in the image mode. Here, the configuration in which the operation speed of the transmitter and the receiver is adjusted is not limited to those shown here as examples, and an appropriate configuration can be used in accordance with a request of the system application.

Since the data communication system in accordance with the first aspect of the present invention basically employs a transmission method using a wide-range action of "watching", data transfer which is robust in terms of distance is possible from an object immediately in front up to an object which is comparatively far away.

Here, the transmission apparatus is disposed in the neighborhood of a real-world object and is used, and can emit an optical signal representing transmission data containing the ID of the real-world object, the network address, the host name, the resource identifier such as the URL (Uniform Resource Locator) or the URI (Uniform Resource Identifier), data/content, program code, and other object-related information.

On the transmission apparatus side, digital data to be transmitted is modulated by a predetermined modulation method, and the data is finally transmitted as an optical signal composed of a pattern of variations of the brightness of the light source. The variation pattern of the brightness of the light source differs according to the modulation method employed at that time.

For example, in amplitude shift keying (ASK) in which bits are represented by the on/off state of the amplitude of a carrier, the light source is repeatedly switched on and off, forming a flashing pattern. In AM (amplitude modulation) modulation, the intensity of the brightness while the light source remains switched on becomes a pattern. In addition, various modulation methods, such as FM (Frequency Modulation) modulation, FSK (Frequency Shift Keying) in which bits are represents by variations in the frequency of a carrier, and a baseband method in which a bit sequence of digital data to be sent is directly represented by a flashing pattern, can be employed.

Alternatively, on the transmission apparatus side, from the viewpoint of noise immunity, a modulation process, such as intensity modulation and frequency modulation, may be applied on a baseband signal, so that the signal is sent as an optical intensity signal or an optical frequency signal rather than a flashing pattern.

The receiving apparatus may further comprise an application part for performing processing services corresponding to the transmission data decoded on the basis of the position at which the optical signal is received on the two-dimensional photoreceiving surface and from the received optical signal.

For example, in a case where a communication medium for connecting each real-world object to a user terminal is laid, the transmission apparatus disposed in the neighborhood of the real-world object can transmit access means such as the network address of the real-world object in the form of an optical signal. Furthermore, the application part can obtain the address of the real-world object on the communication medium on the basis of the data decoded from the optical signal and can establish a connection between the user terminal and the real-world object. That is, the user can realize a "gaze-link" metaphor (to be described later) of establishing a connection with the real-world object by simply performing an intuitive operation of directing the receiving apparatus to the real-world object which is interested by the user.

Furthermore, the receiving apparatus may further comprise connection means for accessing an external information providing space, such as the WWW (World Wide Web) constructed on the Internet. In such a case, the application part can search the information providing space on the basis of the data obtained by decoding the optical signal in order to extract information content related to a real-world object.

Furthermore, the receiving apparatus may further comprise captured-image processing means for processing a captured image according to the brightness of light received on the two-dimensional photoreceiving surface. Furthermore, the receiving apparatus may further comprise image display means for displaying an image.

In such a case, the application part may display, on the captured image, a captured image on the screen, and also may display the data obtained by decoding the flashing pattern in an overlaid manner at a place corresponding to the photoreceived position of the optical signal, making it possible to realize an augmented reality system such as "NaviCam" (to be described later).

Furthermore, on the transmission apparatus side, by increasing the output in the light-emitting section, the transmission of an optical signal at a long distance can be realized. However, when the receiving apparatus receives an optical signal having a strong output at a short distance, the photoreceived intensity is too strong, and an obstacle such as saturation (the saturation of the photoreceiving device) occurs in the photoreceiving section, making it impossible to reproduce significant data. In such a case, on the receiving apparatus side, the photoreceiving surface of the photoreceiving section may be divided into an area in which the photoreceived signal is too strong and data reproduction is impossible due to the saturation of the photoreceiving device, an area in which the photoreceived signal has a sufficient intensity and data reproduction is possible, and an area in which the photoreceived signal is very weak and reception is impossible, and the transmission data may be decoded by using only the photoreceived signal from the area in which data reproduction is possible. Furthermore, the position of the center of gravity of the area in which data reproduction is possible may be determined, and based on this position, the spatial position of the transmission apparatus may be specified.

The transmission apparatus may comprise a plurality of light-emitting sections. In such a case, the application part may specify the orientation and another spatial position of the transmission apparatus as the real-world circumstances on the basis of the photoreceived position of the optical signal from each light-emitting section, which is detected on the two-dimensional photoreceiving surface.

A plurality of transmission apparatuses may be disposed in the real world, and optical signals may be simultaneously transmitted to one receiving apparatus. In such a case, on the receiving apparatus side, the photoreceiving section may receive the optical signals from two or more transmission apparatuses at the same time, the data processing section may separate the optical signal in accordance with the photoreceived position on the two-dimensional photoreceiving surface, and the application part may separate and detect each item of the decoded transmission data in accordance with the photoreceived position on the two-dimensional photoreceiving surface. In other words, according to the data communication system in accordance with the first aspect of the present invention, robust multi-channel transmission can be realized.

The receiving apparatus may comprise two or more two-dimensional photoreceiving surfaces. In such a case, the application part may specify the spatial position, such as the distance information, of the transmission apparatus by performing stereo matching on the basis of the optical signal detected on each two-dimensional photoreceiving surface and the photoreceived position thereof.

A second aspect of the present invention is directed to a data transmission apparatus comprising:

a data processing section for generating transmission data; and a light-emitting section for coding the transmission data into an optical signal and sending the optical signal, wherein the light-emitting section comprises a photoreceiving section for photoreceiving an optical signal on a two-dimensional photoreceiving surface, and a data processing section for decoding the transmission data on the basis of the photoreceived position of the optical signal on the two-dimensional photoreceiving surface and from the photoreceived optical signal, and sends an optical signal to a receiving apparatus in which the sampling frequency of data in the photoreceiving section is higher than the transferring frequency of the transmission data.

The data transmission apparatus in accordance with the second aspect of the present invention is capable of performing data transfer which is robust in terms of distance from an object immediately in front up to a comparatively far object since data is transferred using an optical signal having a strong directivity.

The data transmission apparatus in accordance with the second aspect of the present invention is disposed, for example, in the vicinity of a real-world object and is used. In such a case, the data processing section transmits an optical signal representing transmission data containing the ID of the real-world object, the network address, the host name, the resource identifier such as the URL (Uniform Resource Locator) or the URI (Uniform Resource Identifier), data/content, program code, and other object-related information, thereby making possible data transfer which is robust in terms of distance.

In the light-emitting section, digital data to be transmitted is modulated in accordance with a predetermined modulation method, and the data is finally transmitted as an optical signal composed of a pattern of variations of the brightness of the light source. Depending on the modulation method adopted at that time, the variation pattern of the brightness of the light source differs. For example, in ASK (amplitude shift keying) modulation in which bits are represented by the on/off state of the amplitude of a carrier, the light source produces a flashing pattern in which switching on and off are repeated. In AM (modulation amplitude) modulation, the intensity of the brightness while the light source remains switched on becomes a pattern. In addition, various modulation methods, such as FM (Frequency Modulation) modulation, FSK (Frequency Shift Keying) mode in which bits are represents by variations in the frequency of a carrier, and a baseband method in which a bit sequence of digital data to be sent is directly represented by a flashing pattern, can be adopted. From the viewpoint of noise immunity, the light-emitting section may apply a modulation process, such as intensity modulation and frequency modulation, on a baseband signal, so that the signal is sent as an optical intensity signal or an optical frequency signal rather than a flashing pattern.

The data transmission apparatus in accordance with the second aspect of the present invention may comprise two or more light-emitting sections, so that space information, such as the orientation in the real world, is represented by the physical arrangement between the light-emitting sections.

A third aspect of the present invention is directed to a data receiving apparatus comprising:

a photoreceiving section for photoreceiving an optical signal such that transmission data is coded on a two-dimensional photoreceiving surface, the sampling frequency of the data being higher than the transferring frequency of the transmission data; and a data processing section for performing data processing based on the combination of the photoreceived position of the optical signal on the two-dimensional photoreceiving surface and the data decoded from the photoreceived optical signal.

The data receiving apparatus in accordance with the third aspect of the present invention is capable of performing data transfer which is robust in terms of distance from an object immediately in front up to an object which is comparatively far away since data using an optical signal having a high directivity as a carrier is received.

Here, on the transmission apparatus side, digital data to be transmitted is modulated in accordance with a predetermined modulation method, and the data is finally transmitted as an optical signal composed of a pattern of variations of the brightness of the light source. For example, by using ASK modulation in which bits are represented by the on/off state of the amplitude of a carrier, the data is transmitted as an optical signal composed of a flashing pattern in which the light source repeats turning on and off, or by using AM modulation, the data is transmitted as an optical signal composed of the intensities of the brightness of the light source. In addition, various modulation methods, such as FM modulation and FSK modulation in which bits are represented by variations in the frequency of a carrier, a baseband method in which a bit sequence of digital data to be sent is directly represented by a flashing pattern, may be adopted. On the transmission apparatus side, from the viewpoint of noise immunity, a modulation process, such as intensity modulation and frequency modulation, is applied on the baseband signal, and the signal may be sent as an optical intensity and an optical frequency signal rather than a flashing pattern. In such a case, on the receiving apparatus side, by applying a demodulation process corresponding to the modulation method on the transmission side, the transmission data can be reproduced.

The data receiving apparatus in accordance with the third aspect of the present invention may further comprise an application part for performing processing services corresponding to the transmission data decoded on the basis of the photoreceived position of the optical signal on the two-dimensional photoreceiving surface and from the photoreceived optical signal.

The application part may extract, based on the decoded transmission data, the ID of the real-world object in which the light source which emits an optical signal is disposed, the network address, the host name, the resource identifier such as the URL (Uniform Resource Locator) or the URI (Uniform Resource Indicator), data/content, program code, and other object-related information.

The data receiving apparatus in accordance with the third aspect of the present invention may further comprise a communication medium for connecting each real-world object to a user terminal. A data transmission apparatus for performing data transmission by using an optical signal is disposed in the neighborhood of the real-world object. In such a case, the application part may obtain the address of the real-world object on the communication medium on the basis of the data decoded from the optical signal, and may establish a connection between the user terminal and the real-world object, thereby realizing a gaze-link metaphor (to be described later).

Furthermore, the data receiving apparatus in accordance with the third aspect of the present invention may further comprise connection means for accessing an external information providing space such as the WWW. In such a case, the application part may search the information providing space on the basis of the data obtained by decoding the optical signal, and may extract information content related to the real-world object.

Furthermore, the data receiving apparatus in accordance with the third aspect of the present invention may further comprise captured-image processing means for capturing an ambient image according to the brightness (shade) which is photoreceived on the two-dimensional photoreceiving surface. Furthermore, the data receiving apparatus in accordance with the third aspect of the present invention may further comprise image display means for displaying such a captured image.

In such a case, the application part may display a captured image on a screen, and also may display the data obtained by decoding the optical signal in an overlaid manner, thereby realizing an augmented reality system such as "NaviCam".

Furthermore, on the transmission apparatus side, by increasing the output in the light-emitting section, the transmission of an optical signal at a long distance can be realized. However, when the receiving apparatus receives an optical signal having a strong output at a short distance, the photoreceived intensity is too strong, an obstacle such as saturation (the saturation of the photoreceiving device) occurs in the photoreceiving section, and the reproduction of significant data becomes impossible. In such a case, on the receiving apparatus side, the photoreceiving surface of the photoreceiving section may be divided into an area in which the photoreceived signal is too strong and data reproduction is impossible due to saturation of the photoreceiving device, an area in which the photoreceived signal has a sufficient intensity and data reproduction is possible, and an area in which the photoreceived signal is very weak and reception is impossible, and the transmission data may be decoded by using the photoreceived signal from the area in which data reproduction is possible. Furthermore, the position of the center of gravity of the area in which data reproduction is possible may be determined, and based on this position, the spatial position of the transmission apparatus may be specified.

Based on the positional relationships among two or more optical signals detected on the two-dimensional photoreceiving surface, the application part may specify the real-world circumstances such as the spatial position and the orientation of the transmission apparatus which emits an optical signal.

A plurality of transmission apparatuses may be disposed in the real world, and optical signals may be simultaneously transmitted to one receiving apparatus. In such a case, on the receiving apparatus side in accordance with the third aspect of the present invention, the photoreceiving section may receive the optical signals from the two or more transmission apparatuses at the same time, the data processing section may separate the optical signal in accordance with the photoreceived position on the two-dimensional photoreceiving surface, and the application part may separate and detect each item of the decoded transmission data decoded in accordance with the photoreceived position on the two-dimensional photoreceiving surface. In other words, according to the receiving apparatus in accordance with the third aspect of the present invention, robust multi-channel transmission can be realized.

Furthermore, the data receiving apparatus in accordance with the third aspect of the present invention may further comprise two or more two-dimensional photoreceiving surfaces. In such a case, the application part may specify the spatial position of the transmission apparatus which emits an optical signal by performing stereo matching on the basis of the optical signal detected on each two-dimensional photoreceiving surface and the photoreceived position thereof.

Further objects, features, and advantages of the present invention will become apparent from the following detailed description of the embodiments of the present invention with reference to the attached drawings.

BEST MODE FOR CARRYING OUT THE INVENTION

Figure 1:
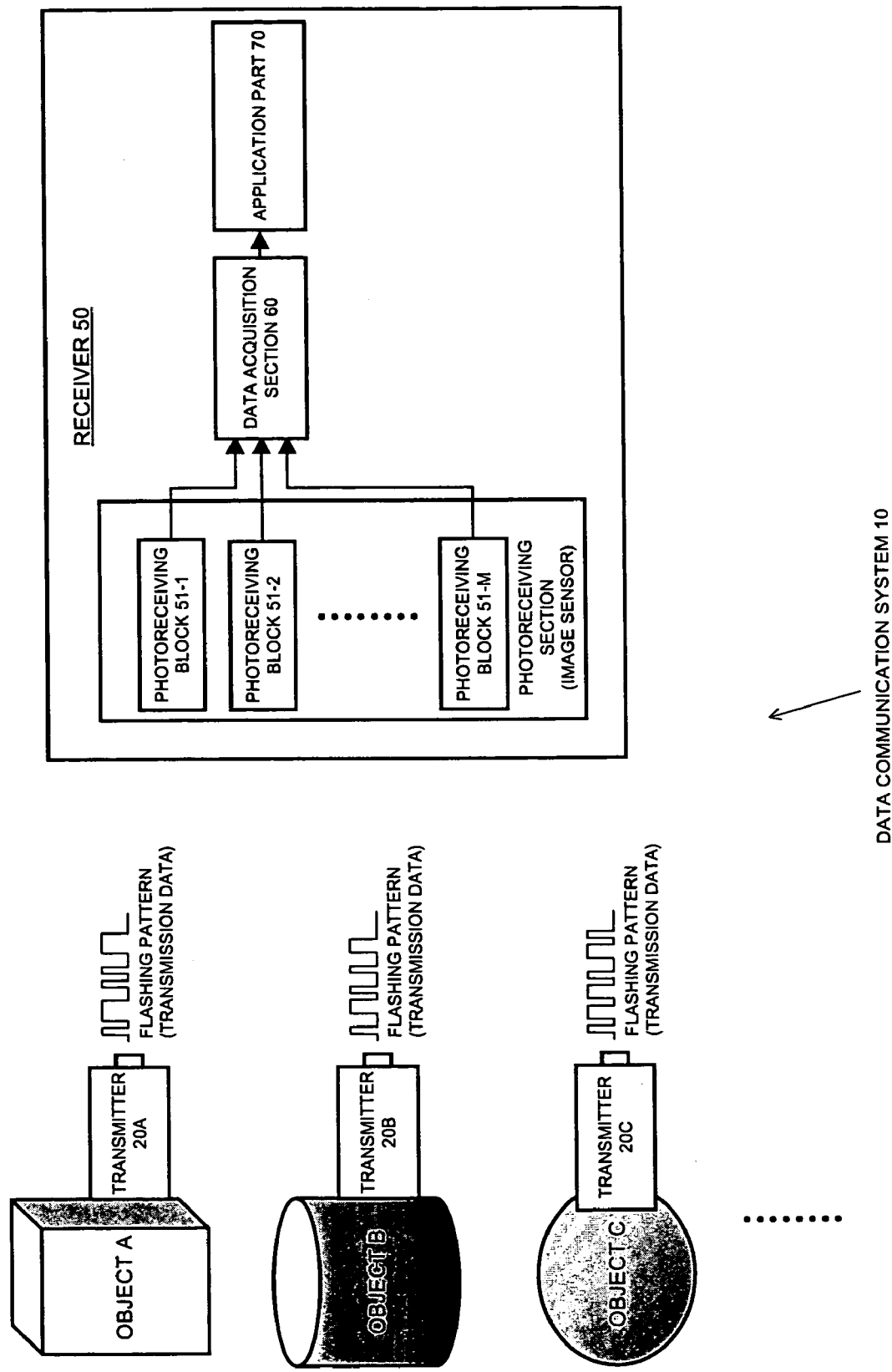
FIG. 1 schematically shows the configuration of a data communication system 10 according to one embodiment of the present invention.

The embodiments of the present invention will now be described below in detail with reference to the drawings.

A. Data Communication System Using Optical Signal

The present invention provides a data communication system which is capable of obtaining data from an object which is not connected by a communication medium such as a wired or wireless network or which is capable of directly obtaining data from an object without passing through a communication medium such as a network.

As a result of using an optical signal which carries or transmits identification information or other data in an optical form, and a high-speed two-dimensional image sensor which receives the optical signal, the data communication system of the present invention has a spatial resolution and realizes data transmission which can be used even at a far distance.

For example, a light source which flashes on and off like an LED is made to be an optical signal. Therefore, instead of being coded into a color space pattern like visual codes, the signal can be coded into a chronological optical signal, such as a flashing pattern, in which data does not change in accordance with the distance, and the data can be transmitted.

An image sensor has a configuration in which, for example, like a CMOS (Complementary Metal Oxide Semiconductor) and a CCD (Charge Coupled Device), innumerable photoreceiving devices, i.e., pixels, are arranged in a two-dimensional array, and the optical signal and the spatial information thereof are decoded by all the pixels. The image sensor, as an ordinary camera, captures an image of a scene, and can receive the optical signal arranged within the field of view of the image sensor from a far distance.

When the data communication system of the present invention is compared to an infrared remote controller, the transmission apparatus is a transmitter of the infrared remote controller, and the receiving apparatus is an array sensor in which remote-control receivers are arranged in an array. The receiving apparatus can not only capture an image of a scene as an ordinary camera, but also can output the coordinates on a scene image at which an image of an optical signal is captured and the data which is obtained by decoding the optical signal in a combined (superimposed) manner. For example, if the receiving apparatus also serving as a camera is incorporated in a network portable terminal, and the transmission apparatus is disposed in a desired object in the real world as a work environment, it becomes possible to construct an augmented reality system which is shown according to an object within the field of view (to be described later).

In an object of the real world, a transmitter formed of one or more light-emitting sections which are physically arranged in a predetermined manner can be disposed. Examples of transmission data which is output by the transmitter include the ID of the object, the network address, the host name, the resource identifier such as the URL or the URI, and other object-related information.

Of course, a transmitter in which a plurality of light-emitting sections are incorporated may be formed with respect to one real-world object. Alternatively, a plurality of transmitters may be disposed in the real world, and an optical signal is simultaneously transmitted toward predetermined receivers so as to perform multi-channel transmission (to be described later).

The transmitter modulates transmission data in a digital form of a predetermined bit length in accordance with a predetermined modulation method in order to finally code the data into an optical signal composed of a pattern of variations of the brightness of the light source, and transmits the signal. Depending on the modulation method adopted at that time, the variation pattern of the brightness of the light source differs.

For example, in amplitude shift keying (ASK) in which bits are represented by the on/off state of the amplitude of a carrier, the light source is repeatedly switched on and off, forming a flashing pattern. In AM (amplitude modulation) modulation, the intensity of the brightness while the light source remains switched on becomes a pattern. In addition, various modulation methods, such as FM (Frequency Modulation) modulation, FSK (Frequency Shift Keying) in which bits are represents by variations in the frequency of a carrier, and a baseband method in which a bit sequence of digital data to be sent is directly represented by a flashing pattern, can be adopted.

Alternatively, from the viewpoint of noise immunity, a modulation process, such as intensity modulation and frequency modulation, may be applied on a baseband signal, so that the signal is sent as an optical intensity signal or an optical frequency signal rather than a flashing pattern.

The minimum configuration of such a transmitter is a light source which flash on and off like an LED or in which intensity adjustment is possible. In order to transmit an optical signal, there is no need to be synchronized with the camera on the receiver side. It is only necessary that an optical signal representing a signal waveform, such as a flashing pattern, is generated at a fixed period in accordance with their independent operation clocks. Infrastructure of a network like a LAN is not required, and transmitters can be disposed ubiquitously in the real world.

Also, at present, for indoor use, there are various LEDs controlled by a microcomputer, etc., and these can be used as transmitters for transmitting the real-world circumstances of the real-world object. For example, a pilot lamp is incorporated in most home electronic appliances, such as a video-cassette recorder, a facsimile machine, a television, a personal computer, and a washing machine. The pilot lamp can indicate the status of a device by a color, etc., in order to show the status of the device to the user. The transmission of an optical signal by controlling such an LED by the microcomputer incorporated in the device will hardly cause an increase in the cost.

The next-generation illumination is considered to become not a fluorescent lamp or an incandescent lamp, but an LED in which energy efficiency is high and service life is semi-permanent. Since the LED has a satisfactory frequency response, even if the LED is made to flash on and off at a high speed, this is seen as an illumination which is switched on to the eye of the human being. Therefore, all the illuminations can also be used as transmitters for transmitting a different optical signal. Furthermore, when the display of a personal computer, a cellular phone, etc., shifts from a liquid-crystal display to an organic EL (Electroluminescence) device, it can flash on and off at a high speed so as to be used as an optical signal while providing a screen display to the user by using the high frequency response of the display driving.

Also, for outdoor use, the illumination of a signboard, a signal mechanism, a huge display, a warning lamp of a building, etc., can be used as a light-emitting source of the transmitter. For example, services such as location mileage, corresponding to the real-world circumstances of the user, such that, while commercial information is displayed on a huge display in front of a station, a coupon is issued when a portable terminal with a camera is directed thereto at the spot.

The optical signal used in the data communication system according to this embodiment is such that, for example, transmission data is represented as a chronological flashing pattern. In this case, recognition is possible even from a far distance. However, in order that the signal be recognized from a far distance, the signal must be a large output when compared to a case in which it is recognized at a short distance. Originally, the output of the pilot lamp and the illumination, which is used outdoors, is larger than that used indoors. For example, an indoor pilot lamp can be formed by one LED, but unless a large number of LEDs are arranged in matrix, the illumination of an outdoor signboard is insufficient. It stands to reason that, in this manner, the output of the optical signal used outdoors or used from a far distance is increased, and this is practical. It is also possible to dispose transmitters for optical signals in a ubiquitous manner regardless of being used indoors or outdoors by using the existing infrastructure.

The receiver, on the other hand, comprises a photoreceiving section formed from a two-dimensional photoreceiving surface like a two-dimensional array image sensor, photoreceives an optical signal from the light-emitting section on the transmitter side, and performs data processing. The data processing referred to herein is broadly classified to a demodulation/decoding process for the transmission data represented by the optical signal, and a spatial-information decoding process based on the flashing position on the two-dimensional photoreceiving surface.

In the former processes for the transmission data, each optical signal from each light-emitting section is replaced with data of a predetermined bit length, and based on such received data, it is possible to decode and access the ID of the object, the network address, the host name, the resource identifier such as the URL or the URI, and other object-related information.

By recognizing an object from an optical signal such as a flashing pattern, it is possible to know the physical arrangement of each light-emitting section possessed by the transmitter. For example, when the object has two or more light-emitting sections, since transmission data can be represented by the combination of these flashing patterns, the data transfer rate can be greatly increased.

In the latter processes for the spatial information, based on the extracted photoreceived position at which each flashing on the two-dimensional photoreceiving surface is detected (or the place of the photoreceiving device which has detected flashing), the spatial position of the object as a light-emitting source can be recognized. For example, if the plane where the object exists in the space is known, the detection of one light-emitting section allows the three-dimensional position thereof to be specified. Furthermore, if four or more light-emitting sections are disposed on the plane and their relative positions are known, the three-dimensional position and the orientation of the object can be measured.

On the receiver side, based on the information obtained from the optical signal such as a flashing pattern of an LED, a network connection with the object, an access to related resources, execution of a program, etc., can be performed. Furthermore, by recognizing with high accuracy the real-world circumstances such as the spatial position and the orientation of the real-world object and by using the combination of the decoded results of the transmitted data and the received real-world circumstances, it becomes possible to provide further enriched augmented reality services (to be described later).

In the data communication system according to this embodiment, a function as a receiver can be additionally included in the image sensor which captures an image of a scene like a digital camera. When the fact that the received optical signal is a flashing pattern which repeats flashing on and off at a high frequency is taken into consideration, the image sensor used as the photoreceiving section of the receiver is preferably a device capable of performing sampling at a high speed. The inventors of the present invention believe that it is reasonable to form a receiver as an additional function of the image sensor. This will be described below.

The image sensor has shifted from a CCD (Charge Coupled Device) to a CMOS (Complementary Metal Oxide Semiconductor) image sensor, and by utilizing the characteristics of the CMOS, the number of pixels is getting increasingly larger, and the speed is getting increasingly higher. An ordinary camera takes pictures at 30 fps (frames per second). However, even if a higher speed than this is achieved, since the moving-picture recognition ability of the human being is exceeded, for a high-speed camera, the use, for example, image processing, is limited. Therefore, by performing a new process in unused periods other than when capturing images at 30 fps, an additional value can be provided to the CMOS image sensor. As a result of photoreceiving and decoding an optical signal such as a flashing pattern at periods other than when capturing images, as a receiver of the data communication system according to this embodiment, an advanced form of the CMOS image sensor can be found.

When a CMOS image sensor is used as a receiver of the data communication system according to this embodiment, since an optical signal can be recognized in units of each pixel of the image sensor, the CMOS image sensor has characteristics which are not easily affected by noise such as disturbance light. Even if a certain pixel cannot recognize an optical signal due to noise, it is only necessary for another pixel to be able to recognize the optical signal.

For example, in an infrared remote controller, since a one-pixel receiver receives all the light which arrives from a fixed area, it is necessary to separate noise and data from each other by using a frequency filter and a wavelength filter. In connection with the above, when a CMOS image sensor is used as a receiver of the data communication system according to this embodiment, on the basis of the rectilinear propagation characteristics of light and the narrow viewing angle of the individual pixels arranged in a two-dimensional array, only the pixel in which a noise source and an optical signal are photoreceived in an overlaid manner is affected, and based on the sensor output from the other pixels which are not affected, it is possible to reconstruct the transmission data.

Since a digital camera is generally formed as an image sensor in which optical lenses are incorporated, there is a limitation on the distance at which a distant optical signal can be recognized. If the optical signal exists at a distance at which it is recognized at a size of one or more pixels, it is possible to decode the flashing pattern of the optical signal. However, if the distance between the digital camera as a receiver and the light-emitting source is longer than the limit distance at which an image of the optical signal is captured by one pixel, the optical intensity of the optical signal which reaches the image sensor is very weak, and thus decoding and recognition become difficult.

The characteristics of the recognition distance and the range of the camera depend on the selection of the lens. For example, if a wide lens is used, the angle of view is increased, and it is possible to capture an image an optical signal at a wide range. However, since the optical signal is formed into a small image, the number of pixels by which the signal is recognized is decreased, and thus recognition at a long distance becomes difficult. On the other hand, if a zoom lens is used, the angle of view becomes narrow, but it is possible to recognize an optical signal arriving from a far distance with a larger number of pixels. Furthermore, an optical signal which is at a place behind something by being influenced by occlusion is not recognized. The above-described features such that, although an optical signal captured as an image can be recognized, an optical signal which is too far away to be captured as an image cannot be recognized, are the same as when the human being recognizes a thing, this is natural and desirable.

The image sensor used as a digital camera is able to have features as a receiver in the data communication system according to this embodiment. Since a CMOS image sensor which is widely used at present is used as a camera built in a portable terminal such as a cellular phone or a PDA (Personal Digital Assistant) from the viewpoint of the small power consumption and the cost. If the image sensor has an optical-signal recognition function in addition to a function for capturing an image, the portable terminal is able to operate as a part of the components of the augmented reality system. For example, a video-overlay-type augmented reality system, in which, when a portable terminal having incorporated a digital camera therein is held up, an actual image and a virtual image of a computer are displayed in a superimposed manner on the screen, can be realized without using a head-mount display, a magnetic three-dimensional positioning device, etc.

Since the data communication system 10 of the present invention transmits data by using light, although data transfer which is robust in terms of distance can be performed, the fact that it is affected by the direction and the occlusion needs to be fully noted in management.

B. Implementation of Data Communication System

FIG. 1 schematically shows the configuration of a data communication system 10 according to one embodiment of the present invention. As shown in FIG. 1, the data communication system 10 comprises transmitters 20A, 20B, 20C . . . disposed for the corresponding objects distributed in the real world, and a receiver 50 carried and used by the user.

Each of the transmitters 20A . . . is disposed in a place where the surface of the object is easily seen, and comprises one or more light-emitting sections. The light-emitting section comprises, for example, a microcomputer-controlled LED. Then, an optical signal formed of a flashing pattern or a brightness variation pattern, corresponding to transmission data of a predetermined bit length (assumed to be N bits) in accordance with a display form such that the switching on of the LED represents bit 1 and the switching off thereof represents bit 0 is generated, making it possible to perform data transfer which is robust in terms of distance. Depending on the modulation method, the variation pattern of the brightness of the light source differs (described above).

Examples of the transmission data sent by each of the transmitters 20A . . . include the ID of the object, the network address, the host name, the resource identifier such as the URL or the URI, and other object-related information.

The receiver 50, on the other hand, comprises a plurality (M) of photoreceiving blocks 51-1, 51-2, . . . , 51-M, a data acquisition section 60 for centrally processing the output of each of the photoreceiving blocks 51-1 . . . , and a application part 70 for performing predetermined services in accordance with the data acquired results.

Figure 2:
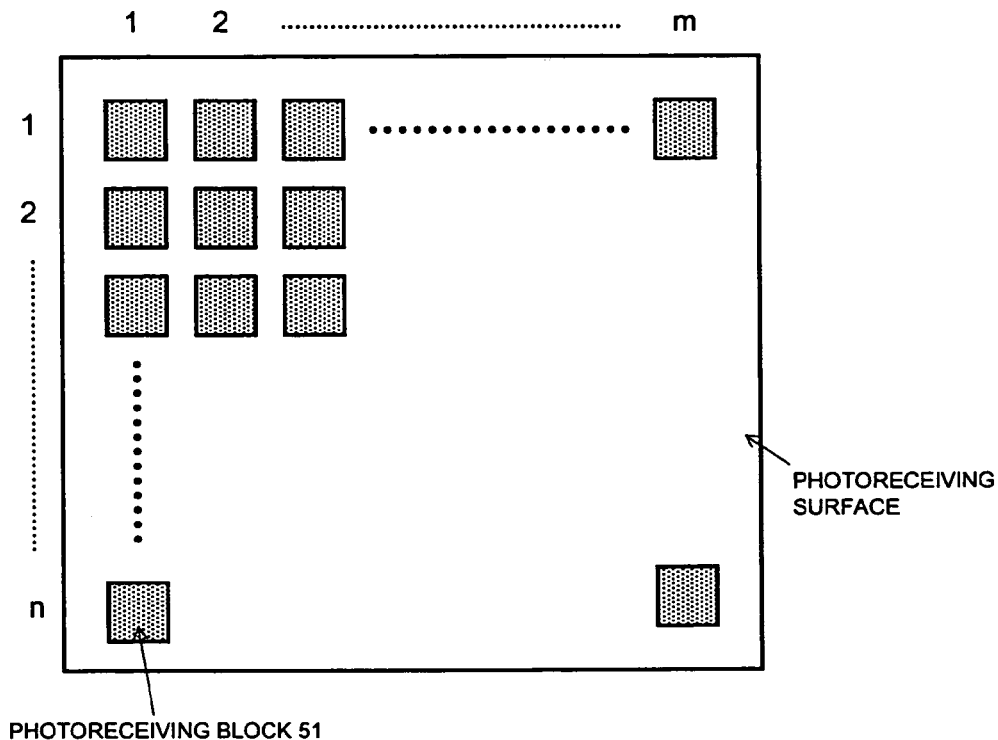
FIG. 2 shows a state in which photoreceiving blocks 51-1, 51-2, . . . are arranged in a two-dimensional matrix, forming a two-dimensional photoreceiving surface.

As shown in FIG. 2, in practice, the photoreceiving blocks 51-1, 51-2, . . . are arranged in a two-dimensional matrix of n×m (=M), and forms a photoreceiving section formed of a two-dimensional photoreceiving surface as a whole. Such a photoreceiving section may be formed by using, for example, a CMOS image sensor, and one pixel corresponds to one photoreceiving block. Since the driving speed of the CMOS image sensor is generally higher than that of the CCD sensor, even if the LED is driven at a comparatively high frequency on the transmitter side, the flashing pattern thereof can be read.

The flashing data of the LED from the transmitter 20 side is formed into an image on the two-dimensional photoreceiving surface of the photoreceiving section via a light-collection lens system (not shown), and the photoreceiving block at the position corresponding to the optical axis of the LED on the two-dimensional photoreceiving surface is able to detect the flashing pattern. Furthermore, the photoreceiving section formed of a CMOS image sensor not only simply detects a flashing signal of the LED for each pixel, i.e., for each photoreceiving block, but also functions as a camera for capturing an image formed on the photoreceiving surface.

The data acquisition section 60 centrally processes the output of each of the photoreceiving blocks 51-1, .... The processing is broadly classified into two types; a first type being a process for a flashing signal of the LED, detected for each pixel, that is, for each photoreceiving block, and a second type being a process for an image frame captured by each of the photoreceiving blocks 51-1, ..., 51-M disposed in a two-dimensional matrix.

The application part 70 performs predetermined services in accordance with the data acquired results by the data acquisition section 60. For example, the application part 70 performs image processing and image recognition on a captured image obtained from the photoreceiving section which functions as a camera and, in addition, performs processing services corresponding to the transmission data from the transmitter 20, decoded on the basis of the data acquired results.

The transmission data from the transmitter 20 contains the device ID, the network address, the host name, the resource identifier such as the URL or the URI, and other object-related information, and the application part 70 is able to perform processes related to an object. For example, based on the URL decoded from the received optical signal, information related to the object can be searched for in a WWW (World Wide Web) information providing space, the searched results can be displayed, and the searched results can be displayed in an overlaid manner on the image captured by the camera (NaviCam (to be described later)). Furthermore, based on the device ID of the object and the network address, which are decoded, it is possible to establish a network connection between the object and the user terminal (gaze-link (to be described later)).

The receiver 50 is configured in such a manner that, for example, a digital camera using a CMOS image sensor is connected to a computer via an interface such as a USB (Universal Serial Bus). In such a case, the application part 70 corresponds to an application executed on the computer, and is able to display a synthesized image such that a computer image based on the digital data decoded from the optical signal is superimposed on the captured (scene) image input from the digital camera.

Although not shown in FIG. 1, in order to receive an optical signal more suitably in each photoreceiving block which is a constituent of the image sensor, optical parts described below may be used. It should be fully understood that these optical parts have corresponding functioning of the circuit parts used for signal processing in electrical communication.

(1) Optical Lens and Telephoto/Wide-Angle Lens

As a signal amplifier, an optical lens, such as a light-collection lens, may be used. Furthermore, a telephoto lens and a wide-angle lens may be used as signal directivity control parts. When zoom-in is performed, the number of pixels capable of performing reception is increased, with the result that redundancy increases. Furthermore, since the range is narrowed, the directivity can be controlled.

When set to wide (zoom-out), the directivity is increased, and thus it is possible to receive signals from transmitters in a wide range. However, since an image of one signal is captured to be small, recognition becomes difficult from a far distance.

By operating the optical system, it is possible to search for the position of the transmitter. For example, when the optical system achieves a sharp focus, the intensity of the signal which enters each pixel becomes a maximum, and robust communication is performed. When the optical system falls a little out of focus, the optical signal is photographed as a blurred image by a still larger number of pixels, with the result that communication becomes robust by an amount corresponding to the increase in the number of pixels by which the signal is received. However, if the optical system falls out of focus too much, the photoreceived intensity of the signal is decreased, and the number of pixels which can receive the signal is also decreased.

Furthermore, when the lens is moved at a gate angle, the receiving directivity of the receiver can be controlled. It becomes unnecessary to rotate the entire receiver with a swivel.

(2) Aperture and ND filter

As a signal attenuator, an aperture can be used.

In a case where the pixels of the image sensor saturate because the optical signal transmitted by the transmitter is too strong, by attenuating the photoreceived signal using an aperture, an ND filter, etc., the level is adjusted to the signal intensity in which reception is possible, making it possible to perform communication.

(3) Color Filter and Prism

As bandwidth separation parts, color filters may be used. When color filters of RGB are provided at, for example, a lattice-shaped pattern in each pixel of the two-dimensional photoreceiving surface in the photoreceiving section, each pixel receives only the signal of the wavelength corresponding to the filter color. For example, in a case where the transmitter side has LEDs of each light-emitting color of RGB and a different optical signal is sent as a result of being independently driven for each light-emitting color, the receiver side can receive the signal which is separated via a color filter. When each signal component of RGB is superposed one on another, a white color is produced, and three-channel transmission is performed.

(4) Lens Hood, Deflection Filter, and Lens Cover

A lens hood and a deflection filter can prevent disturbance light, which is not related to the signal source, from entering the optical lens.

Furthermore, by shielding the lens with a lens cover, unnecessary communication can be blocked. For example, by covering only the right half of the lens with a lens cover, it is possible to receive only the optical signal from the transmitter which exists in the field of vision of the left half.

(5) Mirror, Prism, and Optical Fiber

The communication path can be bent by a mirror. For example, when a mirror, a lens, and a two-dimensional photoreceiving surface are arranged in this order, by changing the position and the angle of the mirror, the receiving area of the receiver 50 can easily be switched.

Furthermore, by using an optical fiber, it is possible to make a receiver 50 having a receiving (photoreceiving) section with a small front end.

B-1. Transmitter

Figure 3:
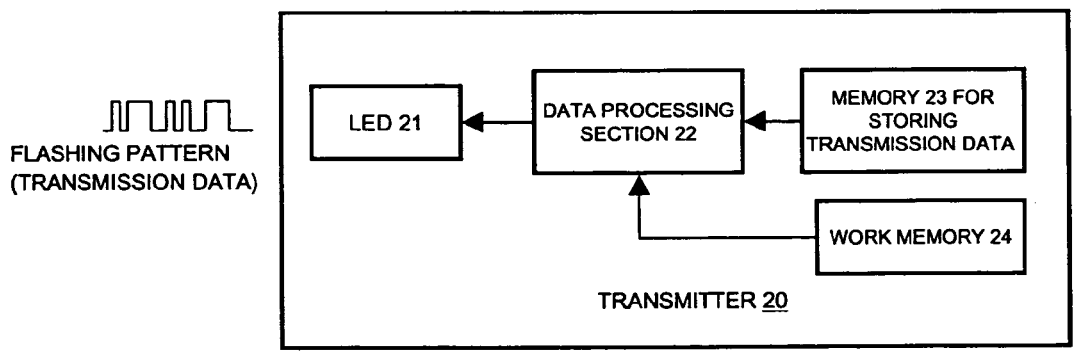
FIG. 3 schematically shows the internal configuration of a transmitter 20.

FIG. 3 schematically shows the internal configuration of a transmitter 20. As shown in FIG. 3, the transmitter 20 comprises an LED 21 for representing bits 1 and 0, a data processing section 22 for controlling the flashing operation of the LED 21 in accordance with the contents of the transmission data, a transmission data storing memory 23 for temporarily storing N-bit transmission data (payload), and a work memory 24 for sequentially writing data for one bit among the transmission data composed of N bits while shifting the bit position. For example, the transmitter 20 is able to perform baseband transmission of digital data.

The data transfer rate of the transmitter 20 is determined by the driving speed at which the LED 21 is made to flash on and off. For example, in the case of an ordinary light-emitting diode product which is currently put on the market, the light-emitting diode can be driven to flash on and off at a frequency of approximately 4 kHz. However, this undergoes a limitation of the response speed possessed by the photoreceiving block 51 on the receiver 50 side.

For example, when a CCD image sensor is used as a photoreceiving section in which the photoreceiving blocks 51 are arranged in a two-dimensional matrix, the response speed thereof is approximately 60 Hz, and this is too slow to transmit and receive the flashing data of the LED 21. On the other hand, in the case of the above-described CMOS image sensor, since it has a response speed of 12 kHz or higher, even if the LED 21 is driven at the highest speed on the transmitter 20 side, the receiver 50 side will be able to sufficiently detect the flashing pattern.

When the transmission data is made to be 8 bits long, it is possible to transmit 255 kinds of data at a time. The transmission data with a length of 8 bits is subjected to Manchester coding by a carrier of 4 kHz, and the resulting data is transmitted as 22-bit packets. As a result, even if the optical signal is hidden during packet transmission due to an obstacle, etc., the data can be sent in units of packets.

A small transmitter in which one LED is made to flash on and off may be provided for a short distance and indoors, and a large transmitter in which a plurality of LEDs are arranged in matrix may be provided for a far distance.

Figure 4:
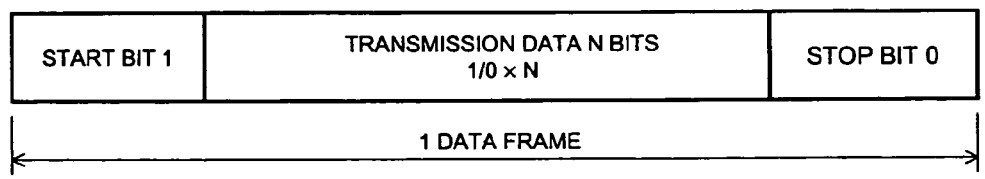
FIG. 4 schematically shows the structure of a data frame which is sent as a flashing pattern of an LED from the transmitter 20.

FIG. 4 schematically shows the structure of a data frame which is sent as a flashing pattern of an LED from the transmitter 20. As shown in FIG. 4, one data frame is formed in such a manner that transmission data (payload) with a length of N bits is interposed between a "start bit" of bit 1 and a "stop bit" of bit 0. As has already been described, the transmitter 1 according to this embodiment represents bit 1 by the turning on of light and represents bit 0 by the turning off of light.

Figure 5:
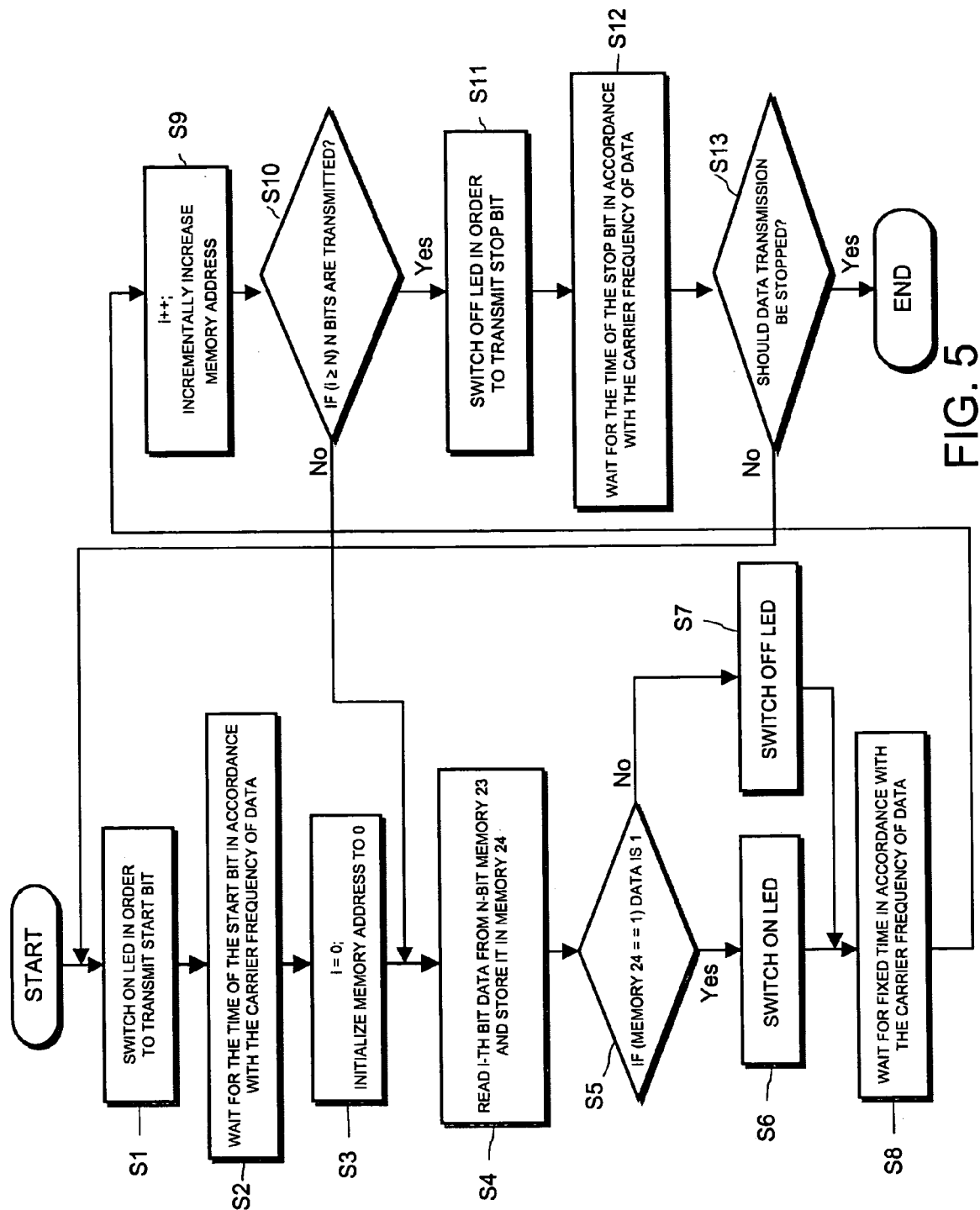
FIG. 5 is a flowchart showing a processing procedure for sending data frames in accordance with the flashing of the LED in the transmitter 20 shown in FIG. 3.

FIG. 5 shows in a flowchart a processing procedure for sending data frames in accordance with the flashing of the LED in the transmitter 20 shown in FIG. 3. This processing procedure is realized in a form in which predetermined program code is executed in the data processing section 22. The data transmission procedure will now be described below with reference to this flowchart.

Initially, in order to transmit the start bit, the LED 21 is switched on (step S1).

Next, waiting is performed for the time of the start bit in accordance with the carrier frequency of the data (step S2), and the address (bit position) i of the transmission data storing memory 23 is initialized to 0 (step S3).

Then, the data at the i-th bit position is read from the memory 23 for storing transmission data with a length of N bits, and the data is temporarily stored in the work memory 24 (step S4).

The data processing section 22 determines whether or not the value (i.e., the i-th bit value of the transmission data with a length of N bits) of the work memory 24 is 1 (step S5).

When the value written into the i-th bit position of the transmission data is 1, the LED 21 is switched on to represent bit 1 (step S6), otherwise the LED 21 is switched off to represent bit 0 (step S7).

Next, waiting is performed for a fixed time corresponding to the carrier frequency of the data (step S8). The memory address of the transmission data storing memory 23, i.e., the bit position i, is incremented by 1 (step S9), and then it is determined whether or not the bit position i has reached N (step S10).

If the bit position i has not yet reached N, the process returns to step S4, where the data at the position of the next bit is read from the transmission data storing memory 23, and a process for transmitting the corresponding bit, which is the same as that described above, is repeatedly performed.

If the bit position i has reached N, since the process for transmitting transmission data (payload) with a length of N bits has been completed, after the LED is switched off to transmit the stop bit (step S11), waiting is performed for the time of the stop bit in accordance with the carrier frequency of the data (step S12).

When data transmission is to be continuously performed, the process returns to step S1, where the same operation as that described above is repeatedly performed (step S13).

In this manner, baseband transmission in which digital data is coded into a flashing pattern of the light source can be performed. Of course, rather than the flashing pattern, the digital data may be coded into an optical signal formed of a variation pattern of brightness, and may be transmitted. Furthermore, for the data communication system according to the present invention, various modulation methods may be adopted. As a result of ASK modulation in which bits are represented by the on/off state of the amplitude of the carrier, the light source repeats switching on and off, thus forming a flashing pattern. Furthermore, in the AM modulation, while the light source remains switched on, the intensity of the brightness becomes a pattern. In addition, FM modulation, FSK modulation in which bits are represented by variations in the frequency of the carrier, etc., may be adopted. From the viewpoint of noise immunity, intensity and frequency modulation processes may be applied on the baseband signal, and the signal may be sent as an optical intensity signal and an optical frequency signal rather than a flashing pattern.

In the example of the configuration of the transmitter 20 shown in FIG. 3, although only one light-emitting diode 21 for sending data in the form of flashing data is included, two or more light-emitting diodes may be included. In such a case, since the transmission data can be represented by a combination of flashing patterns, the data transfer rate is greatly increased. Furthermore, since a plurality of communication paths can be formed, the bandwidth is also increased. In this case, connections corresponding to the number of LEDs (or corresponding to the number of pixels on the receiver side, which have received light) are established between the transmitter and the receiver.

Figure 6:
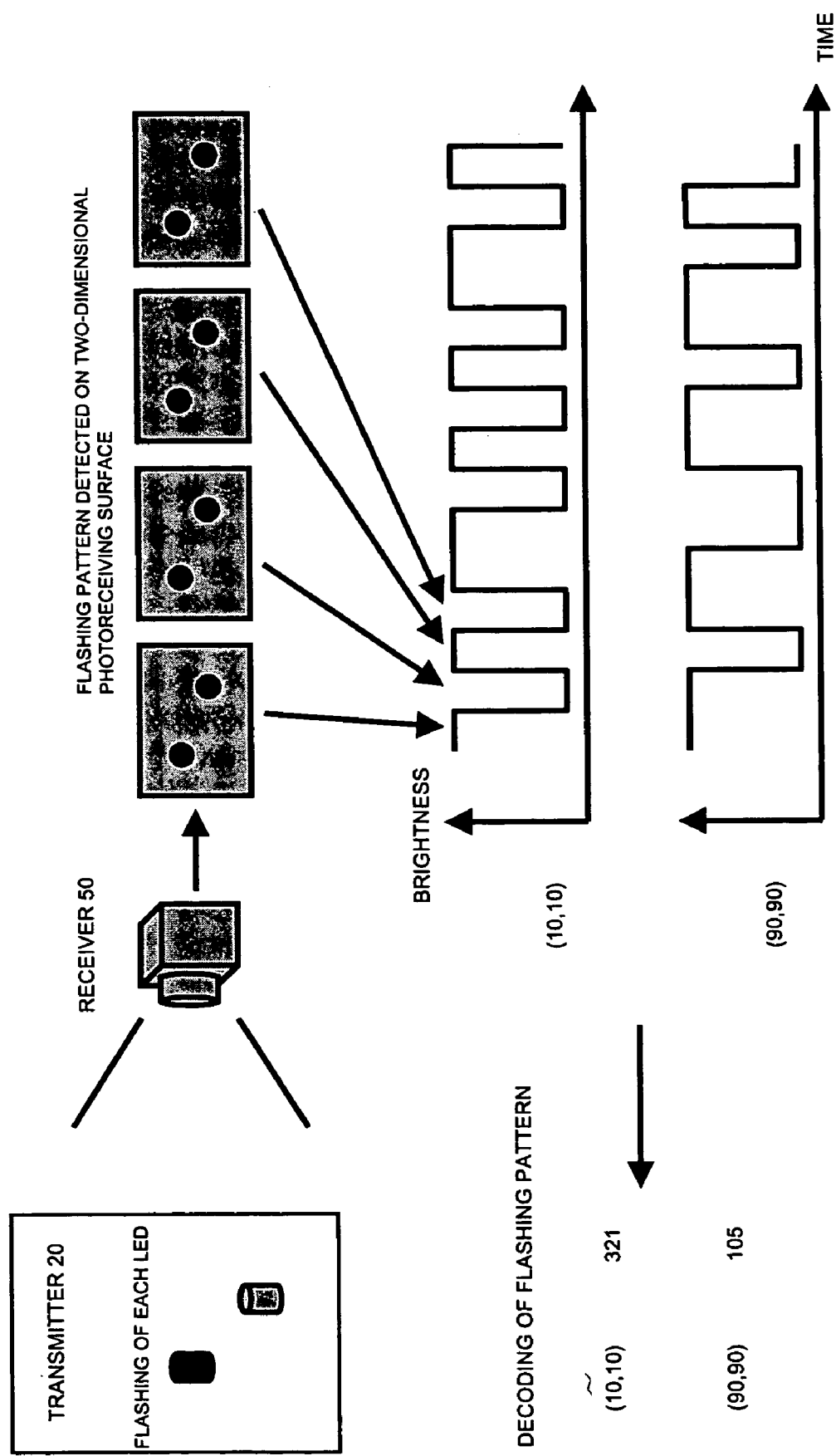
FIG. 6 shows an example of the operation of a data communication system 10 when the transmitter 20 includes two light-emitting diodes.

FIG. 6 shows an example of the operation of the data communication system 10 when one transmitter 20 includes two light-emitting diodes. In the example shown in FIG. 6, it is assumed that the transmission data is coded into an optical signal formed of a flashing pattern of the light source and is transmitted.

In this case, the flashing pattern of each light-emitting diode is formed into an image on the two-dimensional photoreceiving surface on the receiver 50 side by a light-collection lens system (not shown in FIG. 6), and is detected by the photoreceiving block at the position corresponding to the physical position of each light-emitting diode in the real space.

For example, when the position of the photoreceiving block, at which the switched-on light of one of the light-emitting diodes is formed into an image, is set to (10, 10), and the position of the photoreceiving block, at which the switched-on light of the other light-emitting diode is formed into an image, is set to (90, 90), at the position of each photoreceiving block (pixel), the flashing pattern of the corresponding light-emitting diode is detected as a variation in the photoreceiving intensity (brightness) with respect to time. By performing a binarization process on the photoreceived intensity at a predetermined threshold value, a bit sequence of 1 and 0 corresponding to the original transmission data can be reconstructed.

Even if a plurality of light-emitting diodes 21 are provided and a plurality of optical signals are simultaneously transmitted therefrom, since the receiver 50 side has a two-dimensional photoreceiving surface, it is possible to spatially separate and detect each optical signal. Therefore, since the transmission data can be represented by a combination of a plurality of transmission signals, the data transfer rate is greatly increased. Furthermore, it is also possible to represent the transmission data by using the spatial position, the orientation, etc., of the optical signals which are simultaneously transmitted.

The transmitter 20 sends an optical signal representing transmission data of a predetermined bit length from the light-emitting section 21. For example, by a light-emitting section 32 displaying a flashing pattern in which the bit values of the digital data to be sent are exactly represented as it is by using the transmission data in a binary form as a baseband signal, data transmission is possible. Furthermore, an optical signal in which the transmission data which is temporarily scrambled or interleaved is represented as a flashing pattern may also be sent from the viewpoint of noise immunity. Of course, various other modulation methods may be used (to be described later).

The transmitter 20 may modulate, for example, the transmission data into a frequency fractal signal such that the meaning of the data at a low speed differs from that at a high speed, and may send the signal. For example, the data is formed into a signal such that, when sampling is performed at 1 kHz, the signal is formed as A, and when sampling is performed at 20 kHz, the signal is formed as B.

Furthermore, since, on the receiver 50 side, each pixel on the two-dimensional photoreceiving surface is independently driven to receive light, the transmitter may modulate the carrier frequency of the signal. During remote data transmission, the transmitter 20 may flash on and off slowly when it is foggy.

Furthermore, the transmitter 20 may modulate the carrier wavelength of the signal. Even if the wavelength of the optical signal which is a carrier is changed, it is not particularly necessary to change the configuration of the receiver side. For example, by sequentially sending data A for each color component of RGB, the color can be changed as the illumination without causing the data to be changed. Even if the wavelength of the carrier is dynamically changed, it is possible for the receiver side to receive the signal by the same pixel. Furthermore, the wavelength may be switched in accordance with the communication environment. For example, when it is foggy or is raining, the optical signal is likely to be attenuated. However, by performing data transmission by using a fog lamp in order to switch to light of a wavelength component having superior transmittancy, it is possible to safely transmit data even from a distant location.

Furthermore, on the transmitter 20 side, by using a mirror, a light-collection lens, and a plurality of LEDs in such a manner as to be switched, it is possible to control the directivity of the optical signal to be sent. For example, even when a plurality of receivers 50 are distributed in the communication environment, it is possible to transmit data to only a specific receiver 50 by controlling directivity.

On the other hand, due to the rectilinear propagation characteristics of light, only the receiver 50 which is able to directly see the transmitter 20 can receive the optical signal. For this reason, the indirect light sent by the transmitter 20 does not become noise for the other transmitters. Therefore, the transmitter 20 may be made non-directional so that reception is possible from any direction.

Furthermore, when the transmitter 20 is used outdoors or at a long distance, in order to increase the output of the optical signal, the transmitter can be formed in such a manner that a large number of LEDs are arranged in matrix so as to form the light-emitting section 21 (described above).

In this case, the light-emitting intensities of individual LEDs need not to be even. When the same signal (the same flashing pattern) is transmitted at different light-emission intensities, the receiver side may perform a receiving process by using the detected signal of the photoreceiving device which have successfully received light at a just enough intensity (without causing saturation).

In a case where a large number of LEDs are combined in matrix and an optical signal is to be transmitted, the optical signal is received as one large data in the receiver 50 which is far away. However, when zooming is performed to receive the signal, it can be separated into a plurality of different items of data. For example, when seen from a distant location, the signal is a single transmission signal C, but when the signal is seen from near, it is seen as different signals A and B in a separated manner (that is, the signal of A+B=C). In such a case, in order to see the signal from a distant location, energy is required for C. When the signal is seen from near, the bandwidth and the resolution of the receiver are necessary.

B-2. Receiver

Figure 7:
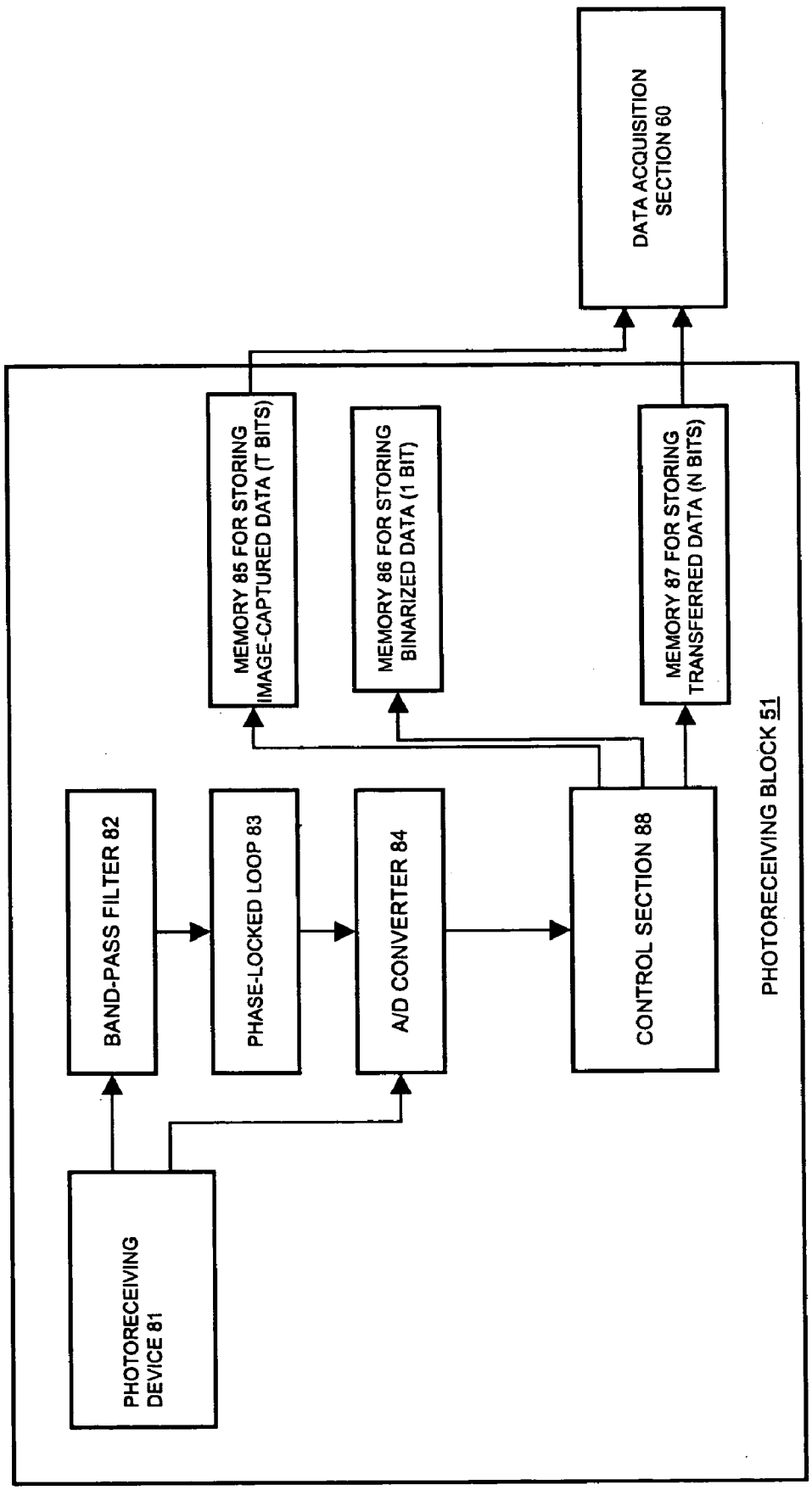
FIG. 7 schematically shows the internal configuration of one photoreceiving block 51 in a receiver 50.

FIG. 7 schematically shows the internal configuration of one photoreceiving block 51 in the receiver 50. As shown in FIG. 7, one photoreceiving block 51 comprises a photoreceiving device 81 for generating an electrical signal corresponding to the amount of received light, a band-pass filter (BPF) 82, a phase-locked loop (PLL) 83, an A/D converter 84, a memory 85 for storing image-captured data, a memory 86 for storing binarized data, a memory 87 for storing transferred data, and a control section 88 for centrally controlling the photoreceiving block 51 so as to be driven synchronously.

The photoreceiving device 81 comprises, for example, a CMOS sensor device. Processing modules for driving photoreceiving devices and for decoding, other than the photoreceiving device 81, may be formed by IC chips such as FPGA (Field Programmable Gate Array). The image-captured data storing memory 85 is used to temporarily store the digital values (assumed to have a T-bit resolution) of the image-captured data by the photoreceiving device 81 when the receiver 50 is operating as a camera (to be described later).

As has already been described, it is possible for the image sensor for capturing an image of a scene, like a digital camera, to be additionally included with functions as the receiver 50. For example, when an optical signal is to be transmitted as a high-speed flashing pattern, a CMOS image sensor which is a device capable of sampling at a high speed is used. An ordinary digital camera takes pictures at 30 fps. Even if the speed is made higher, since the moving-image recognition ability of a human being is exceeded, by performing a process for receiving an optical signal by using unused periods other than when an image of a scene is captured at 30 fps, it is possible to provide the CMOS image sensor with an added value. In the following, an operation mode in which the receiver 50 captures an image of a scene as an ordinary camera is called an "image mode", and an operation mode in which a process for receiving an optical signal is performed by using unused periods other that time is called a "decoding mode".

In the decoding mode, sampling at, for example, 12 kHz is repeated 200 times, an 8-bit optical signal of a carrier frequency 4 kHz, sent on the transmitter 20 side, is decoded by all the photoreceiving blocks of the image sensor, the optical signal can be received at 15 fps, and a recognized image can be generated (to be described later). This recognized image is a result in which the value of each pixel of the image is decoded, and contains both the transmission data represented by the optical signal and the spatial information (that is, the real-world circumstances possessed by the real-world object) of the transmitter which transmits an optical signal.

For sensing both the image and the ID by using the image mode and the decoding mode, for example, this can be realized by the following configurations.

Figure 8:
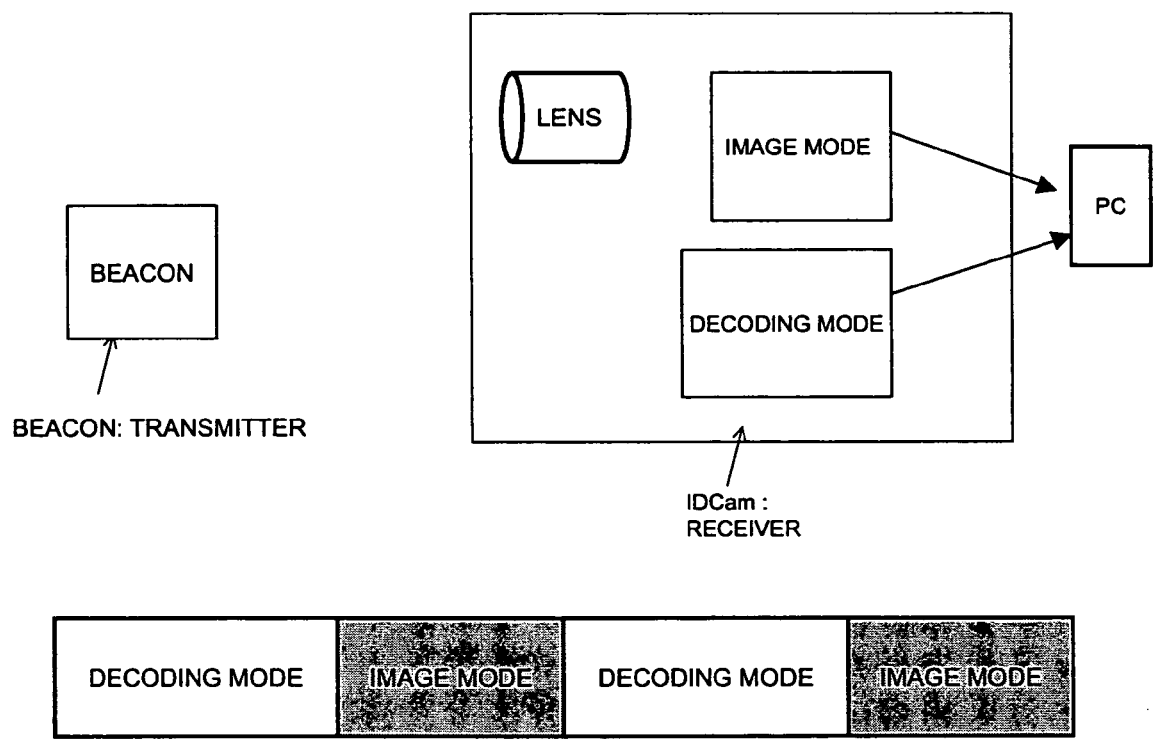
FIG. 8 shows an example of a system configuration for sensing both an image and an ID by using an image mode and a decoding mode.

(1) The image mode and the decoding mode are made to operate at different times (see, for example, FIG. 8). In this configuration, since the image mode and the decoding mode are operated at different times, it is possible to share hardware resources such as memory on a time division basis in the two modes. The driving sequence needs not to be alternate. Various modifications are possible, for example, the modes may be driven at a random sequence like decoding, decoding, image, decoding, decoding, image, the modes may be driven at a particular pattern, or still another mode may be driven at another time.

Figure 9:
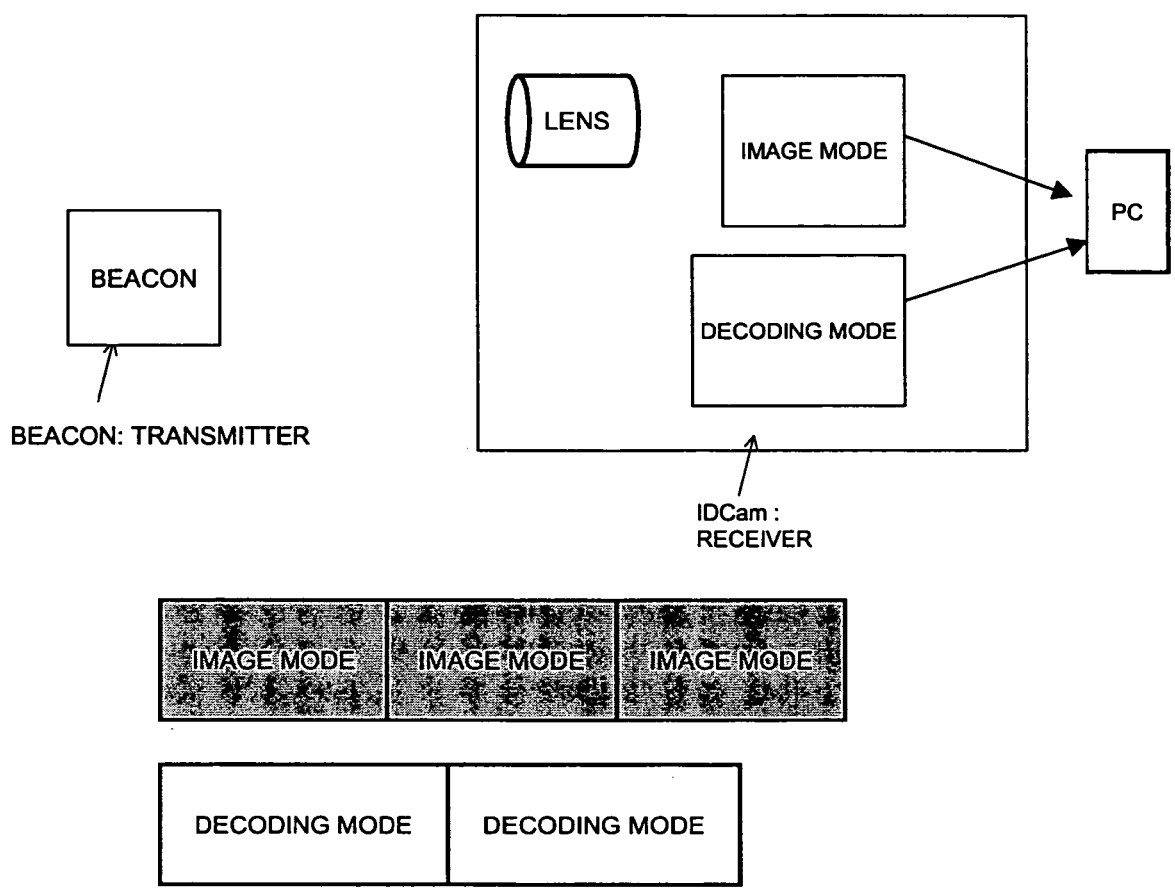
FIG. 9 shows an example of a system configuration for sensing both an image and an ID by using an image mode and a decoding mode.

(2) The image mode and the decoding mode are made to operate independently with respect to time (see, for example, FIG. 9). In this configuration, since the image mode and the decoding mode can be driven independently of each other, it is possible to change the frame rate of the image and the frame rate of the ID independently of each other. Of course, the two modes can also be driven in such a manner that the two frame rates are synchronized with each other. In this configuration, the sensing can be realized in such a manner that, for example, one photoreceiving device is connected to both an image-mode block and a decoding-mode block, and the image-mode block and the decoding-mode block are operated completely independently of each other.

Figure 10:
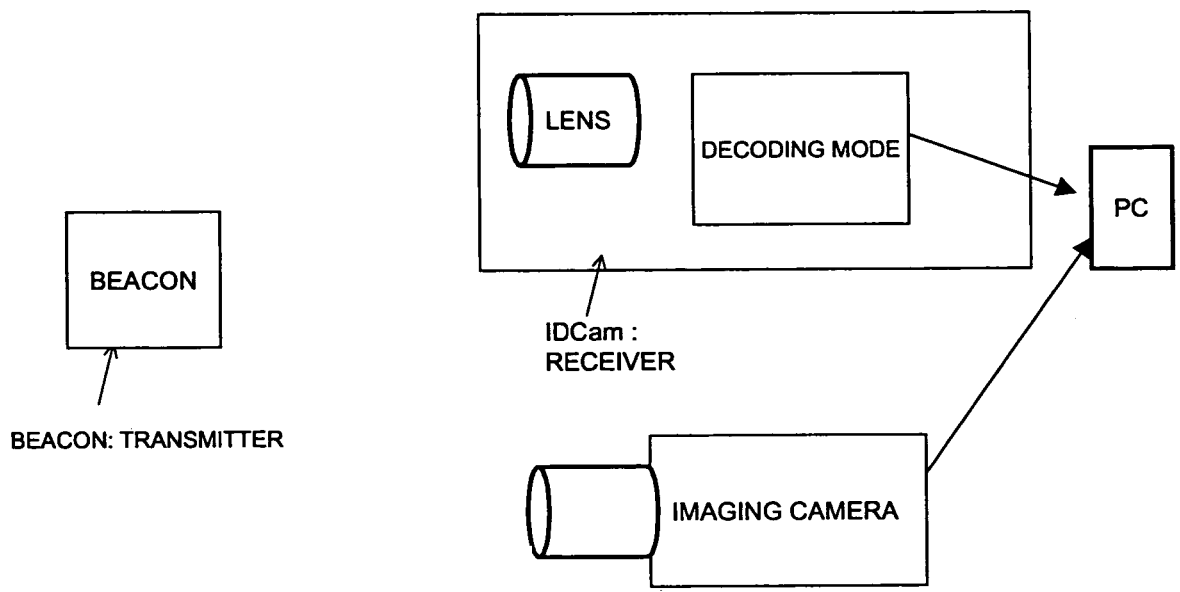
FIG. 10 shows an example of a system configuration for sensing both an image and an ID by using an image mode and a decoding mode.

(3) An image sensor which operates in the decoding mode and an image sensor which operates in the image mode are provided separately (see, for example, FIG. 10). In this configuration, two items of information can easily be synthesized. Furthermore, by separately providing an image sensor (camera, etc.) in addition to the image sensor for the decoding mode, the resolution and the quality of the captured image can easily be changed. For example, a combination in which an image sensor of 200×100 pixels (for example, an IDCam) is used for an image sensor which operates only in the decoding mode, whereas an image sensor for a high-definition TV is used for an image sensor which operates in the image mode is possible. It is not always necessary for the image sensor which operates only in the decoding mode and the image sensor for capturing an image to be synchronized with each other. Furthermore, the image sensor which operates in the decoding mode and the image sensor which operates in the image mode may include a mode other than the decoding mode and the image mode as appropriate and may operate.

A description will now be given below using an example of a configuration in which the image mode and the decoding mode are operated at different times.

Figure 11:
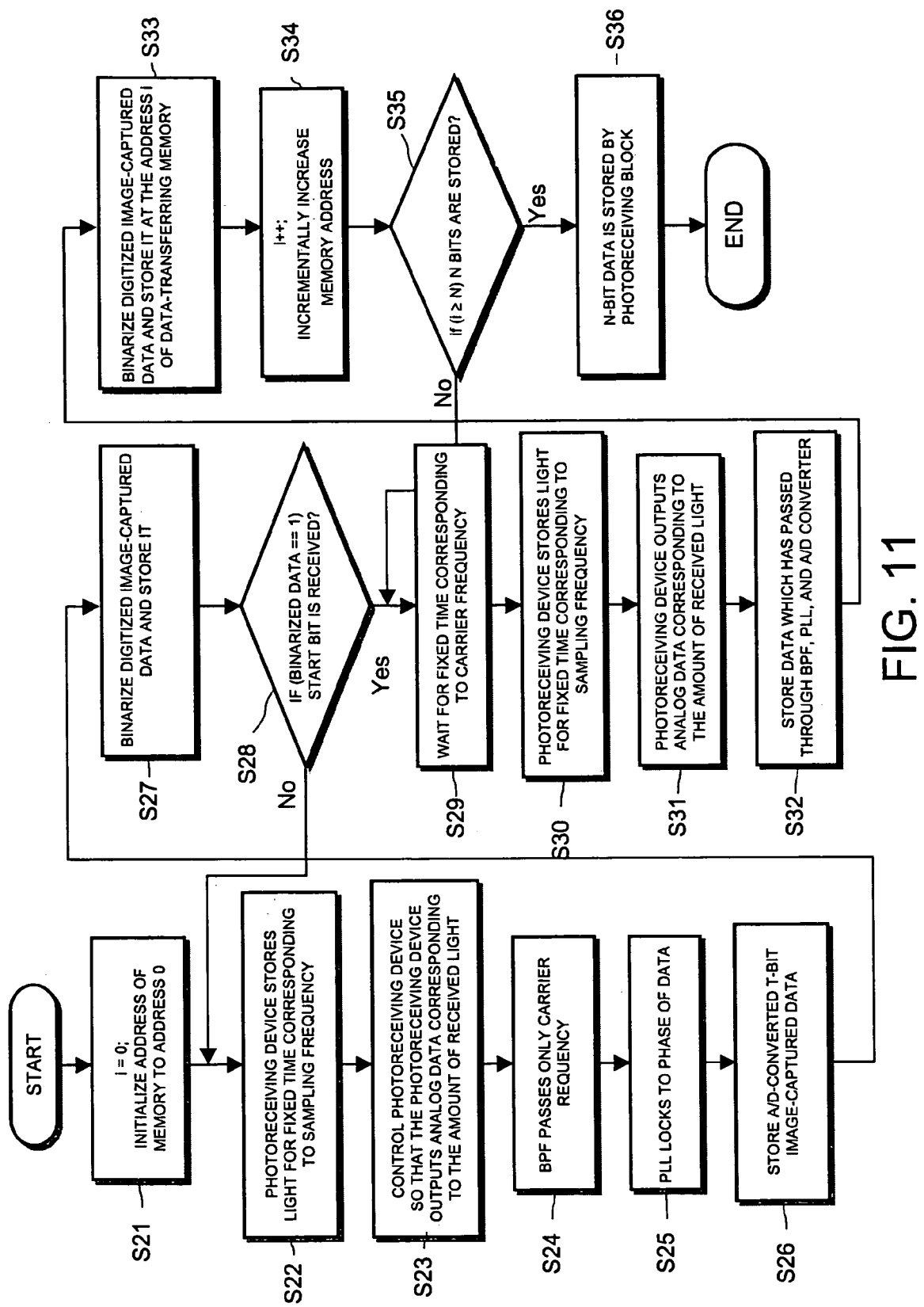
FIG. 11 is a flowchart showing a processing procedure for receiving data by alternately operating the image mode and the decoding mode in the photoreceiving block 51 having the configuration shown in FIG. 7.

FIG. 11 shows in a flowchart a processing procedure for receiving data by alternately operating the image mode and the decoding mode in the photoreceiving block 51 having the configuration shown in FIG. 7. The processing procedure shown in FIG. 11 is realized in a form in which, for example, a control section 88 executes predetermined program code. It is assumed here that, from the transmitter 20 side, an optical signal such that, for example, digital data is coded into a flashing pattern of a light source by a baseband transmission method is sent. Referring to this flowchart, a process for receiving data in one photoreceiving block 51 will be described below.

Initially, an initial value 0 is set to a variable i for specifying the bit position of transmission data with a length of N bits (step S21).

Next, after the photoreceiving block 51 is made to store light for a fixed time corresponding to the sampling frequency (step S22), the photoreceiving block 51 is controlled to output an electrical signal having analog data corresponding to the amount of the received light (step S23).

A band-pass filter (BPF) 82 passes only the carrier frequency components of the electrical signal (step S24). A phase-locked loop (PLL) 83 locks the signal which has passed through the BPF to the phase of the data (step S25).

An A/D converter 84 converts the phase-locked analog data into digital data (pixel-value data) having a T-bit resolution. This T-bit digital data is temporarily stored in the memory 85 for storing image-captured data (step S26).

Furthermore, the T-bit digital data stored in the image-captured data storing memory 85 is binarized by a predetermined threshold value, and this binarized data is temporarily stored in the binarized-data storing memory 86 (step S27).

This binarized data indicates whether or not the illumination light of the ID has been received in the corresponding photoreceiving block 51. In step S28, it is determined whether or not the data of the binarized-data storing memory 86 is bit 1, that is, whether or not the photoreceiving block 51 has received the illumination light of the ID.

When the data of the binarized-data storing memory 86 is not bit 1, that is, when the photoreceiving block 51 has not received the illumination light of the ID, the process returns to step S22, where the same processes as those described above are repeatedly performed. On the other hand, when the data of the binarized-data storing memory 86 is bit 1, that is, when the photoreceiving block 51 has received the illumination light of the ID, the process proceeds to step S29, where, after waiting is performed for the fixed time corresponding to the carrier frequency, the light is stored by the photoreceiving block 51 for the fixed time corresponding to the carrier frequency (step S30).

Then, the photoreceiving block 51 is controlled to output an electrical signal having the analog data corresponding to the amount of the received light (step S31), and the data which has passed through the band-pass filter 82, the phase-locked loop 83, and the A/D converter 84 is temporarily stored in the image-captured data storing memory 85 (step S32).

Furthermore, the T-bit digital data stored in the image-captured data storing memory 85 is binarized by a predetermined threshold value, and the binarized data is temporarily stored at address i of the transferred-data storing memory 87 (step S33). That is, the data at the i-th bit position in the N-bit transmission data, transmitted as a flashing pattern of the LED from the transmitter 20, is stored at the corresponding bit position of the transferred-data storing memory 87.

Next, the memory address i is incremented by 1 (step S34), and it is determined whether or not i has reached N (step S35).

If the memory address i has not yet reached N, the process returns to step S29, where the process proceeds to the next bit position of the transmission data from the transmitter 20, and the bit-data receiving process is repeatedly performed.

When the memory address i has reached N, since the process for receiving the N-bit transmission data (payload) has been completed and the data is stored in the transferred-data storing memory within the photoreceiving block 51 (step S36), the whole processing routine is terminated.

As described in the foregoing, the receiver 50 according to this embodiment includes an image mode which captures an image of a scene as an ordinary camera, and a decoding mode which performs a process for receiving an optical signal by using a spare time other than that. Therefore, as shown in, for example, FIGS. 8 to 10, by alternately repeating the "decoding mode" which decodes transmission data and the "image mode" which captures an image, the receiver 50 is also able to receive data sent in the form of the flashing of the LED from an object contained in the image frame thereof while the receiver 50 is operating as an ordinary video camera.

When both the scene image obtained in the image mode and the recognized image obtained in the decoding mode are to be output, for example, the image mode and the decoding mode may be alternately repeated at 15 fps.

Figure 12:
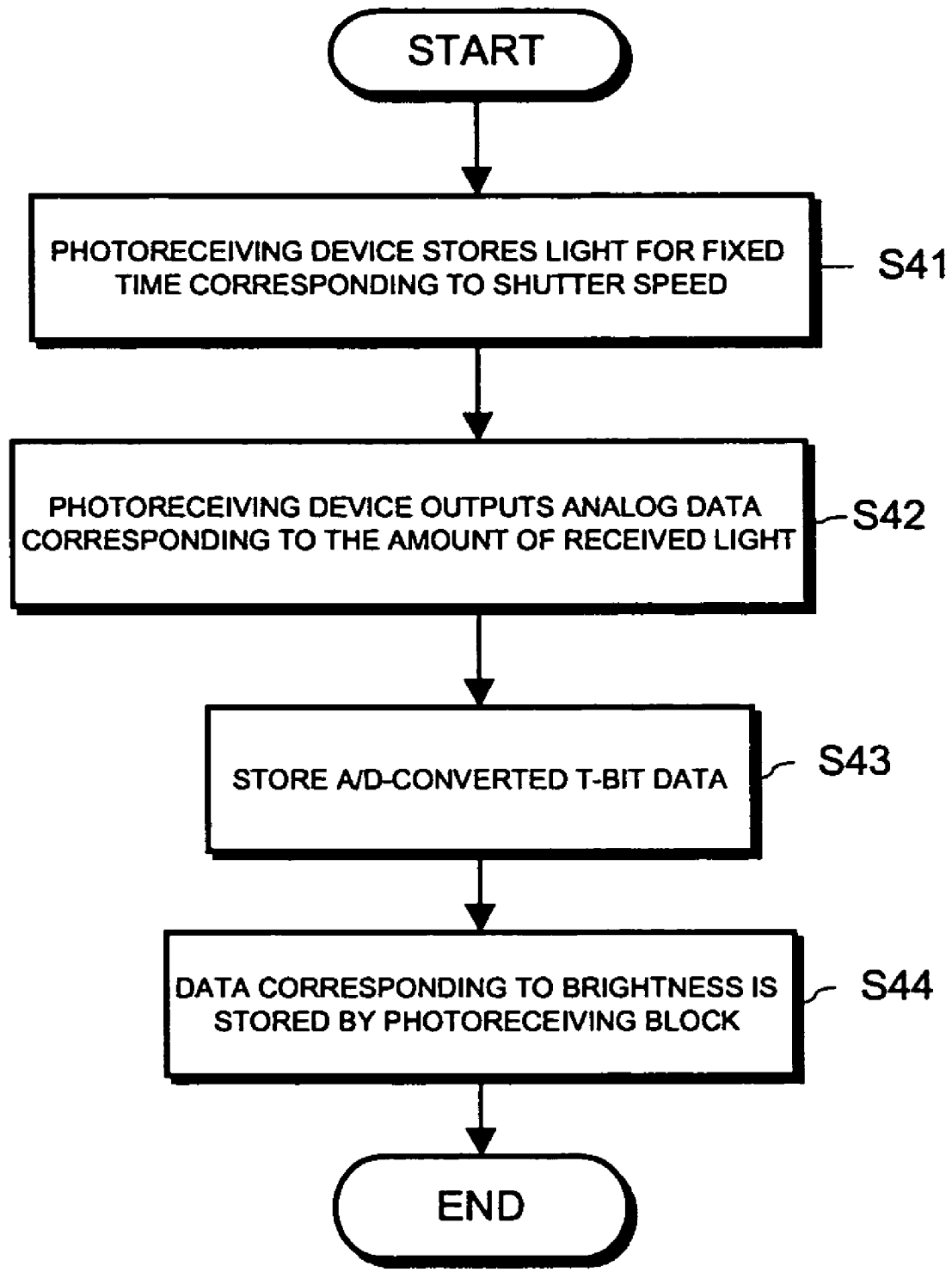
FIG. 12 is a flowchart showing an operation procedure of the photoreceiving block during the image mode.

The operation of the photoreceiving block 51 during the decoding mode has already been described with reference to FIG. 11. Therefore, the operation of the photoreceiving block 51 during the image mode will now be described below with reference to the flowchart shown in FIG. 12. The processing procedure shown in FIG. 12 is realized in a form in which the control section 88 executes predetermined program code.

Initially, the photoreceiving device 81 is made to store light for a fixed time corresponding to the shutter speed (step S41). Then, the photoreceiving device 81 outputs an electrical signal having analog data corresponding to the amount of the received light (step S42).

The analog data passes through the band-pass filter (BPF) 82, the phase-locked loop (PLL) 83, and the A/D converter 84, and is converted into T-bit digital data, after which the data is written into the image-captured data storing memory 85 (step S43).

That is, since the data corresponding to the brightness is stored by the photoreceiving block 51 (step S44), the whole processing routine is terminated.

The data acquisition section 60 is a function module for centrally processing an output from each of the photoreceiving blocks 51-1, 51-2, . . . , 51-M which form a two-dimensional photoreceiving surface. The processing contents are broadly classified into two types of a process for a flashing signal of the LED, detected for each pixel, i.e., for each photoreceiving block in the decoding mode, and a process for an image frame captured by each of the photoreceiving blocks 51-1 . . . disposed in a two-dimensional matrix in the image mode.

In the decoding mode, sampling at, for example, 12 kHz is repeated 200 times, an 8-bit optical signal of a carrier frequency 4 kHz, sent on the transmitter 20 side, is decoded by all the photoreceiving blocks of the image sensor, the optical signal is received at 15 fps, and a recognized image is generated. This recognized image is a result in which the value of each pixel of the image is decoded, and contains both the transmission data represented by the optical signal and the spatial information (that is, the real-world circumstances possessed by the real-world object) of the transmitter which transmits an optical signal. By using the scene image captured in the image mode and the recognized image in such a manner as to be made a set, it is possible to synthesize and display the position of the optical signal on the scene image and the decoded results (to be described later).

When both the scene image obtained in the image mode and the recognized image obtained in the decoding mode are to be output, for example, the image mode and the decoding mode are alternately repeated at 15 fps. The data acquisition section 60 operates at 7.5 fps in such a manner that the scene image and the recognized image of the 8-bit optical signal are made to be a set.

Figure 13:
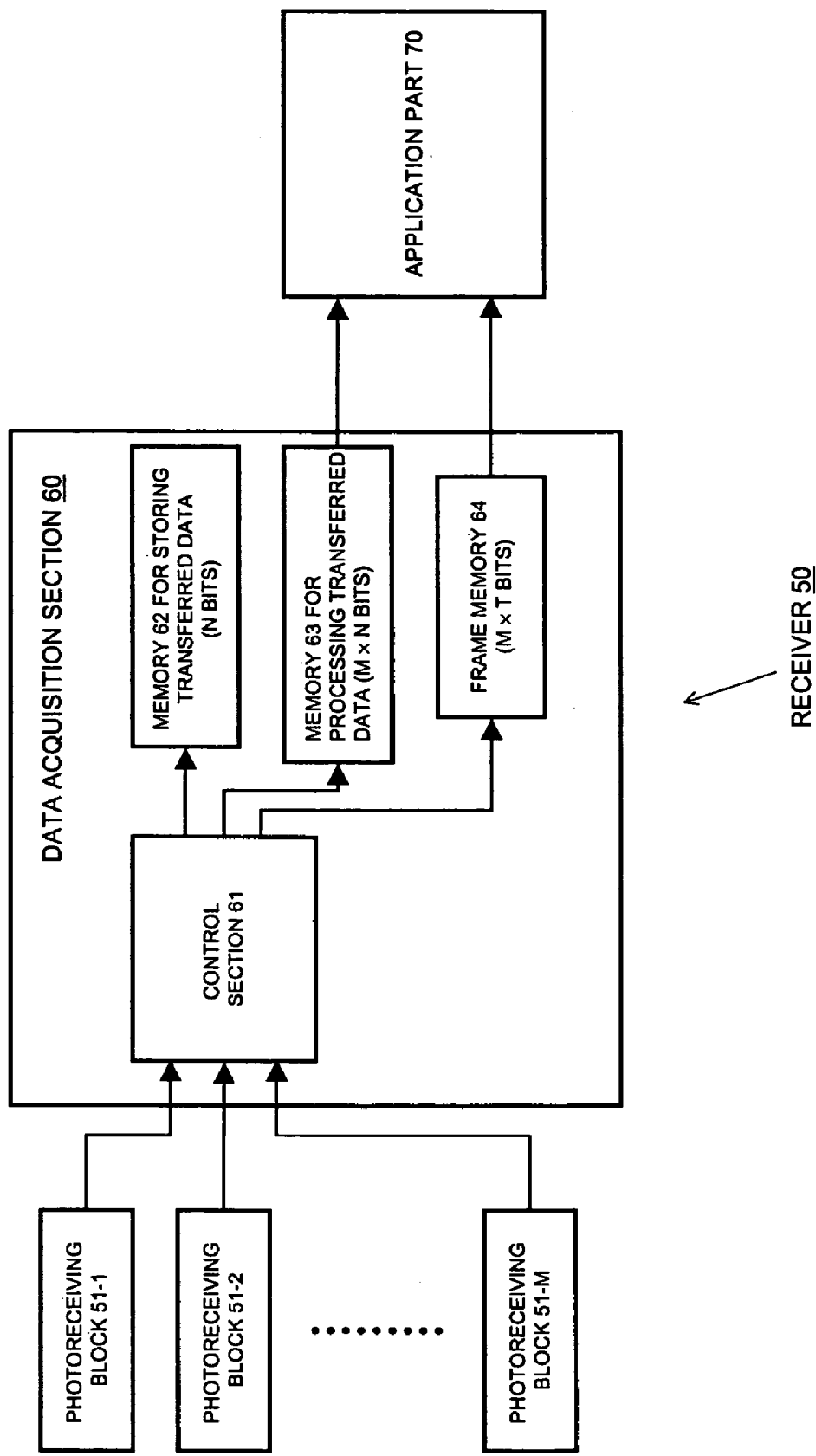
FIG. 13 schematically shows the internal configuration of a data acquisition section 60.

FIG. 13 schematically shows the internal configuration of the data acquisition section 60. As shown in FIG. 13, the data acquisition section 60 comprises a control section 61, a memory 62 for storing transferred data, a memory 63 for processing transferred data, and a frame memory 64. These processing modules can be implemented by using IC chips in, for example, an FPGA form.

The control section 61 extracts the data stored in each of the photoreceiving blocks 51-1 . . . , and performs central control of the operation of the data acquisition section 60.

In the decoding mode, each of the photoreceiving blocks 51-1 . . . stores transmission data with a length of N bits, sent from the transmitter 20, and in the image mode, it stores T-bit pixel data (described above). The control section 61 writes the N-bit transmission data read from each of the photoreceiving blocks 51-1 . . . in the transferred-data storing memory 62, and processes the transmission data by using the transferred-data processing memory 63 as a work area. Furthermore, the control section 61 writes the pixel data read from each of the photoreceiving blocks 51-1 . . . in sequence at the corresponding pixel position within the frame memory 64, forming a captured image frame.

Figure 14:
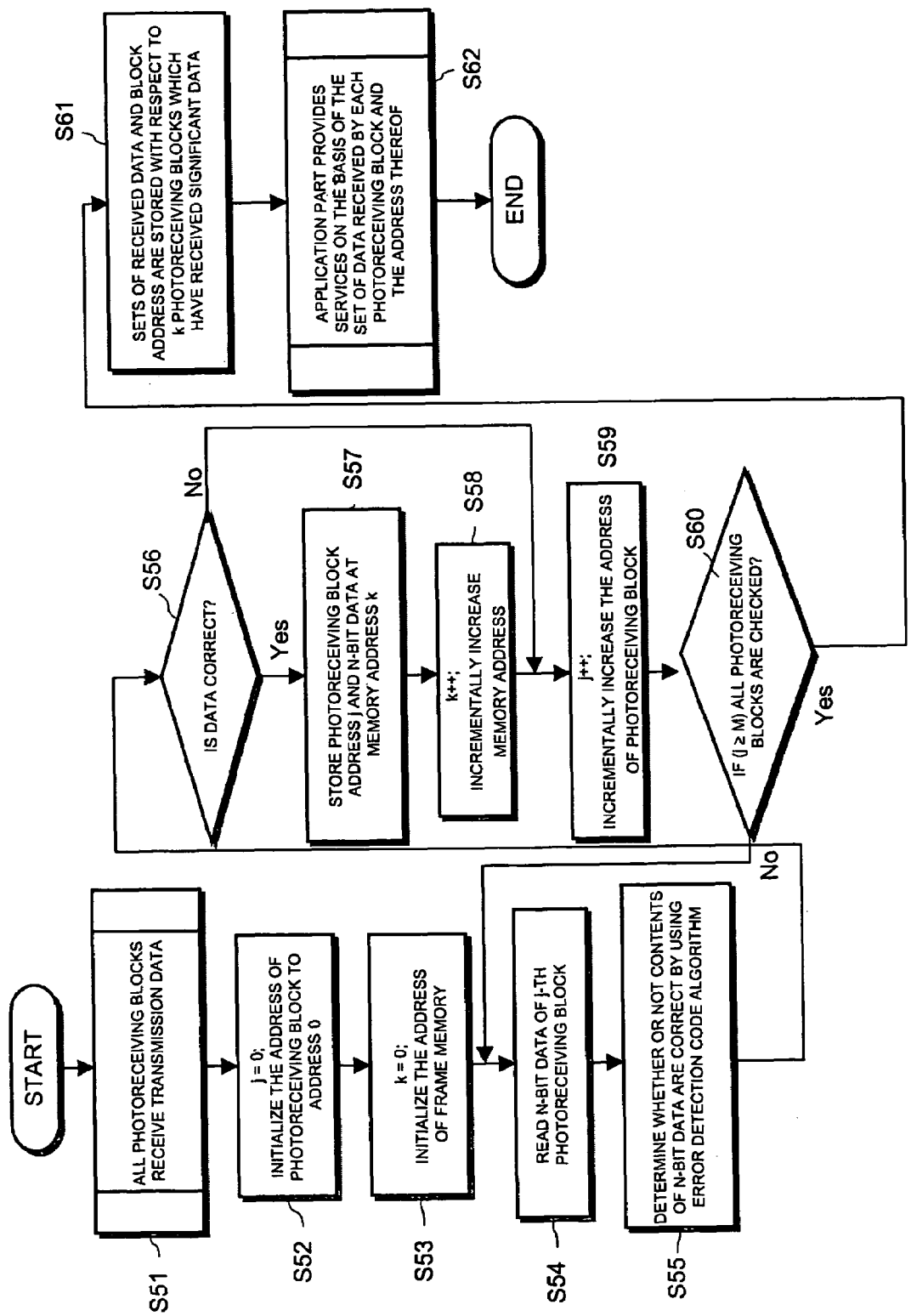
FIG. 14 is a flowchart showing a processing procedure performed by the data acquisition section 60 in the decoding mode.

FIG. 14 shows in a flowchart a processing procedure performed by the data acquisition section 60 in the decoding mode. This processing procedure is realized in a form in which, for example, the control section 61 executes predetermined program code. It is assumed here that, from the transmitter 20 side, an optical signal such that, for example, digital data is coded into a flashing pattern of a light source is sent by a baseband transmission method, etc. Referring to this flowchart, a process for acquiring data from a two-dimensional photoreceiving surface in the decoding mode will now be described below.

Initially, all the M photoreceiving blocks 51-1, 51-2, . . . , 51-M perform a process for receiving N-bit transmission data shown in FIG. 11 (step S51). As a result, the N-bit transmission data is stored in the transferred-data storing memory 87 of the photoreceiving block 51 at the position (address) at which the LED switched-on light from the transmitter 20 is formed into an image on the two-dimensional photoreceiving surface.

Next, a variable j for addressing the photoreceiving blocks 51-1 . . . by which processing is to be performed is initialized into address 0 (step S52), and a variable k for specifying the address of the transferred-data processing memory 63 is initialized into address 0 (step S53).

Next, the N-bit transmission data received from the transferred-data storing memory 87 within the j-th photoreceiving block 51-j is read (step S54), and the correctness of the N-bit data is checked by using a predetermined error detection code algorithm (step S55).

When the N-bit transmission data read from the j-th photoreceiving block 51-j is correct (step S56), the address j corresponding to the photoreceived position of the photoreceiving block 51-j and the N-bit transmission data are stored at address k of the transferred-data processing memory 63 in such a manner that these are a set (step S57), and the memory address k is incremented by 1 (step S58). On the other hand, when the N-bit transmission data is in error, steps S57 and S58 which follow are skipped, and the storage of the N-bit transmission data is not performed.

Next, the address j of the photoreceiving block 51-j is incremented by 1 (step S59). When j has not reached M, that is, when processing has not been completed for all the photoreceiving blocks 51-1 . . . , the process returns to step S54, where processes for storing and checking the N-bit transmission data for the photoreceiving block 51-*j* of the next address are repeatedly performed.

When j has reached M, with respect to each of the k photoreceiving blocks which have received significant transmission data among all the M photoreceiving blocks 51-1, . . . , 51-M, a set of the N-bit transmission data which has been successfully received and the block address thereof (that is, the position on the two-dimensional photoreceiving surface) is stored in the transferred-data processing memory 63 (step S61).

In the application part 70 which follows, based on the set of the N-bit transmission data received by each of the photoreceiving blocks 51-1 . . . and the photoreceived position thereof, various corresponding processing services are performed (step S62). However, the contents of the processing services provided by the application part 70 will be described later.

Figure 15:
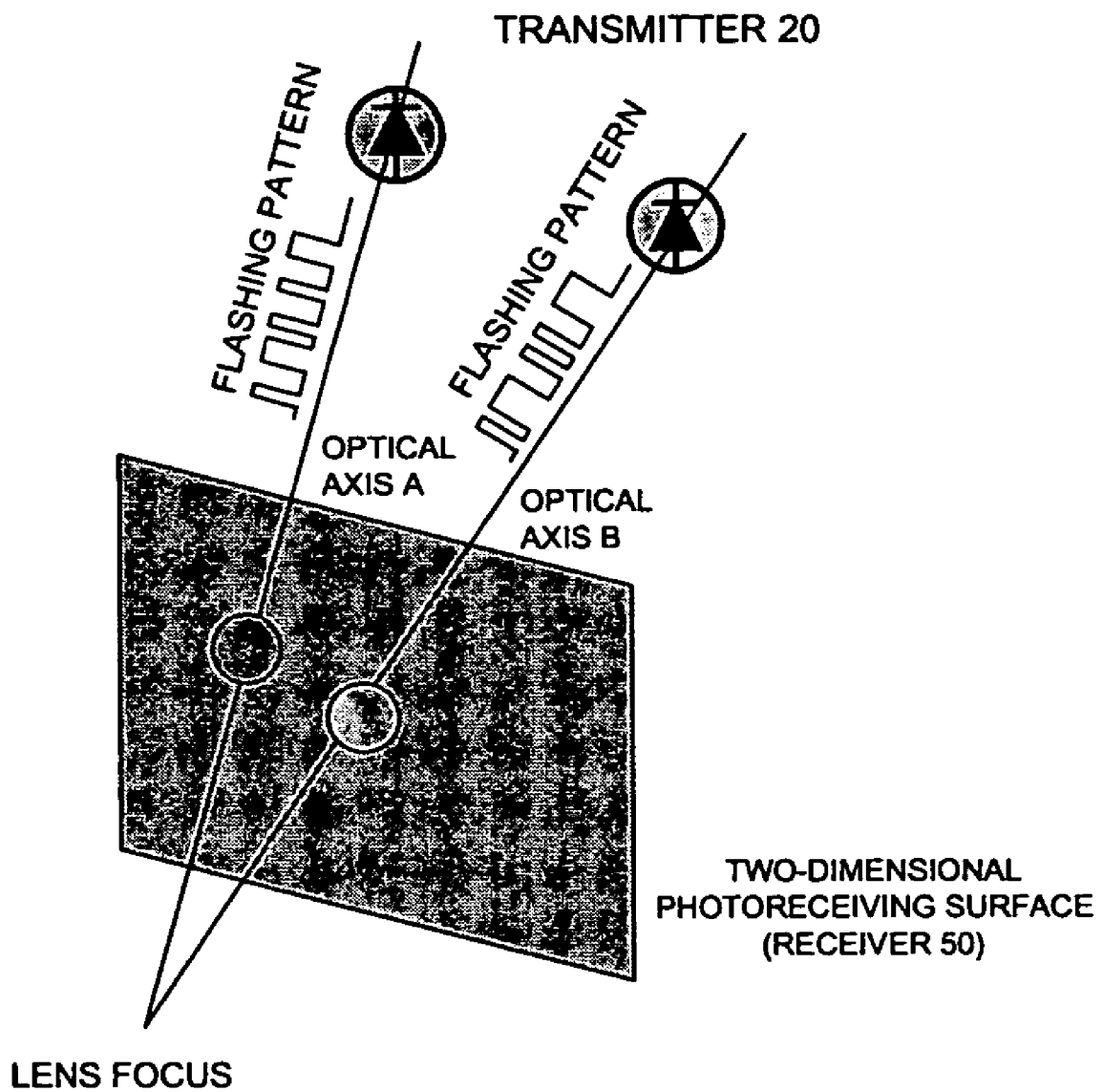
FIG. 15 shows a state in which the place of a pixel (photoreceiving block) by which an image of the light source of the transmitter 20 is captured on a two-dimensional photoreceiving surface is changed according to the spatial position of the transmitter 20.

The receiver 50 captures an image of the light source on the transmitter 20 side at a resolution corresponding to the number of pixels (i.e., the number of photoreceiving blocks 51) of the CMOS image sensor which forms the photoreceiving section and an optical lens used to collect light. As shown in FIG. 15, the place of the pixel (photoreceiving block) at which the image of the light source of the transmitter 20 is captured on the two-dimensional photoreceiving surface changes in such a manner as to correspond to the spatial position of the transmitter 20. Therefore, the receiver 50 is able to decode the transmission data by determining which transmission data has been received by which pixel (i.e., the photoreceiving block), and is able to measure the spatial position and the direction of the transmitter 20, that is, the real-world circumstances of the real-world object in which the transmitter 20 is incorporated.

Figure 16:
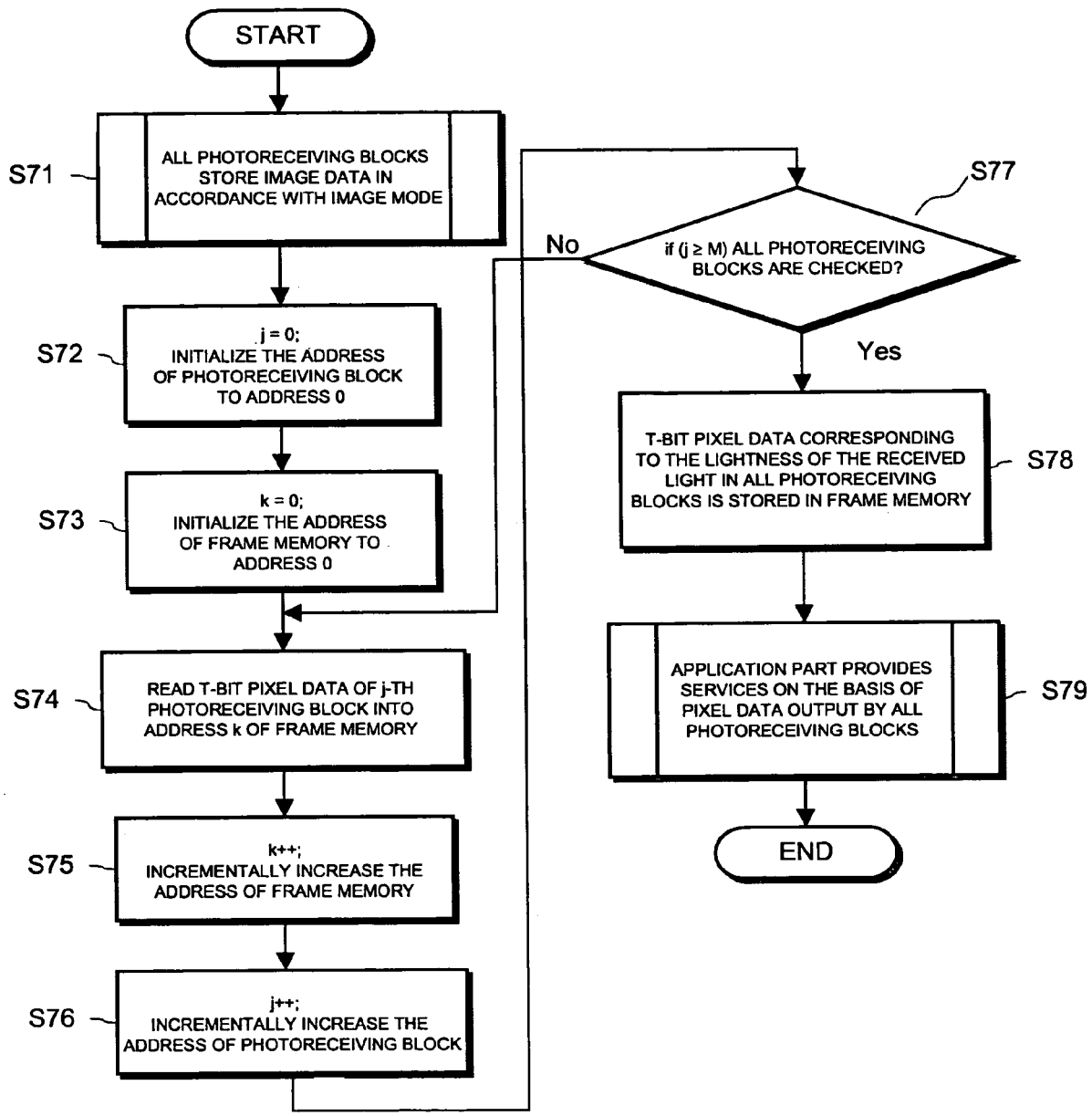
FIG. 16 is a flowchart showing a processing procedure performed by the data acquisition section 60 in the image mode.

FIG. 16 shows in a flowchart a processing procedure performed by the data acquisition section 60 in the image mode (that is, when the receiver 50 is operating as an ordinary digital camera or video camera). This processing procedure is realized in a form in which, for example, the control section 61 executes predetermined program code. Referring to this flowchart, a process for acquiring data from a two-dimensional photoreceiving surface in the image mode will now be described below.

Initially, all the M photoreceiving blocks 51-1, 51-2, . . . , 51-M store the pixel data corresponding to the photoreceived brightness in the image-captured data storing memory 85 in accordance with the processing procedure shown in FIG. 12 in the image mode (step S71). The image data has a T-bit resolution.

Next, a variable j for addressing the photoreceiving blocks 51-1 . . . by which processing is to be performed is initialized into address 0 (step S72), and a variable k for specifying the address of the frame memory 64 is initialized into address 0 (step S73).

Next, the image-captured pixel data of a T-bit resolution is read from the image-captured data storing memory 85 within the j-th photoreceiving block 51-*j* (step S74).

Next, the variable k for addressing the frame memory 64 is incremented by 1 (step S75), and the variable j for addressing the photoreceiving blocks 51-1 . . . is incremented by 1 (step S76). Then, in step S77, a check is made to determine whether or not j has reached M.

When j has not reached M, that is, when the pixel data has not been read with respect to all the photoreceiving blocks 51-1 . . . , the process returns to step S74, where reading of the pixel data with regard to the photoreceiving block 51-*j* of the next address and storage thereof in the frame memory 64 are repeatedly performed.

When j has reached M, the pixel data of the T-bit resolution has been read from all the M photoreceiving blocks 51-1, 51-2, . . . , 51-M, and the pixel data has been stored in the frame memory 64 (that is, n×m (=M) image frames of a T-bit resolution are formed) (step S78).

In the application part 70 which follows, various processing services are performed by using this image frame (step S79). For example, based on the transmission data obtained in the decoding mode, image processing can be applied on the video image of the object contained in the image frame.

The application part 70 performs predetermined services in accordance with the data acquired results by the data acquisition section 60. For example, in addition to performing image processing and image recognition on the captured image obtained from the photoreceiving section which functions as a camera, the application part 70 performs processing services corresponding to the transmission data from the transmitter 20, decoded on the basis of the data acquired results.

The transmission data from the transmitter 20 contains the device ID, the network address, the host name, the resource identifier such as the URL or the URI, and other object-related information, and the application part 70 can perform processes related to an object. For example, based on the decoded URL, information related to the object can be searched for in a WWW information providing space, the searched results can be displayed, and the searched results can be displayed in an overlaid manner on the captured image (Navi-cam). Furthermore, based on the device ID of the object and the network address, which are decoded, it is possible to establish a network connection between the object and the user terminal (gaze-link).

The receiver 50 is configured in such a manner that, for example, a digital camera using a CMOS image sensor is connected to an information processing terminal, such as a personal computer (PC), a PDA, and a cellular phone, via an interface such as a USB (Universal Serial Bus).

In such a case, the application part 70 corresponds to an application executed on the computer. The information processing terminal includes a CPU (Central Processing Unit), a memory, an external storage device such as a hard disk device (HDD), a display device, and user interface such as a keyboard and a mouse. The information processing terminal executes various application programs in an execution environment provided by the operating system (OS), and thus processing services can be provided to the user. The processed results by the application are, for example, displayed on the screen of the display.

Furthermore, the information processing terminal can include a network interface (NIC) so as to be connected to an external network such as a LAN and the Internet. Alternatively, by connecting a cellular phone thereto, it is possible to make a connection to the network via the telephone network. The information processing terminal which operates as the application part 70 can access various information resources on the network, such as an information providing server (WWW server) and a database server.

In such a case, the application part 70 is able to display a synthesized image in which a computer image obtained based on data decoded from an optical signal is superimposed on a captured (scene) image input from a digital camera. For example, by downloading information related to a real-world object having incorporated therein the transmitter 20 over the network and by displaying the downloaded information in a synthesized manner at the position at which the optical signal is detected on the scene image at 7.5 fps, services corresponding to the real-world circumstances of the real-world object can be provided. For example, it is possible to provide a virtual image in which an actual space such that product specifications, operation instructions, a due date, commercial contents are superimposed on a scene video image obtained by capturing images of indoor furniture, indoors electrical appliances, interior, buildings, and other outdoor things, is augmented.

Such functions of the application part 70 are realized by computer processing for performing services corresponding to the data transmitted by the optical signal, and the real-world circumstances of the transmission source, such as the spatial position, the orientation, etc., obtained from the optical signal on the receiver side which receives the optical signal having a space resolution. Application examples of the data communication system 10, provided by the application part 70, will be described later.

C. Characteristics of Data Communication System

Here, data transmission characteristics of a data communication system 100 according to this embodiment will now be evaluated.

(1) Distance Characteristics

Distance characteristics in a case where a small transmitter in which one LED is made to flash on and off is used for a short distance and for indoor use, and a large transmitter in which 12 LEDs are arranged in matrix is used for a far distance will now be discussed.

In an environment of an average indoor brightness, the receiver is able to sufficiently recognize a small transmitter at a distance of 5 meters. Furthermore, even at a distance of 10 meters, if a small transmitter is directed toward the receiver by considering the directivity of the LED, the optical signal can be recognized. If these are away by approximately 15 meters, since the image of the LED is captured by only one pixel, recognition is difficult. When an image of the LED is captured by one pixel, the optical signal is recognized, but when an image of the LED is captured by two or more pixels, the optical signal is not recognized. On the other hand, for the large transmitter, since the amount of light is large and also the light source is large, it is possible for the receiver to recognize an optical signal without any problems even at a distance of 20 meters.

In outdoors where no obstacles are present in a fine weather, there can be a case in which a video image of a camera mode is bright to such a degree as to cause saturation of the photoreceiving device. However, even if a small transmitter is made away for a distance of 5 meters and a large transmitter is made away for a distance of 10 meters, the receiver is able to sufficiently recognize the optical signal.

In the manner described above, if the amount of light sent by the transmitter is in such a degree that the switching on and the switching off can be determined by the eye of the human being, the receiver can recognize the optical signal. In order to recognize the optical signal from the transmitter at a far distance, the amount of light needs to be increased. However, rather than the above, it is important to increase the size of the light source so that an image thereof can be captured by a plurality of pixels even from a far distance.

It should be understood from the above that, at indoors, a pilot lamp and LED illumination can function as a transmitter of an optical signal, and at outdoors, illumination of a signboard and a signal device can function as a transmitter of an optical signal.

(2) Disturbance-Light-Immunity Characteristics

The degree of influence the data transmission of an optical signal, by the data communication system 10 according to this embodiment, is received by disturbance light will now be discussed.

In order to perform robust data transmission, it is necessary to remove the influence of light, which becomes noise, present in the field of view of the photoreceiving section on the receiver 50 side. In the real world, there are various noise sources which are switched on or which flash on and off, such as an infrared remote controller, a fluorescent lamp, and the Sun light. It is famous that, for example, an infrared remote controller malfunctions due to an inverter fluorescent lamp.

Figure 17:
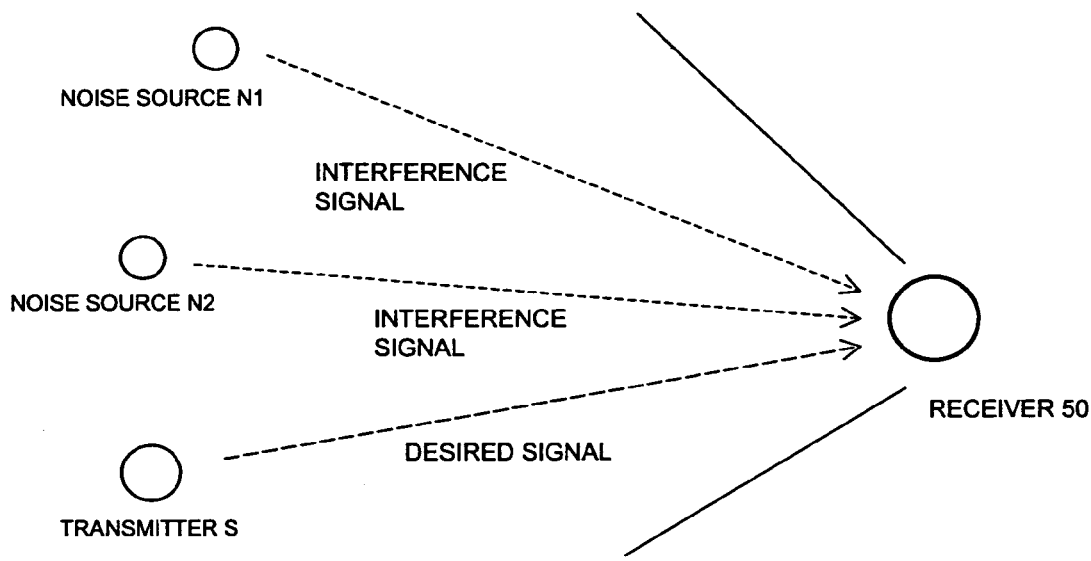
FIG. 17 illustrates disturbance-light-immunity characteristics of the data communication system 10 according to one embodiment of the present invention.

When optical communication is to be performed, on the receiver side, all the light which arrives from a fixed area is received, and the data is demodulated (FIG. 17). The photoreceiving sensor of the receiver receives a signal in which all the signals and noise in the field of view are superimposed on one another. In order to prevent an influence by the noise sources, a wavelength filter, a frequency filter, etc., are connected to the photoreceiving device. When a noise source other than the transmitter exists in the field of view of the photoreceiving sensor, noise is removed by using these filters, and only the desired signal from the transmitter is received.

However, with only this technique, the wavelength, the frequency, etc., must be determined in advance, and flexible communication is hindered. If a changeable filter circuit is incorporated, the circuit scale becomes large. Furthermore, when noise of the same wavelength and frequency as those of the transmitter 20, and an interference signal from another transmitter exist, the receiver 50 becomes not able to perform communication. Furthermore, when a plurality of transmitters exist in the field of view of the image sensor, the separation of each item of the data is difficult, and the transmitters sometimes function as noise for one another. In a case where the noise source emits strong light, the S/N ratio of the signal from the transmitter 20 to the noise becomes very poor, and the data cannot be received correctly.

In the technique in which a photodiode of one pixel is used as the photoreceiving sensor of the receiver 50, robust communication cannot be performed with respect to noise which exists in the environment. In contrast, the data communication system 10 according to this embodiment comprises a transmitter 20 that is a light source which flashes on and off at a high speed and a receiver 50 having an image sensor for decoding the flashing pattern of the transmitter by means of all the pixels (see FIG. 1), and the data communication system 10 can perform robust optical communication with respect to noise. When the data communication system 10 is compared to an infrared remote controller, the transmitter 20 is a transmitter of an infrared remote controller, and the receiver 50 is an array sensor in which remote-control receivers are arranged in an array.

The receiver 50 has characteristics which are not susceptible to noise because data is received by each pixel of the image sensor in an array independently of each other. Specifically, the receiver 50 has the two features described below.

① Since the signal is photoreceived by all the pixels on the two-dimensional photoreceiving surface independently of each other, it is possible to photoreceive the signal source and the noise source by different pixels, and thus it becomes possible to separate the desired signal from noise in accordance with the photoreceived position and to correctly receive the signal.

② Since the signal is photoreceived by all the pixels on the two-dimensional photoreceiving surface independently of each other, for receiving one signal source, it is possible to receive the signal source by a plurality of nearby pixels. Therefore, even if a particular pixel is affected by noise, it is possible to correctly receive the desired signal by the remaining pixels and to decode the signal.

Figure 18:
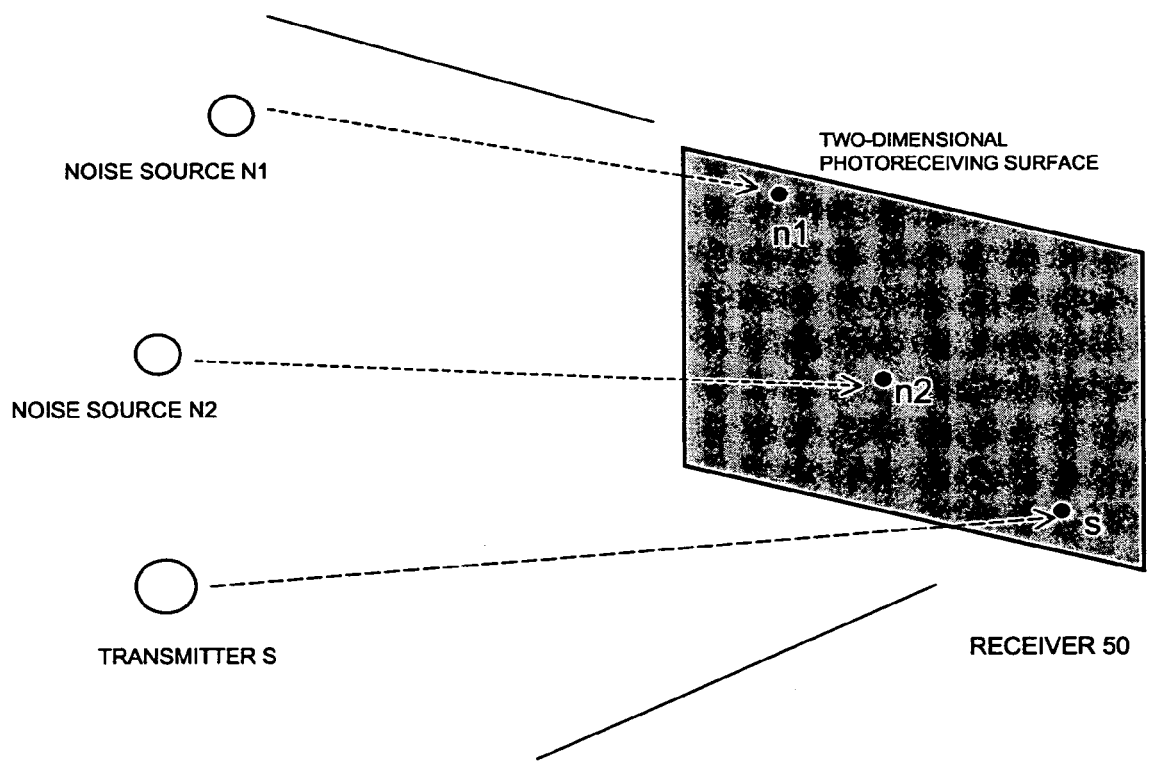
FIG. 18 illustrates disturbance-light-immunity characteristics of the data communication system 10 according to one embodiment of the present invention.

For example, it is assumed that a light source S of the transmitter 20 and two noise sources N1 and N2 exist in the field of view of the receiver 50 (see FIG. 18). These light sources S, N1, and N2 arranged in a three-dimensional space are each projected onto the two-dimensional photoreceiving surface of the receiver 50, and on the two-dimensional photoreceiving surface, these are formed into images at photoreceived positions s, n1, and n2, respectively, corresponding to the positions on the space. At this time, when the three light sources S, N1, and N2 are not aligned in the same line of sight of the receiver 50, the light sources are formed into images at different points s, n1, and n2 on the two-dimensional photoreceiving surface, respectively (see FIG. 19). That is, the light sources S, N1, and N2 are photoreceived by a group of photoreceiving devices with different points s, n1, and n2 on the two-dimensional photoreceiving surface being the center, respectively.

In the pixels around the point s on the two-dimensional photoreceiving surface which receives the information S transmitted by the transmitter 20, there are hardly influences due to the noise sources N1 and N2, and the S/N ratio is high. The reason for this is that the point s which receives the signal from the transmitter 20, and the points n1 and n2 which receive noise from the noise sources N1 and N2 are spaced apart on the two-dimensional photoreceiving surface, and do not exert influences on each other. At point s, when the direct light from the light source S from the transmitter 20 is compared with the indirect light from the noise sources N1 and N2, the direct light from S is stronger, and can be received at a higher S/N ratio.

Figure 20:
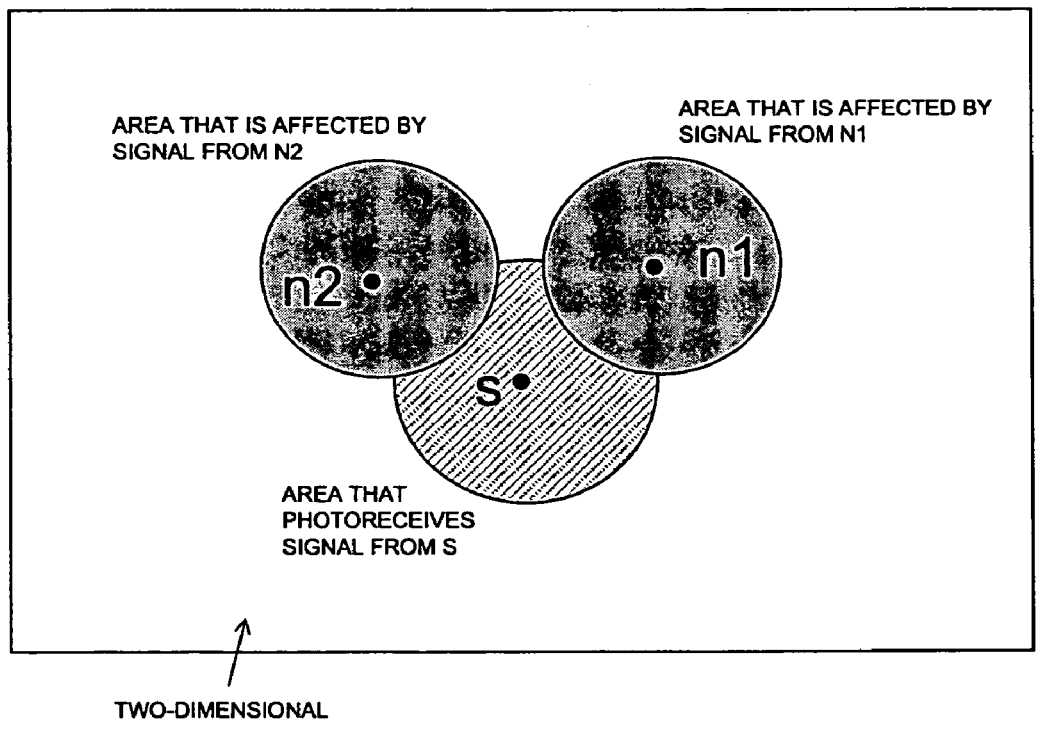
FIG. 20 illustrates disturbance-light-immunity characteristics of the data communication system 10 according to one embodiment of the present invention.

The image forming points s, n1, and n2 of the desired signal and the interference signal on the two-dimensional photoreceiving surface need only to be photoreceived by different pixels, and may be very close to each other as long as these do not completely overlap each other (see FIG. 20). In the CMOS image sensor used in the receiver 20, since all the pixels can be driven independently of one another to receive an optical signal, the optical signal S from the transmitter 20 is received by a plurality of pixels around the image forming point s, which is the center, of the desired signal. At this time, even if the image forming point s of the desired signal and the image forming points n1 and n2 of the interference signal are close to each other, all the pixels around the point s are not affected by noise, and by using the output from the pixel which is not affected, it is possible to correctly receive the desired signal S from the transmitter 20.

In general, the viewing angle of each of the pixels, arranged in an array, of the image sensor is small. Only the pixels among the pixels which have photoreceived the optical signal from the transmitter 20, which have received light in such a manner as to overlap the noise source, are affected by noise, and the other pixels can correctly receive the optical signal without being affected. Therefore, according to the data communication system 10 of this embodiment, the receiver 50 is immune to noise and can be sufficiently put into practical use in an actual environment in which there are various disturbances.

Figure 19:
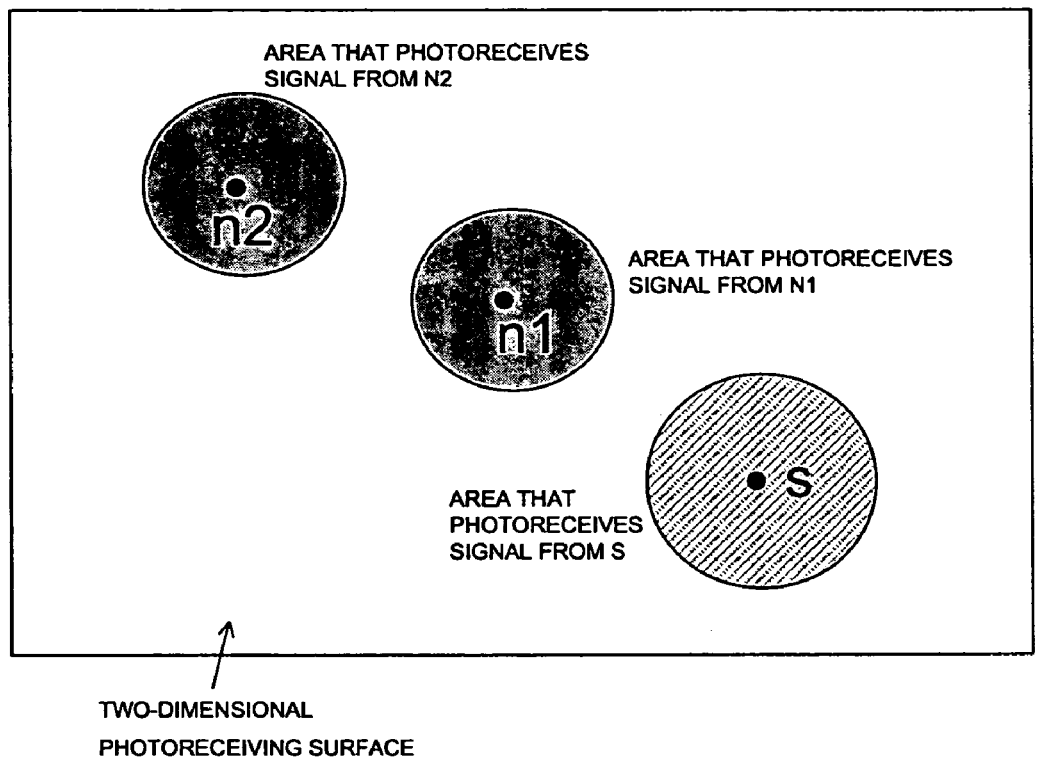
FIG. 19 illustrates disturbance-light-immunity characteristics of the data communication system 10 according to one embodiment of the present invention.

Although in FIGS. 18 to 20, for the sake of descriptions, the number of transmitters and noise sources is limited, of course, the number may be any number of transmitters and noise sources. The relationship of the spatial positions of the light sources can be variously combined.

Only the light source which is intended to be used to interfere with communication does not become a noise source, but, for example, an optical signal from a transmitter which transmits data to a particular receiver functions as a noise source for the other receivers. For this reason, even if the noise source is read as another transmitter instead, robust data transmission having a spatial resolution in a similar manner can be realized.

Here, by using, as an example, an infrared remote controller which illuminates flashing light and a laser pointer which illuminates turned-on light, disturbance-light-immunity characteristics of the data communication system 10 according to this embodiment will now be discussed.

A small transmitter 20 formed of one LED and a receiver 50 were disposed apart by 2 meters, and an infrared remote controller serving as a noise source was made to irradiate toward the receiver from behind the transmitter 20. The results show that, in the image sensor which is a photoreceiving section, although the number of pixels which can recognize an optical signal from the transmitter is slightly decreased, the recognition itself of the transmission data is sufficiently possible.

Furthermore, a small transmitter 20 formed of one LED and a receiver 50 were disposed apart by 2 meters, and a laser pointer serving as a noise source was made to irradiate toward the receiver from behind the transmitter 20. In this case, in the image sensor which is a photoreceiving section, the recognition itself of the transmission data is sufficiently possible without being affected by the laser light.

In the receiver 50, since each pixel of the image sensor receives an optical signal transmitted from the transmitter 20, only the pixels such that the noise source and the optical signal overlap each other are affected by noise, and the other pixels can recognize the data without being affected. Furthermore, since the variation in the brightness of each pixel is detected, even if the brightness varies as a whole due to the noise source, the flashing pattern does not change, making it possible to detect the signal in such a manner as to be separated from noise.

In addition, the optical signal, which is the direct light which arrives at the receiver 50 from the transmitter 20, is stronger than the optical signal of the indirect light such that the noise source illuminates the optical signal, and it is possible to separate and recognize only the flashing pattern of the optical signal. That is, the data communication system 10 according to this embodiment is capable of performing data transmission which is immune to noise, and can be put into practical use in an actual environment in which there are various disturbances.

D. Applications of Data Communication System

D-1. Wide-Range Optical Communication

The data communication system 10 according to this embodiment employs basically a transmission method using a wide-range action of "watching". When information communication is to be performed by using light as a medium, it is preferable that the dynamic range be large. For example, in an infrared remote controller, which uses a conventional method for performing optical communication, the transmitter transmits information by causing an infrared LED which emits infrared radiation to flash on and off at a pattern corresponding to a particular data sequence. In the receiver, a photodiode of one pixel functions as a sensor, receives all the light coming from a fixed area so as to integrate it, and demodulates the data.

In a case where an infrared remote controller is used from a far distance, the transmission output on the transmitter side may be increased. However, in a case where data of a light source whose output is strong is transmitted from a short distance to the receiver, if the intensity of the signal reaching the receiver is too strong, saturation (a saturated state of the photodiode) occurs, the data cannot be correctly received, and thus data communication becomes impossible. In this manner, in a conventional case, it is difficult to receive a signal having a strong intensity at a short distance.

In contrast, the data communication system 10 according to this embodiment comprises a transmitter 20 that is a light source which flashes on and off at a high speed, and a receiver 50 for decoding the flashing pattern of the transmitter 50 by means of all the pixels. When the data communication system 10 is compared to an infrared remote controller, the transmitter 20 is a transmitter of an infrared remote controller, and the receiver 50 is an array sensor in which remote-control receivers are arranged in an array.

For the receiver 50, by using features such that data is received by the pixels of the image sensor, which are formed in an array, independently of each other in order to have a spatial resolution, optical communication having a large dynamic range can be realized.

Figure 21:
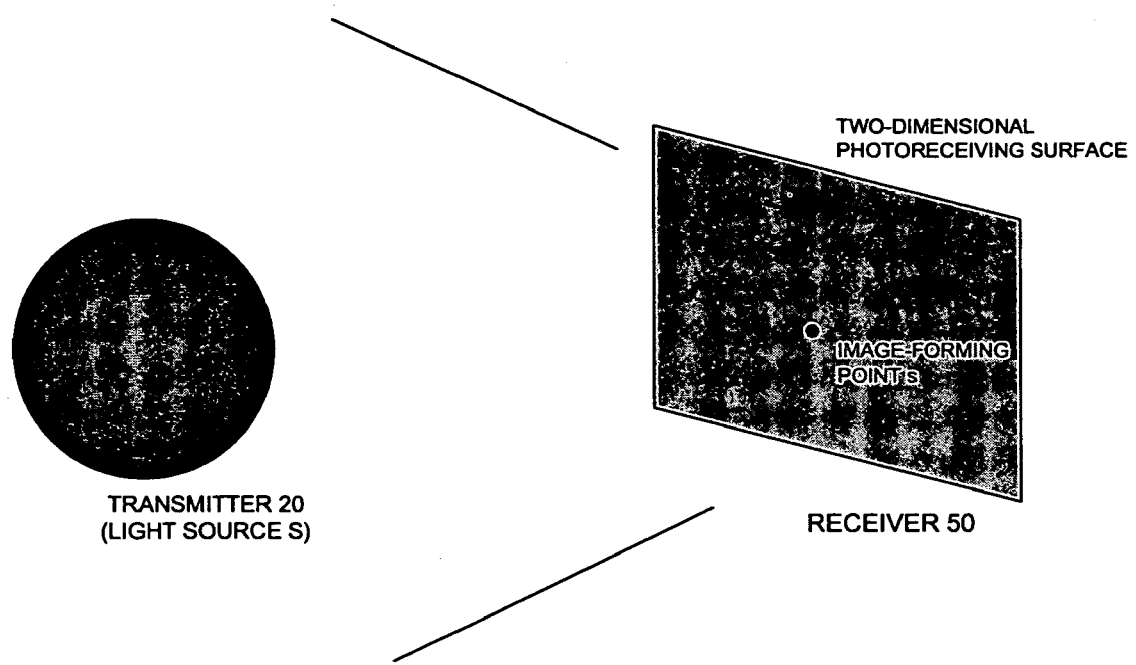
FIG. 21 illustrates a wide-range data communication operation by the data communication system 10 according to one embodiment of the present invention.
Figure 22:
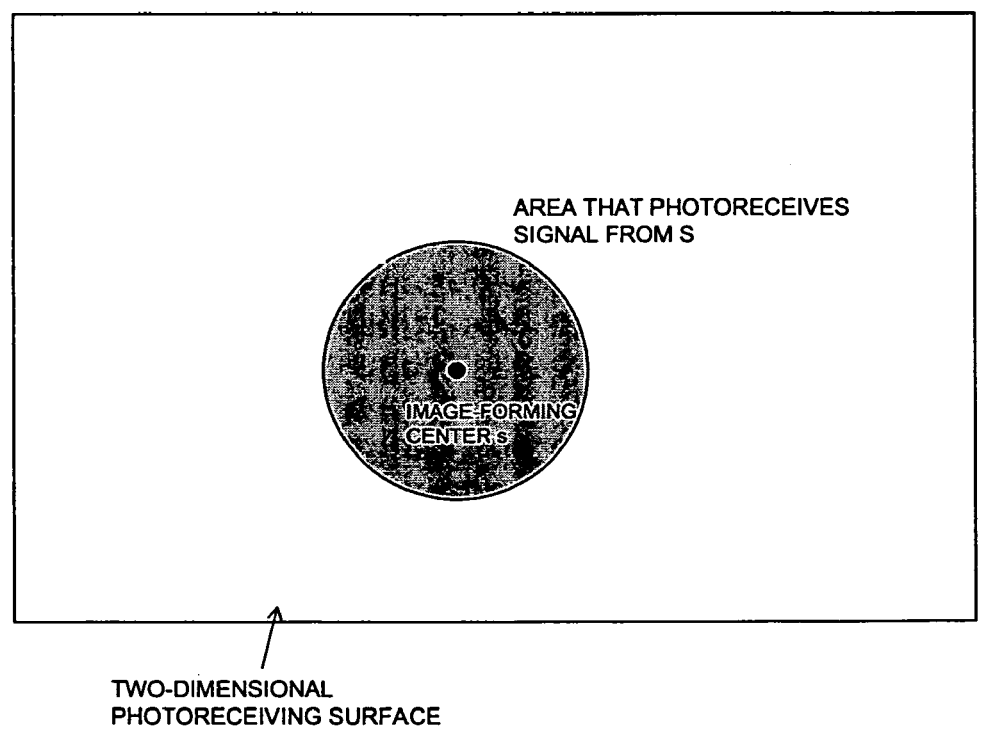
FIG. 22 illustrates a wide-range data communication operation by the data communication system 10 according to one embodiment of the present invention.

For example, as shown in FIG. 21, it is assumed that a transmitter S exists in the field of view of the receiver 50. The light source S disposed in a three-dimensional space is projected onto the two-dimensional photoreceiving surface possessed by the receiver 50, and is formed into an image at point s. If the light source of the transmitter S is assumed to be of a spherical shape having a particular radius, as shown in FIG. 22, the transmitter S is simultaneously photoreceived by a group of plural photoreceiving pixels with the point s being the center on the two-dimensional photoreceiving surface.

When the image of the light source S has an area on the two-dimensional photoreceiving surface in the manner described above, in order to identify the spatial position of the transmitter 20, it is necessary to determine a specific point within the photoreceiving area. For example, the center of gravity of the area received by a plurality of photoreceiving blocks can be determined, and this can be determined as the coordinates at which the transmitter 20 is recognized on the two-dimensional photoreceiving surface.

Figure 23:
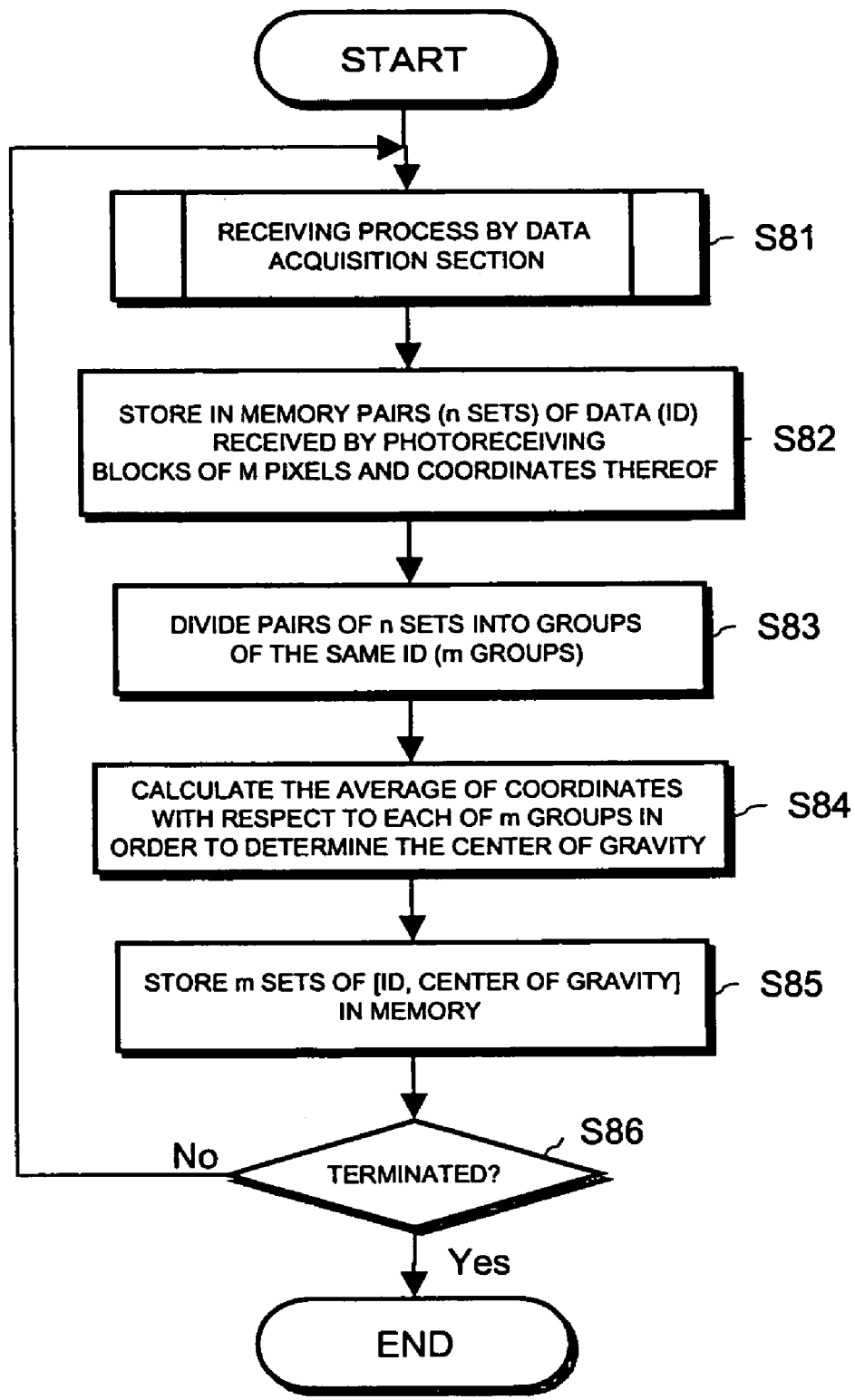
FIG. 23 illustrates a wide-range data communication operation by the data communication system 10 according to one embodiment of the present invention.

FIG. 23 shows in a flowchart a processing procedure for determining the center of gravity from the area received by a plurality of photoreceiving blocks.

Initially, in the decoding mode, the data acquisition section 60 performs a process for acquiring data from all the pixels on the two-dimensional photoreceiving surface (step S81).

Next, sets (n sets) of the data (ID) received by photoreceiving blocks of M pixels, and the coordinates thereof are stored in a memory (step S82).

Next, pairs of n sets are divided into groups of the same ID (step S83). It is assumed that, as a result, m groups are formed.

Next, the average of the coordinates on the two-dimensional photoreceiving surface is calculated to determine the center of gravity with respect to each of the m groups (step S84). Then, the m sets of the IDs and the centers of gravity are stored in a memory (step S85).

Here, it is assumed that the signal output of the light source S of the transmitter 20 is a sufficiently strong output which in which remote communication is assumed. In such a case, at least some of the photoreceiving pixels cause saturation on the two-dimensional photoreceiving surface of the receiver 50 which receives the optical signal in the neighborhood.

Figure 24:
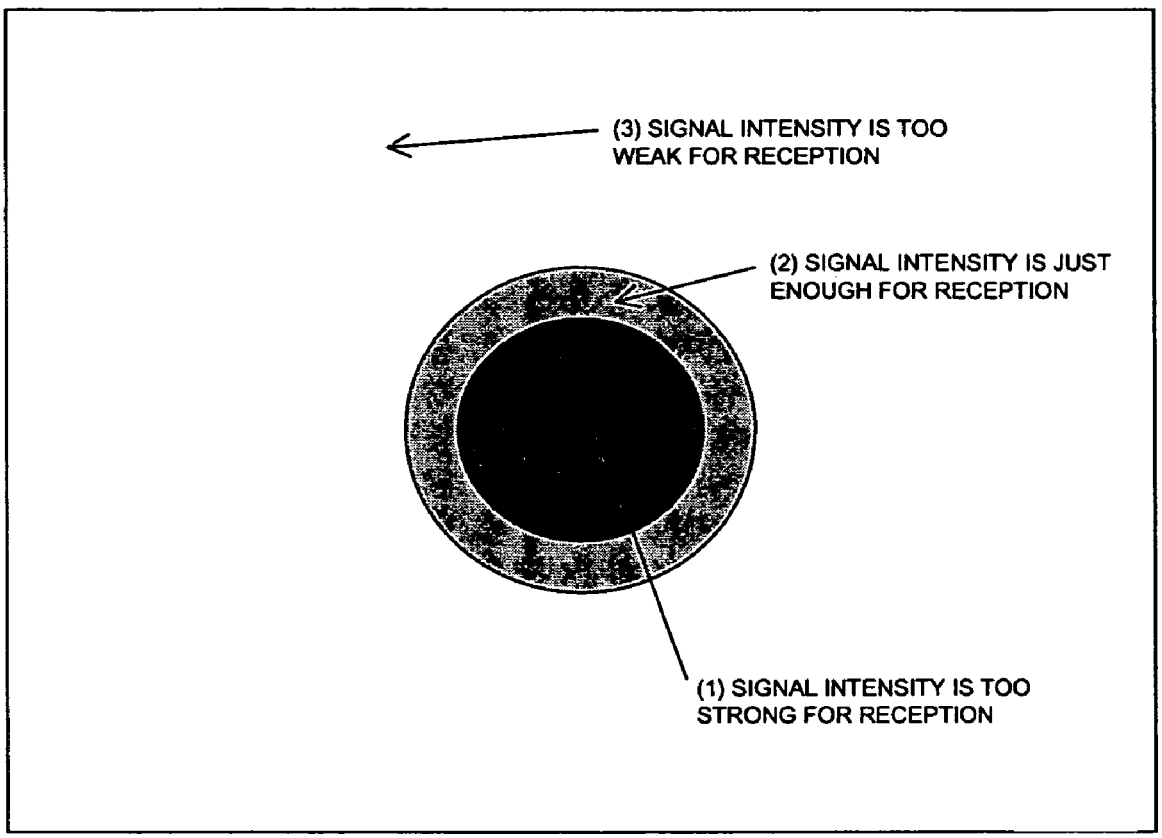
FIG. 24 illustrates a wide-range data communication operation by the data communication system 10 according to one embodiment of the present invention.

In this embodiment, the receiver 50 can receive data by all the pixels on the two-dimensional photoreceiving surface independently of each other, and has a spatial resolution. Therefore, as shown in FIG. 22, when an optical signal is received from a strong light source S, the photoreceiving pixels on the two-dimensional photoreceiving surface can be divided into those of three types of areas described below (see FIG. 24).

(1) Area where the photoreceived signal from the transmitter is too strong, and the photoreceiving pixel causes saturation.
(2) Area where the intensity of the signal from the transmitter has a sufficient intensity with respect to the photoreceiving pixel, and signal reception is possible.
(3) Area where the signal from the transmitter is very weak, and the photoreceiving pixel cannot receive the signal.

The reason why the photoreceiving devices are divided into the three areas in this manner will be described below.

The reason why saturation occurs in area (1) is that the signal intensity is strong. The reason why a signal cannot be received in area (3) is that the photoreceiving pixels in that area cannot receive the signal from the transmitter with a sufficient intensity.

In the light source S which is formed as, for example, a sphere, only the inside of the sphere glows, and the outside thereof does not glow. That is, the transmitter 20 can be regarded as a light-emitting body having a certain edge. This edge is projected as area (2) on the two-dimensional photoreceiving surface. This area (2) is positioned between area (1) and area (3) as shown in the figure, that is, between a too bright area and a too dark area. That is, the photoreceiving pixel in area (2) photoreceive a signal of an intensity which is just enough to receive a signal.

The data output from the photoreceiving pixel in which saturation has occurred has no reliability. Therefore, on the receiver 50 side, when a phenomenon shown in FIG. 24 occurs on the two-dimensional photoreceiving surface, data processing is performed by excluding the photoreceiving block in which saturation has occurred from the target of data acquisition. Even if the output of the light source of the transmitter 20 is too strong to cause saturation, the photoreceiving block at an area in which the signal intensity is just enough for reception can be correctly receive the signal. Therefore, by determining the center of gravity of this area, the coordinates at which the transmitter is recognized can be determined on the two-dimensional photoreceiving surface. As a result, wide-range data communication becomes possible.

Figure 25:
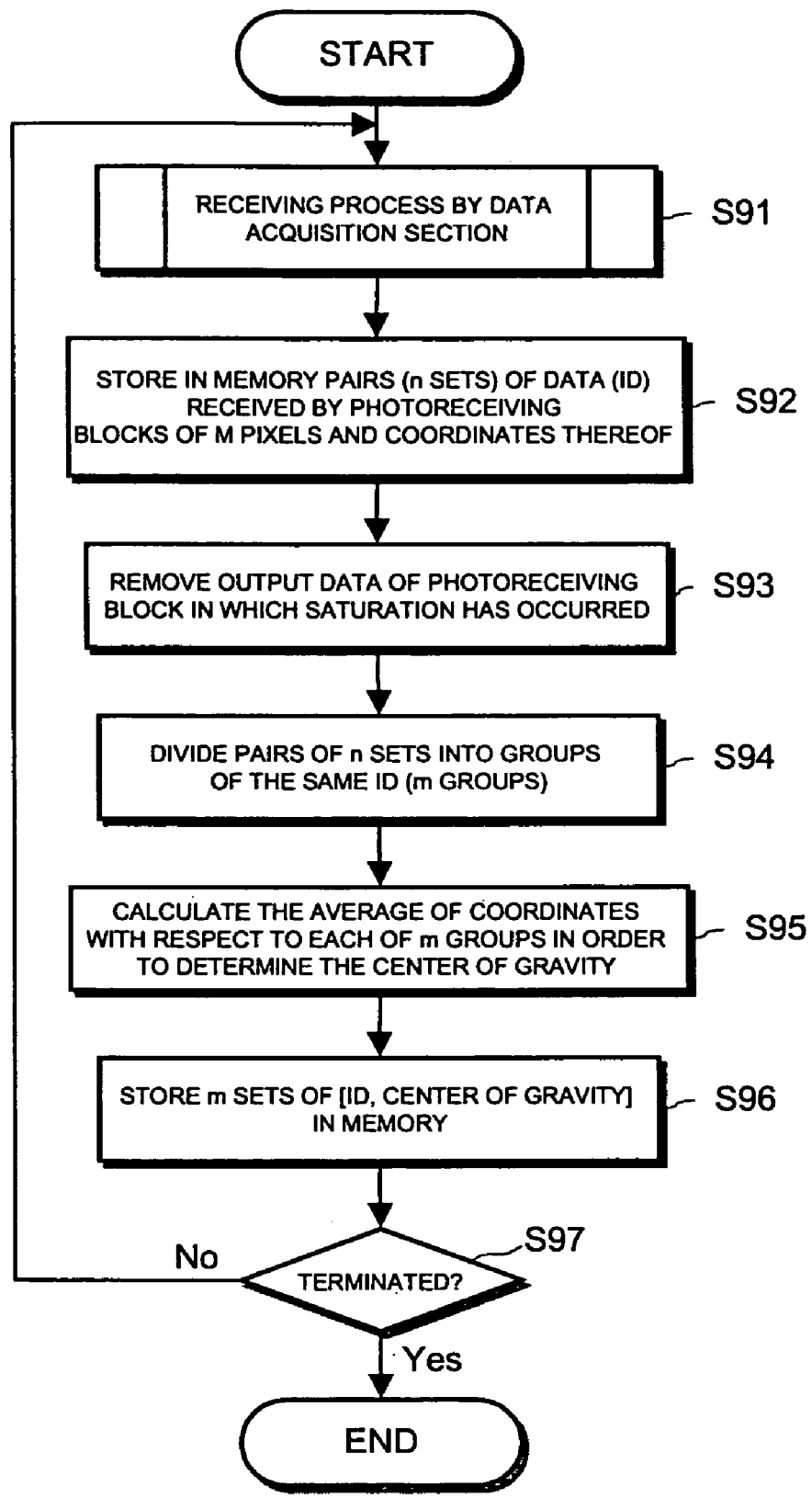
FIG. 25 illustrates a wide-range data communication operation by the data communication system 10 according to one embodiment of the present invention.

FIG. 25 shows in a flowchart a processing procedure for extracting an area in which the intensity of the photoreceived signal is just enough from the two-dimensional photoreceiving surface and for determining the center of gravity of the area on the receiver 50 side.

Initially, in the decoding mode, the data acquisition section 60 performs a process for acquiring data from all the pixels on the two-dimensional photoreceiving surface (step S91).

Next, sets (n sets) of the data (ID) received by photoreceiving blocks of M pixels, and the coordinates thereof are stored in a memory (step S92). Then, the data from the photoreceiving block in which saturation has occurred is excluded from the data stored in the memory (step S93).

Next, pairs of n sets are divided into groups of the same ID (step S94). It is assumed that, as a result, m groups are formed.

Next, the average of the coordinates on the two-dimensional photoreceiving surface is calculated to determine the center of gravity with respect to each of the m groups (step S95). Then, the m sets of the IDs and the centers of gravity are stored in a memory (step S96).

In the manner described above, the receiver 50 can receive information transmitted from the transmitter 20 which emits very strong light because data can be received by all the pixels on the two-dimensional photoreceiving surface independently of each other, and thus optical communication having a very large dynamic range is possible.

In the foregoing, for the sake of descriptions, the shape, the number, etc., of the transmitter 20 are limited, but may be any value. Furthermore, the geometrical relationship between the transmitter 20 and the receiver 50 may be in various combinations, and the same advantages as those described above can be obtained.

D-2. Multi-Channel Transmission

Of course, a transmitter in which a plurality of light-emitting sections are incorporated with respect to one real-world object may be formed. Alternatively, a plurality of transmitters may be disposed in the real world, and an optical signal may be simultaneously transmitted to predetermined receivers so as to perform multi-channel transmission (to be described later).

A plurality of transmission apparatuses may be disposed in the real world, and an optical signal may be simultaneously transmitted to one receiver. In such a case, on the receiving apparatus side, the photoreceiving section can simultaneously photoreceive optical signals from two or more transmission apparatuses, the data processing section can separate the optical signal in accordance with the photoreceived position on the two-dimensional photoreceiving surface, and the application part can separate and detect each item of the decoded transmission data in accordance with the photoreceived position on the two-dimensional photoreceiving surface.

That is, according to the data communication system 10 of this embodiment, since the receiver 50 has a spatial resolution with respect to the received optical signal, it is possible to establish a plurality of communication paths at the same time in order to realize robust multi-channel transmission.

Examples of techniques for simultaneously establishing a plurality of communication paths include a frequency division method. In wired, radio-wave, and optical communication, by assigning a different frequency band to each channel, it is possible to theoretically establish a plurality of communication paths with respect to one physical communication path. In addition to the frequency division method, there are various methods, such as a wavelength division method and a time division method.

In these methods, when a plurality of transmitters exist, communication needs to be performed by considering so that signal interference does not occur with one another. For example, two transmitters which simultaneously transmit data by using exactly the same method are mistaken as one transmitter by the receiver. This results from the problem of capable of physically establishing only one communication path at the same time.

If a plurality of communication paths can be physically established at the same time, it is not necessary to theoretically establish a plurality of communication paths by using a complex algorithm. In the data communication system 10 according to this embodiment, this problem is solved by using the spatial resolution of the received signal, possessed by the receiver 50. According to this receiver 50, since data is received by each of the pixels of the image sensor in an array independently of each other, it is possible to simultaneously establish communication paths for performing communication with a plurality of transmitters.

Figure 26:
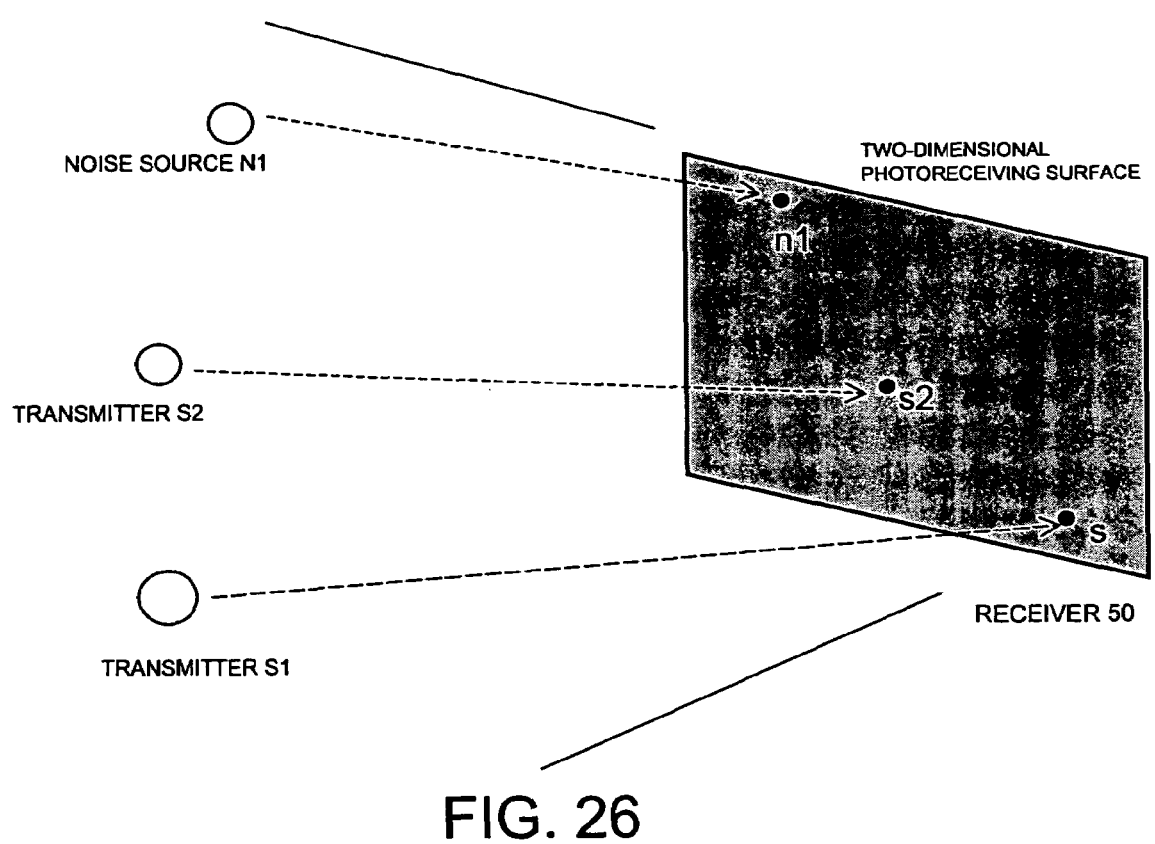
FIG. 26 illustrates multi-channel transmission by the data communication system 10 according to one embodiment of the present invention.
Figure 27:
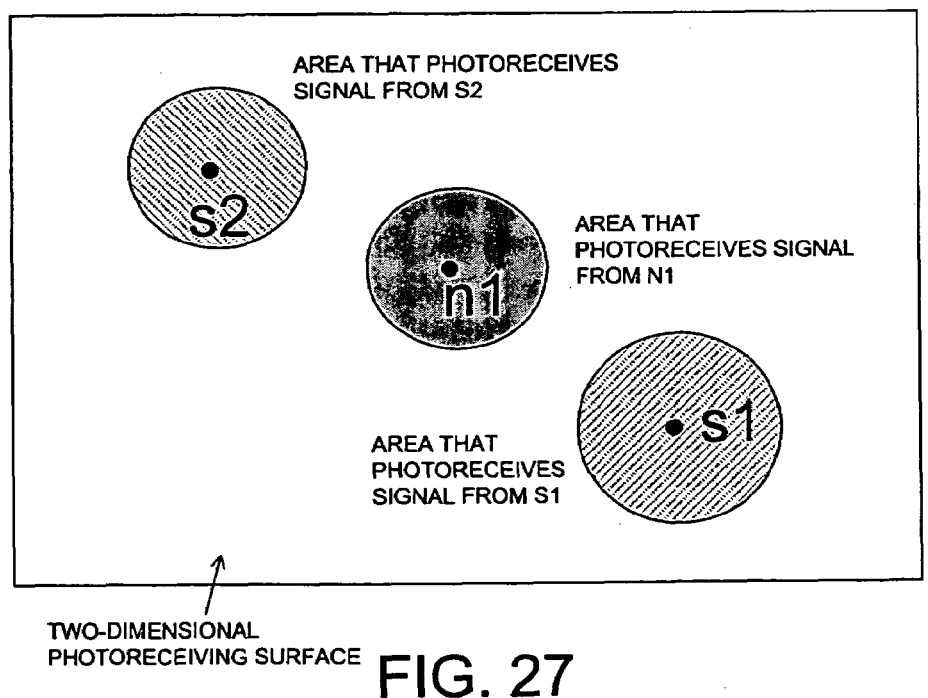
FIG. 27 illustrates multi-channel transmission by the data communication system 10 according to one embodiment of the present invention.

As shown in FIG. 26, it is assumed that two transmitters S1 and S2, and one noise source N1 exist in the field of view of the receiver. Each of the light sources S1 and S2, and N1 disposed in a three-dimensional space are projected onto the two-dimensional photoreceiving surface of the receiver 50, and are formed into images at points s1, s2, and n1 on the two-dimensional photoreceiving surface, respectively. When the light sources S1, S2, and N1 are not aligned on a particular line of sight, as shown in FIG. 27, these light sources are formed into images at different points s1, s2, and n1, respectively, on the two-dimensional photoreceiving surface. That is, the light sources S1, S2, and N1 are photoreceived by a plurality of photoreceiving devices with the points s1, s2, and n1 on the two-dimensional photoreceiving surface being the center, respectively. Therefore, the center of gravity is determined for each photoreceiving area with respect to the signal from each of the light sources S1, S2, and N1, and the received signal is decoded for each area, making it possible to realize robust multi-channel transmission.

Figure 28:
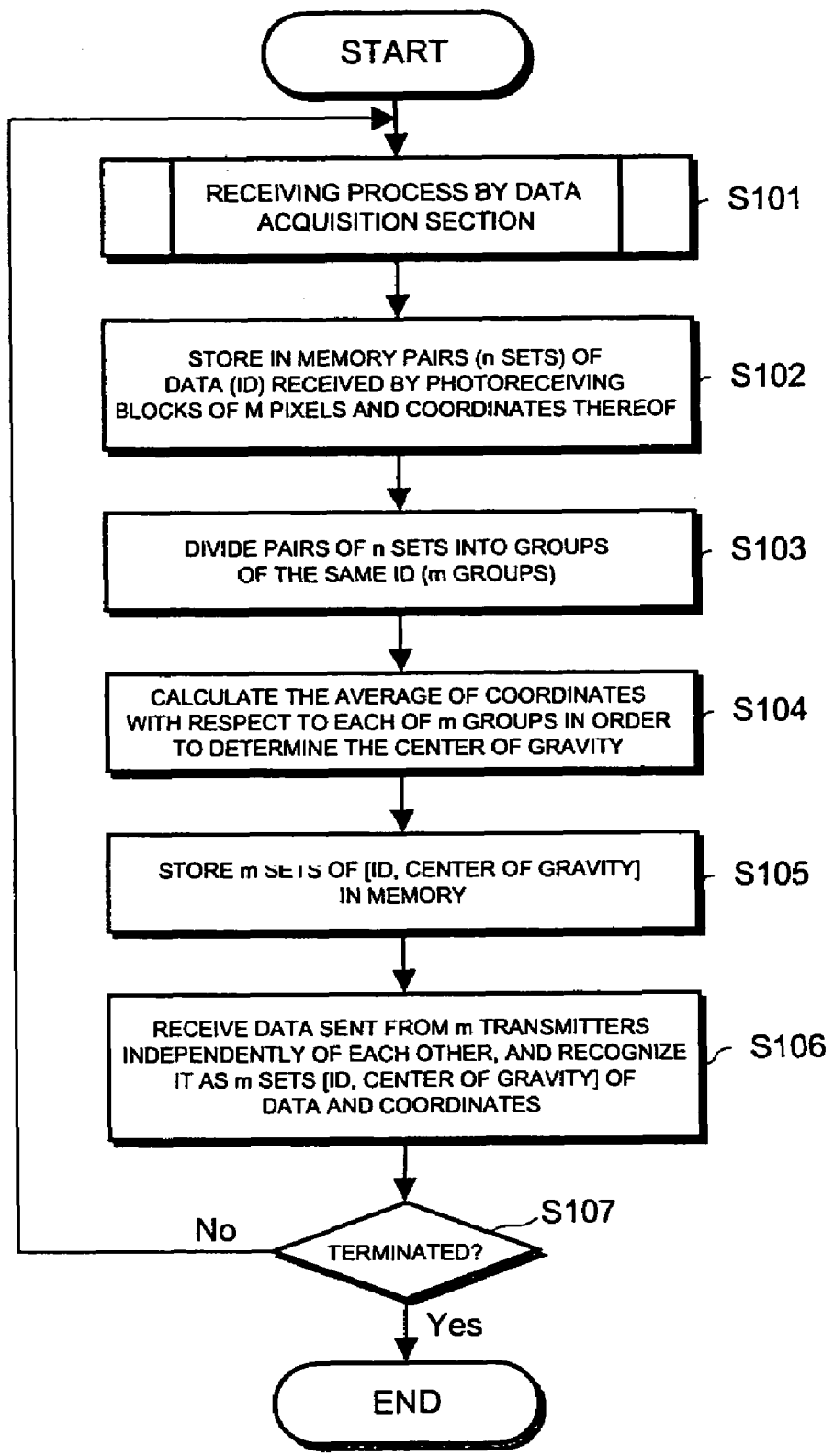
FIG. 28 illustrates multi-channel transmission by the data communication system 10 according to one embodiment of the present invention.

FIG. 28 shows in a flowchart a processing procedure for determining the center of gravity of the receiving area of a plurality of photoreceived signals from the two-dimensional photoreceiving surface and for performing multi-channel transmission.

Initially, in the decoding mode, the data acquisition section 60 performs a process for acquiring data from all the pixels on the two-dimensional photoreceiving surface (step S101).

Next, sets (n sets) of the data (ID) received by photoreceiving blocks of M pixels, and the coordinates thereof are stored in a memory (step S102).

Next, pairs of n sets are divided into groups of the same ID (step S103). It is assumed that, as a result, m groups are formed.

Next, the average of the coordinates on the two-dimensional photoreceiving surface is calculated to determine the center of gravity with respect to each of the m groups (step S104). Then, the m set of the IDs and the center of gravity are stored in a memory (step S105).

Then, items of data transmitted from m transmitters are received independently of one another, and these are recognized as m sets [ID, center of gravity] of items of data and the coordinates (step S106). As a result, communication paths of m channels are established.

In pixels around point s1, at which information transmitted by the transmitter S1 is received on the two-dimensional photoreceiving surface, there are hardly influences due to another transmitter S2 and a noise source N1, and the S/N ratio is high. The reason for this is that the point s1 at which a signal from the receiver S1 is received, and the points s2 and n1 which receive light from the transmitter S2 and the noise source N1 are spaced apart on the two-dimensional photoreceiving surface, and do not exert influences with each other. At point s1, when the direct light from the light source S1 is compared with the indirect light from the other light sources S2 and N1, the direct light from S1 is stronger, and the signal from S1 can be received at a higher S/N ratio.

Figure 29:
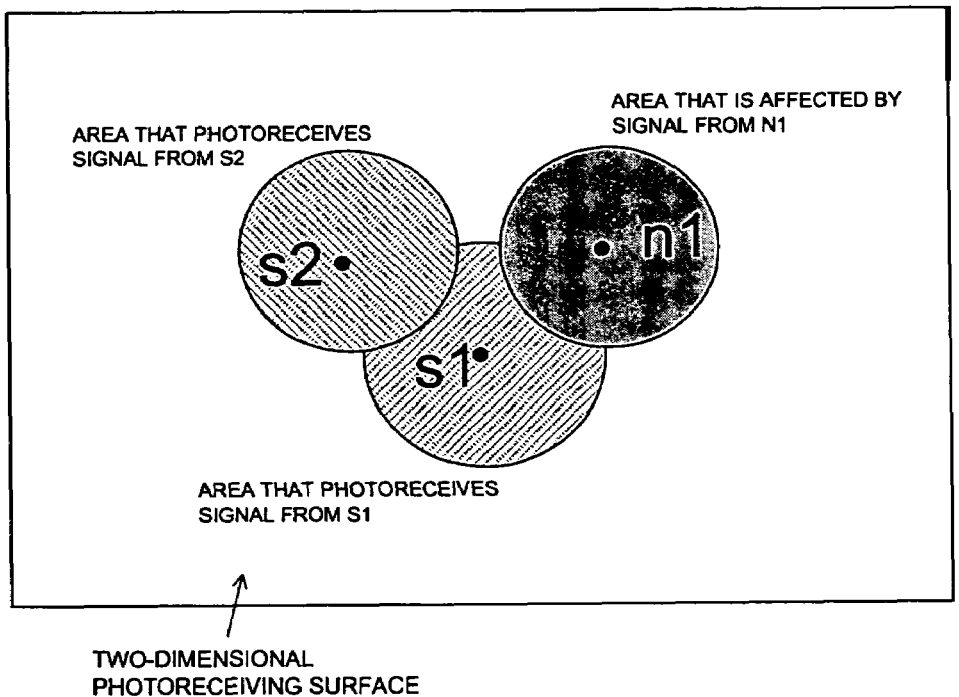
FIG. 29 illustrates multi-channel transmission by the data communication system 10 according to one embodiment of the present invention.

The points s1, s2, and n1 on the two-dimensional photoreceiving surface need only be different pixels. Therefore, if these do not overlap completely, as shown in FIG. 29, even if these are very close to each other, the signal can be correctly received. In the receiver 50 according to this embodiment, since the pixels on the two-dimensional photoreceiving surface can receive data independently of one another, a plurality of pixels around the point s1 receive the signal from the transmitter S1. Furthermore, even if the point s1, the point s2, and n1 are close to each other, all the pixels around the point s1 are not affected (these are excluded), and based on the output from the pixels which are not affected, the signal from the transmitter S1 can be correctly received.

Similarly to the transmitter S1, the same may be said of another transmitter S2. That is, as a result of receiving the signal on the two-dimensional photoreceiving surface, it is possible for the receiver 50 to simultaneously establish communication paths with both the transmitters S1 and S2. This is based on the fact that, since the viewing angle of each pixel of the sensor, arranged in an array, is small, and the sensor has a high spatial resolution, even if a plurality of transmitters exist, their optical signals can be extracted without exerting an influence on one another.

After the same number of communication paths as the number of a plurality of transmitters are established at the same time, by combining with another method such as a frequency division method, a plurality of communication paths may be theoretically established with respect to each combination.

The two transmitters S1 and S2 shown in FIG. 26 need not be physically different devices. For example, a plurality of communication paths may be simultaneously established with a physically single transmitter in which a plurality of light sources are arranged, whose spatial positions are deviated in such a manner as to be capable of being sufficiently identified when seen from the receiver 50.

In the foregoing, for the sake of descriptions, the number of transmitters and noise sources is limited, but, of course, the same advantages can be obtained by any number of transmitters and noise sources. Furthermore, even if the geometrical relationship between the receiver and each light source are variously combined in addition to those described above, the same advantages can be obtained.

D-3. Bidirectional Communication

Figure 30:
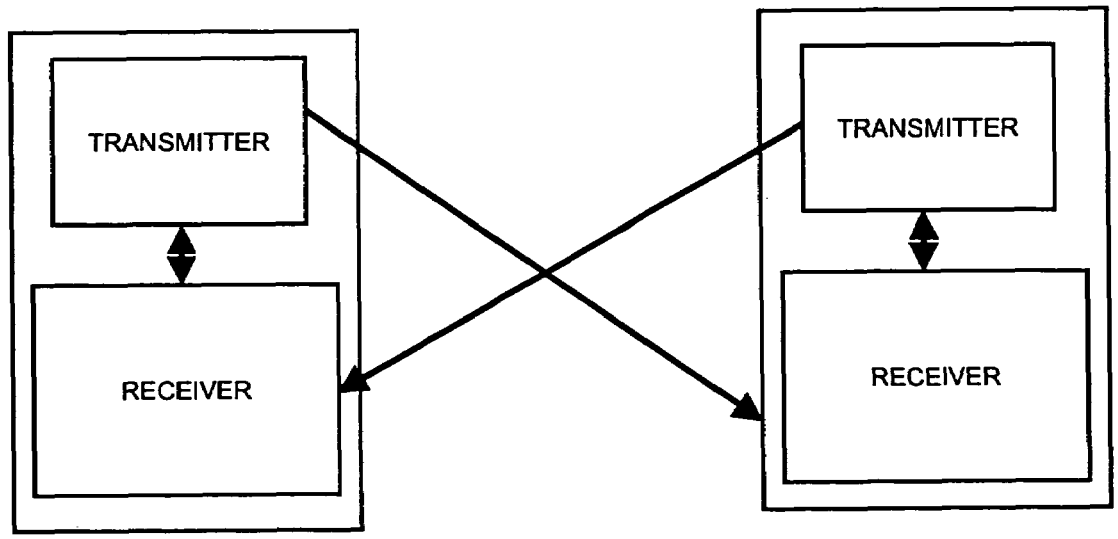
FIG. 30 illustrates bidirectional communication using a data communication method according to one embodiment of the present invention.

Data communication devices in which both the functions of the transmitter 20 and the receiver 50, shown in FIG. 1, are incorporated can perform bidirectional communication in which an optical signal which is coded into a flashing pattern is used (see FIG. 30).

The bidirectional communication is a fundamental function which is indispensable for communication, which is not limited to optical communication. For example, it is possible for a unit to return "ACK (acknowledgement)" indicating that data has been received to a unit of the data transmission source, and retransmission of packets becomes possible. In addition to this, various applications are possible, and all existing communication techniques which are made possible by bidirectional communication can be applied.

E. Examples of Applications to Augmented Reality System

According to the data communication system 100 of this embodiment, it is possible to provide a data transmission method which is robust in terms of distance, in which an optical signal such as light emission of a flashing pattern of an LED from the transmitter is used. Furthermore, since the receiver performs a process for receiving an optical signal by using a two-dimensional image sensor, not only can an optical signal be simply received to obtain transmission data, but also the real-world circumstances such as the spatial position and the orientation of a real-world object having a transmitter incorporated therein can be obtained by detecting the photoreceived position of the optical signal on the two-dimensional photoreceiving surface. Therefore, in the application part 70 on the receiver side, it is possible to provide various augmented reality services based on the real-world circumstances. Several examples of applications to the augmented reality system of the data communication system 100 according to this embodiment will now be described below.

E-1. Application Example 1 (Video Overlay) Augmented Reality System

A transmitter 20 in which an LED is used as a light source is disposed in a signboard, illumination, a lamp of a building, a signal device, etc., in a real space. When a user looks at a signboard of a restaurant on an information terminal such as a PDA in which the receiver 50 is incorporated (or is connected), the user can obtain the object ID of the restaurant, transmitted from the transmitter 20. Furthermore, by searching a database for this object ID, it is possible to extract information such as the menu of the restaurant and to display it on the screen of the PDA.

When the user looks at a poster of a movie immediately in front by a PDA with a camera, the ID information of the movie is obtained from the transmitter 20 disposed in the neighborhood of the poster, and the database is searched on the basis of this ID information, making it possible to extract the preview of the movie and to display and output it on the screen of the PDA. Alternatively, when the PDA is operating on a stand-alone basis, the ID information may be directly displayed on the screen.

Furthermore, when the user looks at a structure, such as a distant building or a bridge, using a PDA with a camera, the ID information of the structure is extracted by the flashing of a lamp attached to these structures, and the database is searched on the basis of this ID information, thereby extracting the information of an event held in the structure or in the neighborhood thereof, and displaying and outputting it on the screen of the PDA. Alternatively, when the PDA is operating on a stand-alone basis, the ID information may be directly displayed on the screen.

In forms in which an image is output, only the ID information obtained in the decoding mode and the information contents extracted on the basis of the ID information may be displayed on the screen, or this type of object-related information may be displayed in an overlaid manner on the image of the object (a signboard, a poster, a building, etc.) captured in the image mode.

As an augmented reality system in which an image is synthesized in such a manner that a message (text and graphics) generated in accordance with the recognized ID information is superimposed on a video image obtained from a camera, for example, a "NaviCam" is known (for the NaviCam, refer to, for example, the paper jointly written by Jun Rekimoto and Katashi Nagao, "The world through the computer: Computer augmented interaction with real world environments" (In Proceedings of the ACM Symposium on User Interface Software and Technology (UIST '95), pp.29-36, 1995).

For example, when the NaviCam is held out in front of a calendar posted on a wall, on the display thereof, schedule information obtained from the database is superimposed on the video image of the calendar. This made be said as an information access using a metaphor of a magnifying glass. The NaviCam can display the object of the real world in an enlarged manner in terms of "information".

In order that the data communication system 10 according to this embodiment is used in the NaviCam, it is necessary that the receiver 50 can operate in the image mode in addition to the decoding mode and that the receiver 50 is incorporated in or is connected to an information device having a display screen (or a viewfinder) of a PDA or the like. Furthermore, it is preferable that the application part 70 within the receiver 50 has a database so as to extract information content related to an object on the basis of the ID information of the object, obtained in the decoding mode, or has a network connection function so as to access an external database.

Figure 31:
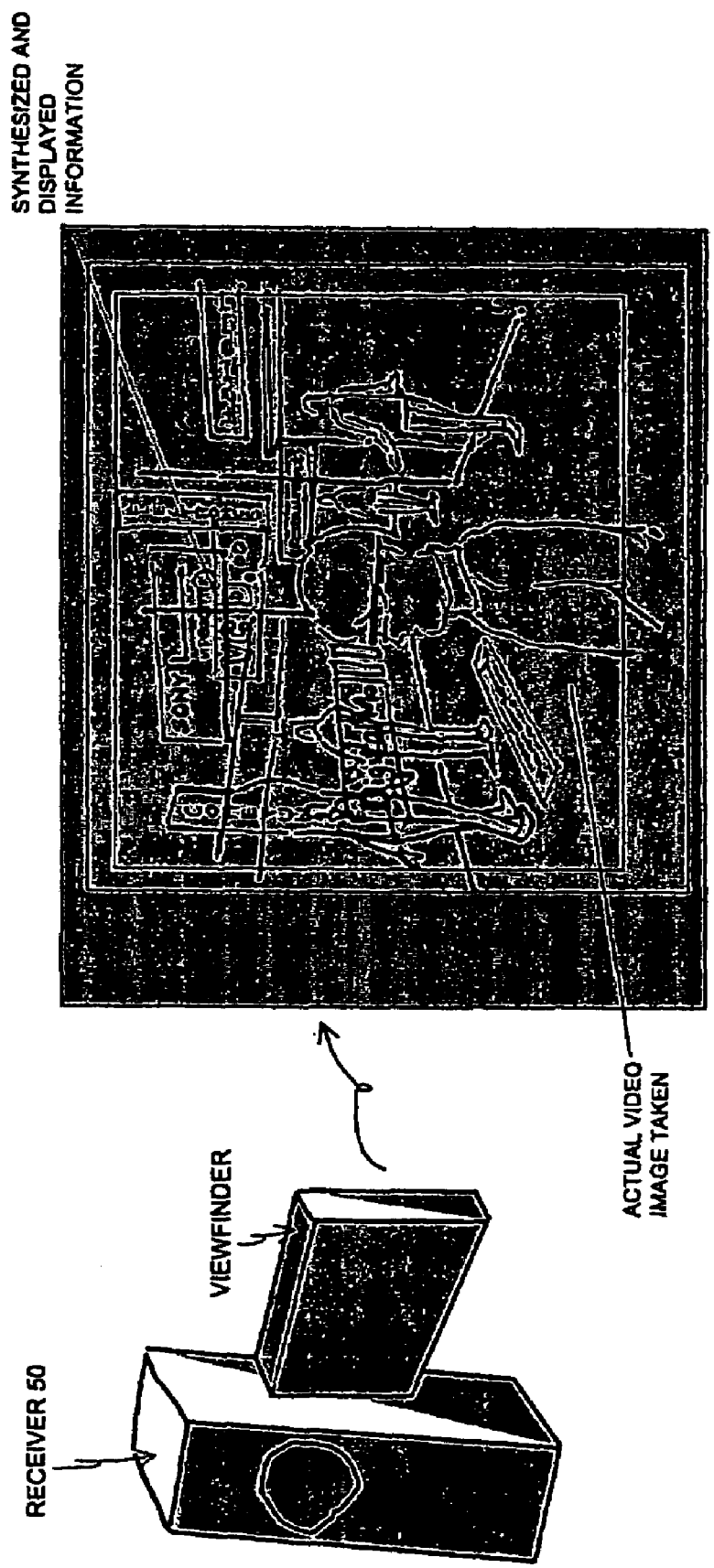
FIG. 31 shows a state in which the data communication system 10 according to one embodiment of the present invention is used in a NaviCam.

FIG. 31 shows a state in which the data communication system 10 according to this embodiment is used in the NaviCam. As shown in FIG. 31, the ID information of the object, obtained in the decoding mode, or the information searched on the basis of this ID information, is displayed in an overlaid manner on the image which is actually captured by the receiver 50 in the image mode.

In this case, although the absolute position of the object is not clear, if the field of view of the optical system of the camera matches that of the position sensor, it is possible to display the information in an overlaid manner at the position of the ID (i.e., the transmitter 20) of the video image which is being watched. As shown in FIG. 31, virtual information (e.g., a commercial or a bulletin board) can be superimposed on an actual video-image and can be displayed.

As a light source of the transmitter 20 which transmits an optical signal such as a flashing pattern, in addition to the above-described LED, a pilot lamps of a building, a neon sign of a signboard, a signal lamp, lamps of a vehicle, an illumination lamp on the street, etc., can be used.

When the receiver 50 operates as a NaviCam, in the decoding mode, the flashing pattern from the transmitter 20 is decoded to obtain the ID information of the object, and the positional information of the pixel which has detected the flashing pattern on the two-dimensional photoreceiving surface is obtained.

Initially, the database is searched on the basis of the ID information. The database may be included within the receiver 50 or may be an external database which is accessed via a wireless network, etc.

Furthermore, based on the positional information of the flashing pattern on the two-dimensional photoreceiving surface, the data which is searched in the database is displayed in an overlaid manner at a place where the flashing pattern is detected within the image frame captured in the camera mode.

Figure 32:
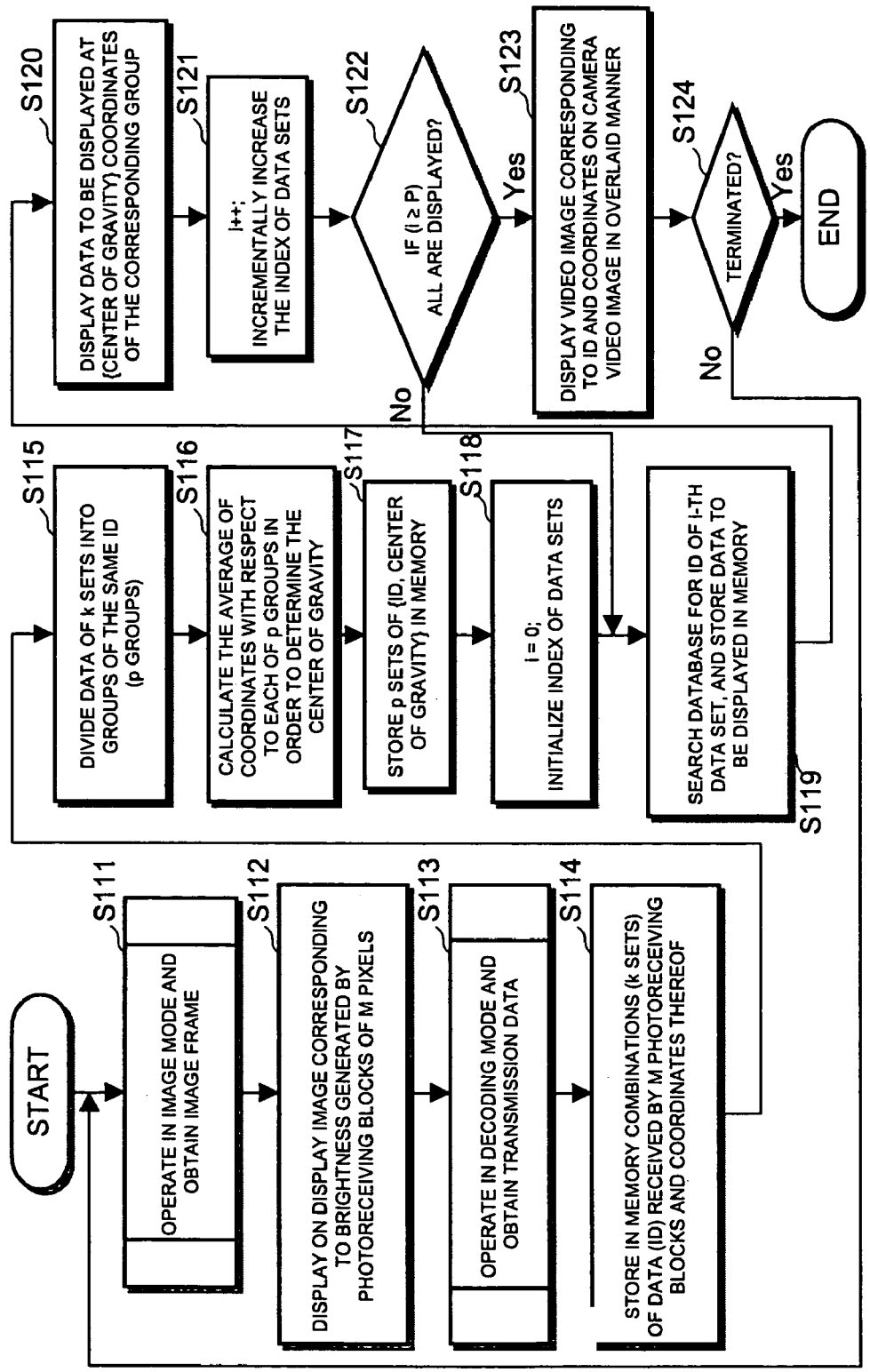
FIG. 32 is a flowchart showing a processing procedure for the receiver 50 to operate as a NaviCam.

FIG. 32 shows in a flowchart a processing procedure for the receiver 50 to operate as a NaviCam. This processing procedure is realized in a form in which, for example, the application part 70 executes predetermined program code. The operation of the NaviCam will now be described below with reference to this flowchart.

Initially, the receiver 50 operates in the image mode. That is, each of the photoreceiving blocks 51-1, . . . , 51-M obtains photoreceived data corresponding to the brightness in the image mode in accordance with the processing procedure shown in FIG. 12, and the data acquisition section 60 obtains an actually captured video image in accordance with the processing procedure shown in FIG. 16 (step S111). As a result, in the frame memory 64 within the data acquisition section 60, still images (or moving images) composed of image frames of M×T bits are stored.

In the application part 70, first, the image corresponding to the brightness, generated by the photoreceiving blocks 51-1, . . . , 51-M of M (=n×m) pixels, is displayed on the display (step S112).

Next, the receiver 50 operates in the decoding mode. That is, each of the photoreceiving blocks 51-1, . . . , 51-M operates in accordance with the processing procedure shown in FIG. 11, and in the photoreceiving block at a position at which the flashing pattern (light beacon) transmitted from the transmitter 20 disposed in the vicinity of an object is formed into an image, transmission data corresponding to the detected flashing pattern is stored. Furthermore, the data processing section 60 operates in accordance with the processing procedure shown in FIG. 14, and obtains a set of the N-bit transmission data and the address of the photoreceiving block (i.e., the position on the two-dimensional photoreceiving surface), which are received, is obtained (step S113). As a result, in the transferred-data processing memory 63 within the data acquisition section 60, the N-bit transmission data (payload) sent from the transmitter 20 is stored.

In the application part 70, the combination of the N-bit transmission data and the address of the photoreceiving block (i.e., the position on the two-dimensional photoreceiving surface), acquired by the data acquisition section 60, is temporarily stored in the work memory thereof (step S114).

The N-bit transmission data is, for example, the ID information of the image-captured object. The number k of items of the acquired transmission data corresponds to the number of transmitters, i.e., objects, whose images are captured, within the image frame, and the address of the photoreceiving block corresponds to the place where the object is made to appear on the two-dimensional photoreceiving surface, that is, within the image frame.

Next, the data of the k sets is divided into groups of the same ID (step S115). It is assumed here that these are divided into p groups.

With respect to each of the p groups, the average of the coordinates on the two-dimensional photoreceiving surface, that is, within the image frame, is calculated, and the center of gravity of each group is determined (step S116). Then, the ID and the calculated center of gravity, which are made to be a set, are temporarily stored in a work memory (step S117).

Next, the index variable i for specifying a data set is initialized to 0 (step S118), after which the ID of the i-th data set among the p sets is searched in the database in order to extract the data to be displayed for the object corresponding to the i-th ID, and this data is temporarily stored in a work memory (step S119).

Next, the data to be displayed for the i-th data is extracted, and the data is displayed at the coordinates of the center of gravity thereof on the display screen (step S120).

Next, the index i is incremented by 1 (step S121), and it is determined whether or not i has reached p (step S122).

If i has not yet reached p, since an object which is not yet processed remains, the process returns to step S119, where the above-described process for searching for the display data and the above-described process for displaying the data at the position of the center of gravity are repeatedly performed.

If i has reached p, a display process is completed for all the objects for which the transmission data has been received. Therefore, on the display screen, the camera video image captured in the image mode, the ID transmitted from the object contained therein, and a video image corresponding to the photoreceived position thereof are displayed in an overlaid manner (step S123).

When the processing is to be continued (step S124), the process returns to step S111, where the same processes as those described above are repeatedly performed.

According to the data communication system 10 of this embodiment, since the receiver 50 can recognize optical signals placed ubiquitously from a far distance regardless of indoors or outdoors, such a video-overlay augmented reality system can be used in various actual environments in addition to specific ideal environments such as experiment rooms and art museums, and storage distances.

In a case where the data communication system 10 according to this embodiment is applied to such an augmented reality system, it is necessary to convert data which is to be transmitted by being coded into an optical signal into an URL for the corresponding electronic information. For example, the configuration may be formed in such a way that a unique ID such that all the transmission data is approximately 128 bits is transmitted, and that a server which converts the unique ID into a URL is operating in the network.

E-2. Application Example 2

In uses for autonomous mobile robots, for control of parking a vehicle in a garage, etc., it is necessary to measure with high accuracy the position of a moving machine body.

When the data communication system according to this embodiment is to be applied, transmitters that generate a flashing pattern (light beacon) are arranged at a plurality of points whose positions are known in a work space. Then, a receiver is mounted on a machine body such as a robot and a vehicle, and an image of a work space is captured. When a fixed number or more of the combinations of the coordinates on the image frame and a point in the work space can be determined at the same time, the position and the inclination or the orientation of the receiver i.e., the machine body, in the work space can be calculated.

There is a meet in which small robots play soccer on a predetermined work plane such as on a desktop (e.g., "RoboCup"). In such a case, transmitters are disposed in the head part and the top side of the back of each robot so as to transmit the ID information of the robot itself in the form of a flashing pattern (light beacon), and also a receiver is disposed over the field where the game is played, so that the system side can recognize with ease and with high accuracy the position and the orientation of each robot. For example, by comprehensively analyzing the position of each robot, the score of the game, and the progress, it is possible to work on a strategy (i.e., a command for each robot).

Of course, in addition to one receiver, a plurality of receivers may be provided on the machine body such as a robot and a vehicle. In such a case, the robot can search for a transmitter in a wide field of view in order to measure the position and the inclination of the robot itself. That is, each transmitter functions as a land mark.

E-3 Application Example 3

The receiver of the data communication system according to this embodiment may be used in such a manner as to be combined with a rotation sensor such as a gyro.

In such a case, first, the absolute coordinates and the orientation are determined by the receiver, after which, by tracking the relative rotation direction by the gyro, even if the transmitter lies off the screen of the receiver, it is possible to track the transmitter by following the rotational motion.

E-4. Application Example 4

In a general computer, a user interface formed of user input devices such as a mouse, a keyboard, etc., and a GUI (Graphical User Interface) display screen forms the basis. In contrast, in the real world-oriented interface which is also called "augmentable reality", a desk top which is a work environment of the computer is augmented, and various objects in a real space, such as a desk, books, pencils, video cassettes, etc., in a room, can be used as input means to the computer.

One example of this augmentable reality technique includes a technique called "digital PostIt". Normal PostIt is used to recall memories when an object is watched later by posting a memo drawn with a pen onto an object. In contrast, digital PostIt does not use physical media such as paper, but digitally links objects in the real world to data such as a memo related to the object and digitally reproduces the data.

The data communication system according to this embodiment can be applied to the digital PostIt. That is, since the space position of each physical object can be measured with a higher accuracy by using a receiver, data can be placed in the real world at a finer grain size.

E-5. Application Example 5

Another example of the augmentable reality technique includes "gaze-link" which provides a metaphor for establishing a network connection with an object which is being watched with a camera. For example, by posting a visual marker equivalent to an ID in advance to a connection target, it is possible to identify a target and to establish a connection by simply capturing an image with a camera. Furthermore, as a result of realizing a lasting connection with the identified device, in a network environment in which many devices are interconnected with one another, it is possible for the user to intuitively or directly specify an operation target without being concerned with the name of each device, etc.

As a result of applying the data communication system according to this embodiment to gaze-link, it is possible to measure with higher accuracy objects distributed in the work space and to accurately specify a target device. Furthermore, simply by decoding a flashing pattern (light beacon) of an LED as data of a predetermined bit length, the object can be recognized, and processes with a heavy load, such as image recognition, in which visual markers such as cybercodes are identified, are not required.

The gaze-link technology is disclosed in, for example, Japanese Unexamined Patent Application Publication No. 2001-142825 which has already been assigned to the present applicant.

E-6. Application Example 6

In a case where a plurality of receivers which are connected over a network are disposed at places whose spatial positions are known, by performing stereo matching, it is possible to calculate the spatial position of the transmitter whose image is captured by two or more receivers.

When a stereo process is to be performed, it is necessary to establish time-related synchronization among a plurality of receivers. By causing a flashing pattern (light beacon), such as the ID information, transmitted from a transmitter to be incrementally changed over time, a time code can be included in the transmission data. It may be said that the instants the same ID information is decoded are the same time. As a result, it is possible to easily establish synchronization among the receivers.

As a result of arranging a plurality of receivers and a plurality of transmitters in the work environment, the relative position between the transmitters and the receivers can be measured three-dimensionally by using a stereo process and coordinate estimation by projection conversion.

For example, as a result of disposing a receiver on the ceiling of a conference room, a real-world object can be recognized and the position thereof can be detected in a multi-information environment such as InforRoom. (For InforRoom, for example, refer to the paper by Junichi Rekimoto "InforRoom: Direct Operation Environment Augmented in the Real World" (Interaction 2000, pp. 9-1.6, 2000)). Furthermore, it can be used as a position recognition system in an indoor or outdoor autonomous mobile robot or a vehicle parking-in-garage system.

As research for recognizing the position of a flashing light source, for example, PSD (Position Sensitive Detector), and a position recognition system for identifying a beacon by using a high-speed camera (refer to, for example, paper jointly written by M. Bajura and U. Neumann, "Dynamic Registration Correction in Augmented Reality System" (VRAIS'95, pp. 189-196, 1995), and "The Visual Eyes System" by PhoeniX Technologies Ltd. (http://ptiphoenix.com)). However, in these existing systems, the flashing timing of a beacon must be synchronized in the entire system, and since there is a limitation on the placement of the beacon, uses are limited. Furthermore, in a system in which a beacon which flashes on and off without being synchronized with the system (for example, refer to paper jointly written by D. J. Moore, R. Want. B. L. Harrison, A. Gujar, and K. Fishkin, "Implementing Phicons: Combining Computer Vision with InfraRed Technology for Interactive Physical Icons" (UIST'99, pp. 67-68, 1999), and paper written by Hisashi Aoki "Infrared Tags Read by Camera and Applications" (Interactive System and Software, VIII, pp. 131-136, 2000), only sampling at as low as 30 Hz can be performed, the recognition speed is very low, and the system cannot be used for a mobile unit.

In contrast, the data communication system 10 according to this embodiment can operate at its own clock without being synchronized with the flashing pattern of an optical signal. As a result, it is possible for a plurality of independent optical signals to exist at the same time in one environment. For example, as a result of increasing the operating clock to two times as high in both the flashing pattern of the optical signal and the receiver, the system can operate at a maximum of 60 fps. In the case of such a degree of speed, the system can be applied to a task requiring time accuracy such as motion capture.

When the transmitter is moving, on the receiver side, the position of the pixel which receives the optical signal moves on the image sensor. By integrating the data photoreceived by a plurality of adjacent pixels, it becomes possible to receive the transmission data from the moving transmitter and to decode the transmission data.

F. Applications to System for Transmitting the Value of Sensor Connected to the Transmission Side The system for transmitting the detected value of a sensor connected to the transmitting side can be applied to a case in which, for example, interactions between the user and the computer are performed. A computer input system using a pointing device such as a mouse is a representative example thereof. In this type of system, for example, if a sensor can be incorporated in a device held by the hand and the system can recognize both the position of the sensor and the value thereof, the flexibility of the system design and the ease of use of the system can be improved.

In this type of system, if a method of recognizing the position of the sensor is applied by using an optical signal composed of a flashing pattern of a light source such as that described above, it is necessary to transmit the value of the sensor by using another route such as radio waves. However, the provision of a plurality of transmission paths such as a transmission path for the information of the sensor value and a transmission path for the positional information is undesirable from the point of view of designing, in particular, a small device.

According to the present invention, a small transmitter can be used to transmit a signal such that, for example, the ID of a device and the value of the sensor are combined, and based on this transmission information, the receiver side can recognize both the value of the sensor and the position of the device. As a result, by applying the present invention, it is possible to easily construct a system even if a small device is used in the transmission side.

A description will now be given below of configuration examples and application examples in a case where the present invention is applied to a system for transmitting the detected value of a sensor connected to the transmission side.

F-1. Configuration Example 1

Figure 33:
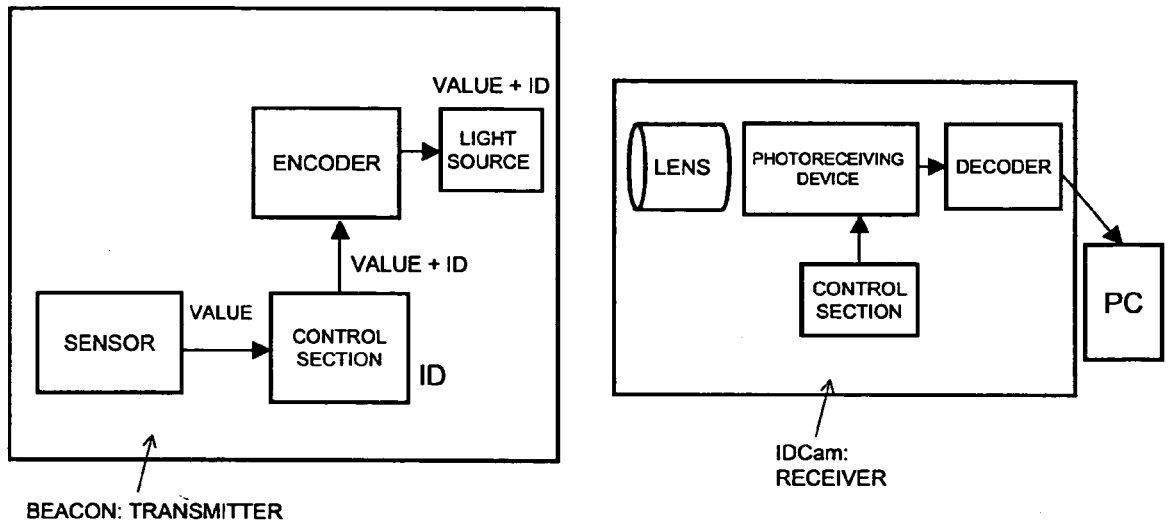
FIG. 33 shows an example of the configuration of a system for transmitting the detected value of a sensor connected to the transmission side.

FIG. 33 schematically shows an example of the configuration of a system for transmitting the detected value of a sensor connected to the transmission side. In the example shown in FIG. 33, in the transmitter, the value of the sensor is read into the control section, the data of the format containing the value of the sensor and the ID of the transmitter is encoded by an encoder, and an optical signal containing the information of the value of the sensor and the ID of the transmitter is transmitted from the light source to the receiver.

Here, the transmitter can be formed as, for example, a light beacon. In this case, for example, for the light source, a flashing LED may be used, and for the optical signal output from the light source, a signal such that the value of the sensor and the ID of the transmitter are encoded into a chronological flashing pattern may be used.

In the receiver, the optical signal sent from the transmitter is collected by lenses, after which the light is received by a photoreceiving device. The operation of the photoreceiving device is controlled by the control section, so that the photoreceived data is sent to the decoder. The decoder transfers the data of the value of the sensor and the ID of the transmitter, which are obtained by a decoding process, to a personal computer (PC) which is externally connected. It is possible for the PC to determine the value of the sensor and the position of the transmitter on the basis of the input data from the decoder.

Here, for the receiver, a receiver having a two-dimensional photoreceiving surface, for example, a receiver in which photoreceiving devices of several million pixels are arranged in an array like an image sensor used in a general digital camera, etc., is used. It is preferable that a CMOS image sensor capable of high-speed image capture is used for the photoreceiving device so that the time resolution of the receiver is increased and the detection accuracy of the position of the receiver is increased.

F-2. Configuration Example 2

Figure 34:
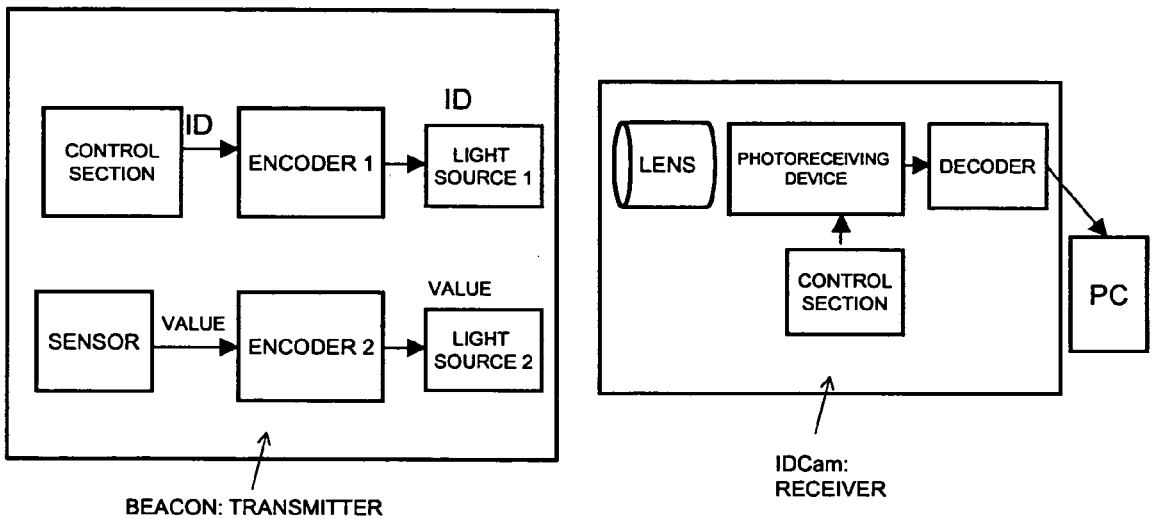
FIG. 34 shows another example of the configuration of a system for transmitting the detected value of a sensor connected to the transmission side.

FIG. 34 schematically shows another example of the configuration of a system for transmitting the detected value of a sensor connected to the transmission side. In the example shown in FIG. 34, in the configuration of the receiving side, the processes of the decoder mainly differ from those of the configuration example in FIG. 33 (in some cases, the processes on the PC side which is externally connected also differ).

In the configuration example shown in FIG. 34, in the transmitter, a light source for sending an optical signal with regard to the ID of the transmitter itself, and a light source for sending an optical signal with regard to the value of the sensor are disposed separately. One of the light sources 1 sends an optical signal in such a manner as to correspond to the, ID of the transmitter, which is sent from the control section to an encoder 1, and the optical signal is encoded thereby, and the other light source 2 can be independently driven concurrently with this. The modulation methods in the encoders 1 and 2 may be the same, and different modulation methods can also be used.

In the receiver, for the lenses, photoreceiving devices, and the control section, those having the same configuration as that of each of the corresponding function modules in FIG. 33 can be used. For the decoder, a decoder which are compatible with both the modulation methods employed in the encoder 1 and the encoder 2 on the transmitter side are used.

If the same modulation method is used in the encoder 1 and the encoder 2, it is sufficient that the decoder only includes a single modulation method, and this is advantageous in the cost and the size reduction of the apparatus. Furthermore, if these use different modulation methods, it is easy to discriminate between the ID of the transmitter and the value of the sensor.

F-3. Configuration Example 3

Figure 35:
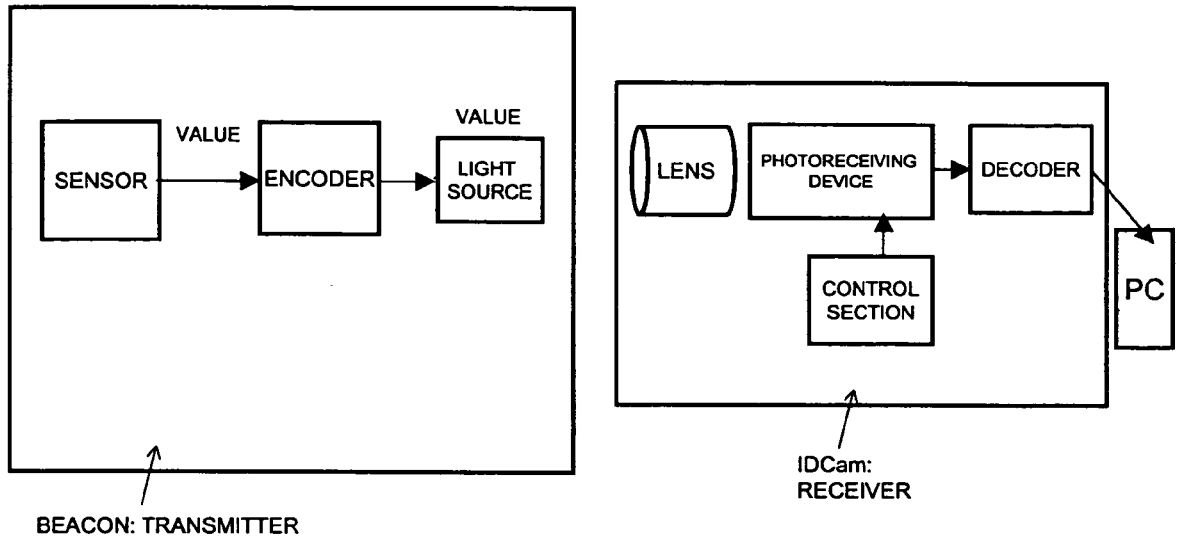
FIG. 35 schematically shows still another example of the configuration of a system for transmitting the detected value of a sensor connected to the transmission side.

FIG. 35 schematically shows still another example of the configuration of a system for transmitting the detected value of a sensor connected to the transmission side. In the example shown in FIG. 35, the transmitter side is configured in such a manner that the ID of the transmitter itself is not transmitted and only the value of the sensor is transmitted. In the system configuration shown in FIGS. 33 and 34, since, basically, the configuration may be formed by removing the function modules for transmitting the ID of the transmitter, no further descriptions are given here.

F-4. Specific Application Example

A description will now be given below of a specific application example of a system for transmitting the detected value of a sensor connected to the transmission side.

Figure 36:
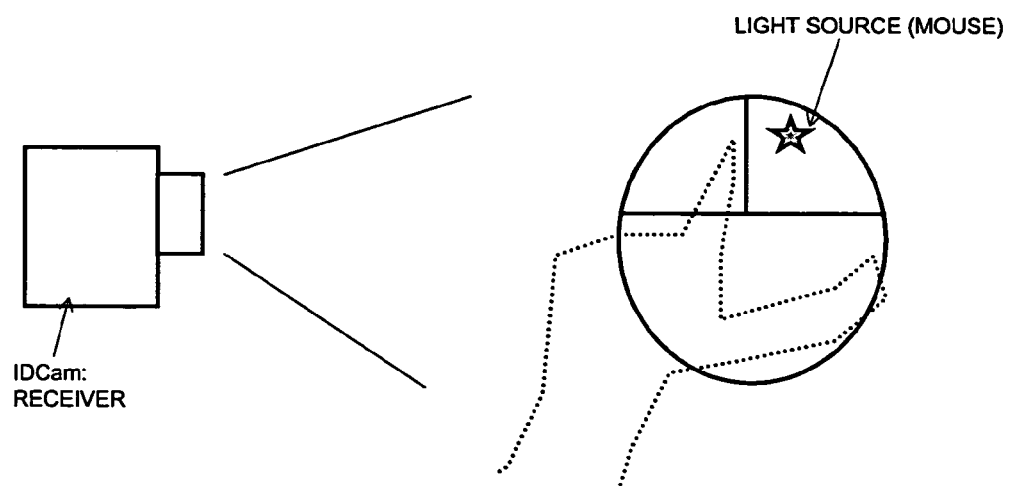
FIG. 36 schematically shows an application example in which the system which transmits the detected value of the sensor connected to the transmission side is used in a mouse button.

FIG. 36 schematically shows an application example in which the system which transmits the detected value of a sensor connected to the transmission side is applied to a mouse button. In the application example shown in FIG. 36, the system can be implemented on the basis of one of the system configurations described with reference to FIGS. 33 to 35. The transmission data on the transmitter side contains the on/off state of the mouse buttons (right and left) and the unique ID of the mouse. For example, when the mouse ID is "100", the right button is off (the value of the sensor is 0), and the left button is on (the value of the sensor is 1), the transmission data may be set to 10001 by concatenating these bits.

Furthermore, the system for transmitting the detected value of a sensor connected to the transmission side can also be applied to a jog-dial-incorporated device. This application example can also be implemented on the basis of one of the system configurations described with reference to FIGS. 33 to 35. In this application example (not shown), for example, the rotation angle and the relative rotation direction of a jog can be set as values of the sensor, and these can be sent together with the unique ID of the jog dial.

In addition, the system for transmitting the detected value of the sensor connected to the transmission side can also be applied to a battery capable of notifying the remaining level thereof. This application example can also be implemented on the basis of one of the system configurations described with reference to FIGS. 33 to 35. In this application example (not shown), for example, the configuration is formed in such a manner that the value of the sensor for detecting the remaining level of the battery and the ID unique to the battery are combined and are transmitted. For example, when the battery ID is "100" and the indication value of the remaining level of the battery is 120, it is conceivable that the transmission data is formed as 100120 in which these are concatenated. Furthermore, in this application example, the ID of the transmitter can also be changed in accordance with the remaining level of the battery. For example, when the battery is fully charged, the ID may be set to 100, and when there is no remaining battery power, the ID may be set to 110.

Figure 37:
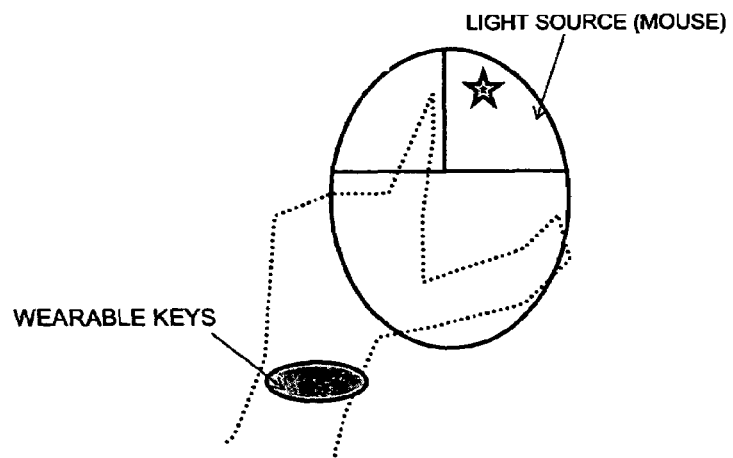
FIG. 37 schematically shows an example in which the system which transmits the detected value of the sensor connected to the transmission side is applied to a system using an authentication device.

Furthermore, the system for transmitting the detected value of the sensor connected to the transmission side can be applied to a system using an authentication device. This application example can also be implemented on the basis of one of the system configurations described with reference to FIGS. 33 to 35. FIG. 37 shows, as one of the application examples, a personal-authentication wireless mouse. In the example shown in FIG. 37, authentication using a wearable key (WearableKey) is performed. In this example, an authentication sensor (not shown) is disposed on the mouse side. The wearable key can communicate personal ID, etc., by using a living body in a communication path. In the example shown in FIG. 37, if the personal ID stored in the wearable key is 100 (that is, the value detected by the authentication sensor) and the mouse ID is 120, the transmission data is formed by concatenating these, and an optical signal corresponding to 100120 is transmitted from the light source of the mouse. In this type of system application example, in addition to the authentication sensor of the wearable key, RF tags, living body information such as fingertips and voiceprints, and authentication media such as memory cards, can be used.

Figure 38:
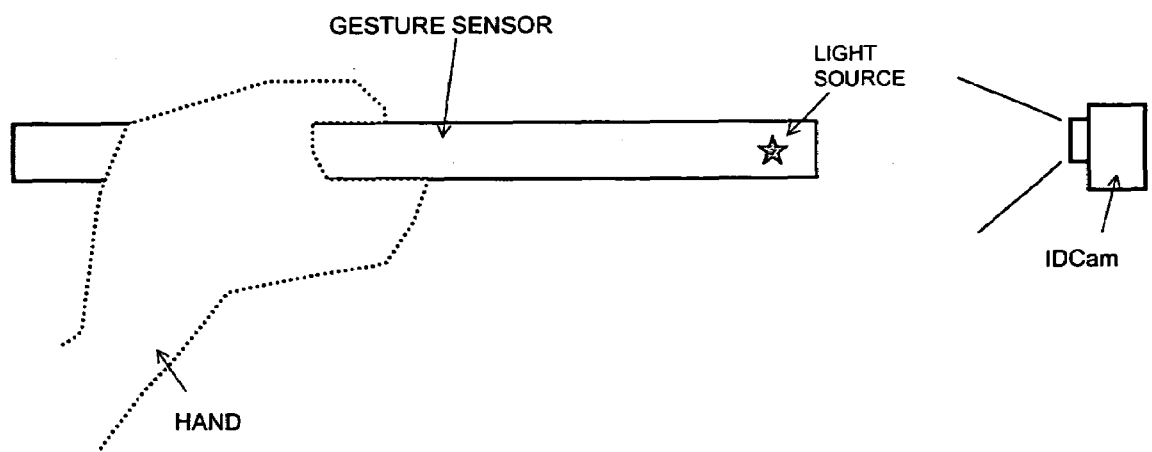
FIG. 38 schematically shows an example in which the system which transmits the detected value of the sensor connected to the transmission side is applied to a system which is combined with a myogenic-potential sensor.

In addition, as shown in FIG. 38, the system for transmitting the detected value of the sensor connected to the transmission side can be applied to a system combined with a myogenic-potential sensor. This application example can also be implemented on the basis of one of the system configurations described with reference to FIGS. 33 to 35. The myogenic-potential sensor can extract and measure the myogenic potential generated by the action of the muscle from the surface of the skin. By using the myogenic-potential sensor, it is possible to measure how much power a person, whose performance is being measured, wants to apply. By combining the system for transmitting the detected value of the sensor connected to the transmission side with the myogenic-potential sensor, for example, it is possible to control the device connected to the IDCam, etc., in accordance with the gesture such as how the hand is gripped, and the position of the transmission device.

Figure 39:
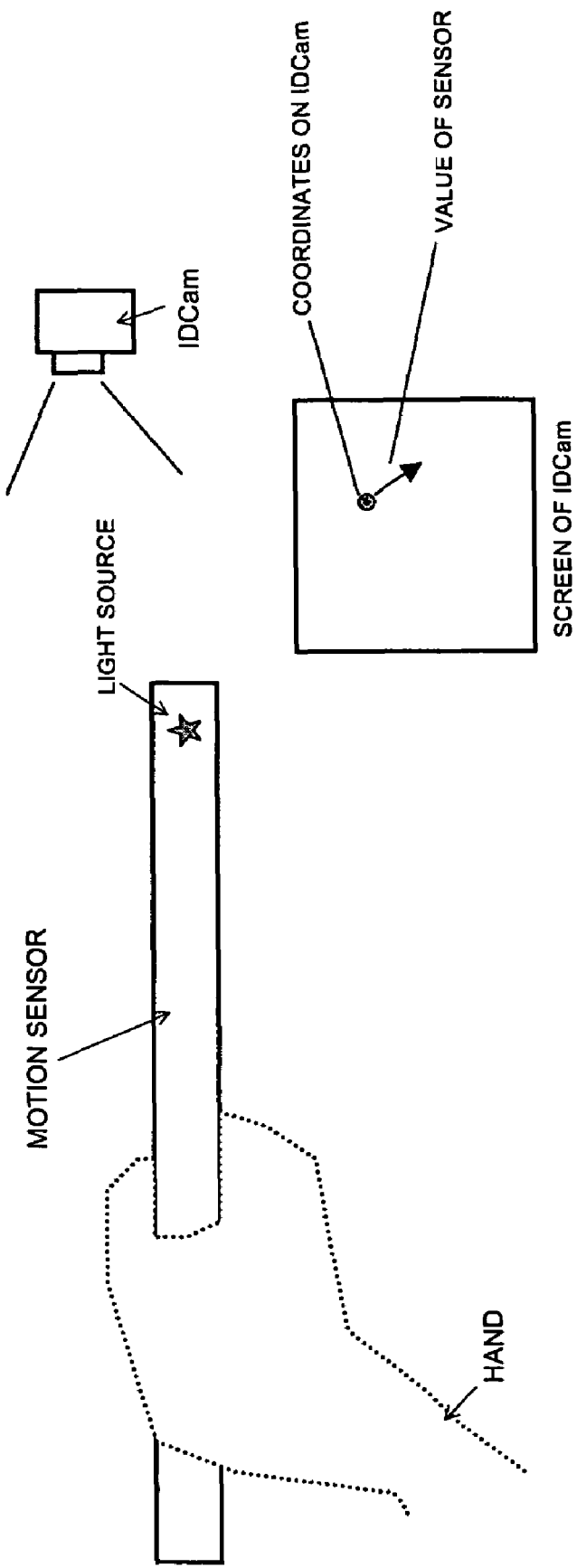
FIG. 39 schematically shows an example in which the system which transmits the detected value of the sensor connected to the transmission side is applied to a system which is combined with a motion sensor.

In addition, as shown in FIG. 39, the system for transmitting the detected value of the sensor connected to the transmission side can be applied to a system which is combined with a motion sensor. This application example can also be implemented on the basis of one of the system configurations described with reference to FIGS. 33 to 35. In the example shown in FIG. 39, the configuration is adopted in which an optical signal containing the value of the sensor, obtained by detecting the motion of the hand of a human being, is transmitted from the light source, and the optical signal is received by the IDCam. That is, a rough position is measured by the IDCam, whereas a very small motion is measured by the motion sensor, making it possible to recognize a motion which is finer or quicker than the resolution of the IDCam. Therefore, the substantially same advantage as the resolution of the IDCam being improved can be obtained. Furthermore, based on the image-captured information of the IDCam, it is possible to recognize the timing at which an object is hit. Furthermore, based on the image-captured information of the IDCam, the rotation at the same position as in the motion sensor or the detection target can be determined. As motion sensors, for example, inclination sensors, acceleration sensors, speed sensors, magnetic sensors, impact sensors, and so on, can be used according to the characteristics and uses of the system.

As discussed in the foregoing, according to the present invention, it is possible to construct a system capable of easily transmitting the value of the sensor connected to the transmission side to the receiver while maintaining the flexibility of the system design and the ease of use of the system.

Further Information

Up to this point, the present invention has been described in detail while referring to the specific embodiments. However, it is obvious that modifications and substitutions of the embodiments can be made by a person skilled in the art within the spirit and scope of the present invention. That is, the present invention has been disclosed in the form of examples, and should not be construed as being limited. In order to determine the gist of the present invention, the claims described at the beginning should be taken into consideration.

INDUSTRIAL APPLICABILITY

According to the present invention., it is possible to provide a superior data communication system, a superior data transmission apparatus, and a superior data receiving apparatus that are capable of directly transferring information from a real-world object which is not connected by a communication medium.

According to the present invention, it is possible provide a superior data communication system, a superior data transmission apparatus, and a superior data receiving apparatus that are capable of performing direct data transfer of information related to objects in the real world, such as the device ID, the network address, the host name, the URL, or real-world circumstances such as the position of the user, without using a communication medium such as a wired or wireless network.

According to the present invention, it is possible provide a superior data communication system, a superior data transmission apparatus, and a superior data receiving apparatus that are capable of performing robust data transfer from an object immediately in front up to an object which is comparatively far away.

According to the present invention, it is possible to provide a superior data communication system, a superior data transmission apparatus, and a superior data receiving apparatus that are capable of obtaining information, such as an ID, from an object, which is not connected by a communication medium, in the real world, and that are capable of recognizing real-world conditions, such as the spatial position and the orientation of the object.

The invention claimed is:

1. A data communication system comprising:
   a transmission apparatus comprising a data processing section for generating transmission data and a light-emitting section for emitting an optical signal such that the transmission data is coded; and
   a receiving apparatus comprising a photoreceiving section for receiving, on a two-dimensional photoreceiving surface, the optical signal from said transmission apparatus, and a data processing section for decoding the transmission data on the basis of a position at which the optical signal is received on said two-dimensional photoreceiving surface and from the photoreceived optical signal, wherein
   a sampling frequency of the data in said photoreceiving section is higher than a transferring frequency of said transmission data; and
   said transmission data includes an identifier of said transmission apparatus or an identifier of a real-world object related to said transmission apparatus.

2. The data communication system according to claim 1, wherein said sampling frequency is higher than two times said transferring frequency.

3. The data communication system according to claim 1, wherein said receiving apparatus is configured to operate in two or more operation modes, including an image mode for capturing an image of a scene and a decoding mode for receiving the optical signal, which is performed when not in the image mode.

4. The data communication system according to claim 1, wherein said transmission data forms a bit sequence containing two or more types of information.

5. The data communication system according to claim 1, wherein said transmission apparatus is disposed and used in a neighborhood of the real-world object, and is configured to emit an optical signal representing the identifier of the real-world object and one or more of: a network address, a host name, a resource identifier, data content, and a program code.

6. The data communication system according to claim 1, wherein a sensor is connected to said transmission apparatus, and said transmission data includes at least a value of said sensor.

7. The data communication system according to claim 1, wherein
   said transmission apparatus is configured to perform a predetermined modulation process on the transmission data in order to code the data into the optical signal, wherein the optical signal includes a flashing pattern of light or continuous variations of light intensity, and
   said receiving apparatus is configured to perform a corresponding demodulation process in order to extract the original transmission data.

8. The data communication system according to claim 1, wherein said receiving apparatus further comprises an application part for performing processing services corresponding to the position at which the optical signal is received on said two-dimensional photoreceiving surface and to the transmission data decoded from the received optical signal.

9. The data communication system according to claim 8, further comprising a communication medium for connecting the real-world object to a user terminal,
   wherein said application part is configured to obtain an address of the real-world object on said communication medium on the basis of the data decoded from the optical signal, and establish a connection between the user terminal and the real-world object.

10. The data communication system according to claim 8, wherein
    said receiving apparatus further comprises connection means for accessing an external information providing space, and
    said application part is configured to search said information providing space on the basis of the data obtained by decoding the optical signal, and extract information content related to the real-world object.

11. The data communication system according to claim 8, wherein said receiving apparatus further comprises captured-image processing means for processing a captured image corresponding to a brightness of the optical signal which is photoreceived on said two-dimensional photoreceiving surface, and image display means for displaying an image, and
    said application part is configured to display the captured image on a screen, and to display, on the captured image, the data obtained by decoding the optical signal in an overlaid manner at a place corresponding to the photoreceived position of the optical signal.

12. The data communication system according to claim 8, wherein said transmission apparatus comprises a plurality of light-emitting sections, and
    said application part is configured to specify a spatial position of said transmission apparatus based on positions of optical signals from the plurality of light-emitting sections detected on said two-dimensional photoreceiving surface.

13. The data communication system according to claim 8, wherein said receiving apparatus comprises a plurality of two-dimensional photoreceiving surfaces, and
    said application part is configured to specify a spatial position of said transmission apparatus by performing stereo matching on the basis of the optical signal detected on each of the plurality of two-dimensional photoreceiving surfaces and the photoreceived position thereof.

14. The data communication system according to claim 1, wherein said receiving apparatus further comprises captured-image processing means for processing a captured image according to a brightness of the optical signal received on said two-dimensional photoreceiving surface.

15. The data communication system according to claim 1, wherein, on said receiving apparatus, said data processing section is configured to divide the two-dimensional photoreceiving surface of said photoreceiving section into an area in which the photoreceived signal is too strong and data reproduction is impossible, an area in which the photoreceived signal has a sufficient intensity and data reproduction is possible, and an area in which the photoreceived signal is very weak and reception is impossible, and to decode the transmission data by using the photoreceived signal from the area in which data reproduction is possible.

16. The data communication system according to claim 15, wherein said data processing section is configured to determine a position of the center of gravity of the area in which data reproduction is possible, and to specify a spatial position of the transmission apparatus on the basis of the position of the center of gravity.

17. The data communication system according to claim 1, wherein a plurality of transmission apparatuses are disposed in the real world, and
on said receiving apparatus, said photoreceiving section is configured to receive the optical signal from the plurality of transmission apparatuses at the same time, said data processing section is configured to separate the optical signal on the basis of the photoreceived position on said two-dimensional photoreceiving surface, and said application part is configured to separate and detect each item of the decoded transmission data decoded on the basis of the photoreceived position on said two-dimensional photoreceiving surface.

18. A data transmission apparatus for use with a receiving apparatus comprising a photoreceiving section for photoreceiving an optical signal on a two-dimensional photoreceiving surface on the basis of a photoreceived position of the optical signal on said two-dimensional photoreceiving surface and from the two or more photoreceived optical signals, the data transmission apparatus comprising:
a data processing section for generating transmission data; and
a light-emitting section for coding the transmission data into the optical signal and sending the optical signal, wherein
the transmission data includes an identifier of said transmission apparatus or an identifier of a real-world object related to said transmission apparatus, and wherein
a transferring frequency of said transmission data is lower than a sampling frequency of the photoreceiving section.

19. The data transmission apparatus according to claim 18, wherein said sampling frequency is higher than two times said transferring frequency.

20. The data transmission apparatus according to claim 18, wherein said transmission data forms a bit sequence containing two or more types of information.

21. The data transmission apparatus according to claim 18, wherein said data transmission apparatus is disposed and used in a neighborhood of a real-world object, and
said data processing section is configured to generate the identifier of the real-world object and one or more of: a network address, a host name, a resource identifier, data content, and a program code, and said light-emitting section is configured to send the transmission data which is coded into the optical signal.

22. The data transmission apparatus according to claim 18, wherein said transmission apparatus is connected to a sensor, and
said transmission data contains at least the value of said sensor.

23. The data transmission apparatus according to claim 18, wherein said light-emitting section is configured to perform a predetermined modulation process on the transmission data so that the data is coded into the optical signal, and the optical signal comprises a flashing pattern of light or continuous variations of light intensity.

24. The data transmission apparatus according to claim 18, wherein a plurality of light-emitting sections are provided, so that space information in the real world is represented by a physical arrangement between the plurality of light-emitting sections.

25. A data receiving apparatus comprising:
a photoreceiving section for photoreceiving, on a two-dimensional photoreceiving surface, an optical signal such that transmission data is coded, a sampling frequency of the data being higher than a transferring frequency of said transmission data; and
a data processing section for performing data processing based on a combination of a photoreceived position of the optical signal on said two-dimensional photoreceiving surface and the data decoded from the photoreceived optical signal,
wherein the transmission data contains an identifier of a transmission apparatus or an identifier of a real-world object related to the transmission apparatus.

26. The data receiving apparatus according to claim 25, wherein said sampling frequency is higher than two times said transferring frequency.

27. The data receiving apparatus according to claim 25, wherein said receiving apparatus is configured to operate in two or more operation modes, including an image mode for capturing an image of a scene and a decoding mode, which is performed when not in the image mode, for receiving the optical signal.

28. The data receiving apparatus according to claim 25, wherein said transmission data forms a bit sequence containing two or more types of information.

29. The data receiving apparatus according to claim 25, wherein, based on a predetermined modulation process performed on the transmission data, the transmission data is coded into a flashing pattern of light or continuous variations of light intensity, and
said data processing section is configured to perform a corresponding demodulation process in order to extract the original transmission data.

30. The data receiving apparatus according to claim 25, further comprising an application part for performing processing services corresponding to the photoreceived position of the optical signal on said two-dimensional photoreceiving surface and to the transmission data decoded from the photoreceived optical signal.

31. The data receiving apparatus according to claim 30, wherein said application part is configured to extract, based on the decoded transmission data, an identifier of the real-world object in which a light source which emits the optical signal is disposed and one or more of: a network address, a host name, a resource identifier, data content, and a program code.

32. The data receiving apparatus according to claim 30, further comprising a communication medium for connecting the real-world object to a user terminal,
   wherein said application part is configured to obtain an address of the real-world object on said communication medium on the basis of the data decoded from the optical signal, and to establish a connection between the user terminal and the real-world object.

33. The data receiving apparatus according to claim 30, further comprising captured-image processing means for processing a captured image corresponding to a brightness of the optical signal which is photoreceived on said two-dimensional photoreceiving surface, and image display means for displaying an image, and
   wherein said application part is configured to display the captured image on a screen, and and to display, on the captured image, the data obtained by decoding the optical signal in an overlaid manner at a place corresponding to the photoreceived position of the optical signal.

34. The data receiving apparatus according to claim 30, wherein said application part is configured to specify a spatial position of the transmission apparatus which emits the optical signal on the basis of photoreceived positions of a plurality of optical signals detected on said two-dimensional photoreceiving surface.

35. The data receiving apparatus according to claim 30, wherein a plurality of transmission apparatuses are disposed in the real world,
   said photoreceiving section is configured to photoreceive the optical signal from the plurality of transmission apparatuses at the same time,
   said data processing section is configured to separate and decode the optical signal according to the photoreceived position on said two-dimensional photoreceiving surface, and
   said application part is configured to separate and detect each item of the decoded transmission data according to the photoreceived position on said two-dimensional photoreceiving surface.

36. The data receiving apparatus according to claim 25, wherein said transmission data contains at least a value of a sensor connected to the transmission apparatus.

37. The data receiving apparatus according to claim 25, further comprising connection means for accessing an external information providing space,
   wherein an application part is configured to search said information providing space on the basis of the data obtained by decoding the photoreceived optical signal, and to extract information content related to the real-world object.

38. The data receiving apparatus according to claim 25, further comprising captured-image processing means for processing a captured image according to a brightness of the optical signal which is photoreceived on said two-dimensional photoreceiving surface.

39. The data receiving apparatus according to claim 25, wherein said data processing section is configured to divide the two-dimensional photoreceiving surface of said photoreceiving section into an area in which the photoreceived signal is too strong and data reproduction is impossible, an area in which the photoreceived signal has a sufficient intensity and data reproduction is possible, and an area in which the photoreceived signal is very weak and reception is impossible, and to decode the transmission data by using the photoreceived signal from the area in which data reproduction is possible.

40. The data receiving apparatus according to claim 39, wherein said data processing section is configured to determine a position of the center of gravity of the area in which data reproduction is possible, and to specify a spatial position of the transmission apparatus on the basis of the position of the center of gravity.

41. The data receiving apparatus according to claim 25, wherein a plurality of two-dimensional photoreceiving surfaces are provided, and
   an application part is configured to specify a spatial position of said transmission apparatus which emits the optical signal by performing stereo matching on the basis of the optical signal detected on the plurality of two-dimensional photoreceiving surfaces and the photoreceived positions thereof.

* * * * *